United States Patent
Sooy et al.

(10) Patent No.: US 9,475,640 B2
(45) Date of Patent: Oct. 25, 2016

(54) GRIPPING TOOLS

(71) Applicant: Ridge Tool Company, Elyria, OH (US)

(72) Inventors: Josh Sooy, North Ridgeville, OH (US);
Harald Krondorfer, Aurora, OH (US);
Prasad Patil, Pune (IN); Richard R. Bowles, Solon, OH (US)

(73) Assignee: Ridge Tool Company, Elyria, OH (US)

( * ) Notice: Subject to any disclaimer, the term of this patent is extended or adjusted under 35 U.S.C. 154(b) by 0 days.

(21) Appl. No.: 14/735,259

(22) Filed: Jun. 10, 2015

(65) Prior Publication Data

US 2016/0039605 A1 Feb. 11, 2016

(51) Int. Cl.
*B65G 7/12* (2006.01)
*A45F 5/10* (2006.01)

(52) U.S. Cl.
CPC ......... *B65G 7/12* (2013.01); *A45F 2005/1013* (2013.01)

(58) Field of Classification Search
CPC . B25B 13/52; B65G 7/12; A45F 2005/1006; A45F 2005/1013; A45F 2200/0566; A62C 33/04; B66C 1/18
USPC .............. 294/15, 31.2, 119.2, 150; 81/64
See application file for complete search history.

(56) References Cited

U.S. PATENT DOCUMENTS

| | | | | |
|---|---|---|---|---|
| 877,012 A * | 1/1908 | Sullivan | ............... | B65G 7/12 248/76 |
| 1,050,169 A * | 1/1913 | Price | ............... | B25B 13/52 81/69 |
| 1,058,926 A * | 4/1913 | Toole | ............... | B65G 7/12 294/16 |
| 1,150,663 A * | 8/1915 | Cosseboom | ............ | B25B 13/52 81/68 |
| 1,245,062 A * | 10/1917 | Stuewe | ............... | B25B 13/52 81/68 |
| 1,389,515 A * | 8/1921 | Kikta | ............... | B25B 13/52 81/68 |
| 1,505,897 A * | 8/1924 | Kikta | ............... | B25B 13/52 30/429 |
| 1,890,227 A * | 12/1932 | McKee | ............ | B25B 13/52 81/64 |
| 2,058,949 A | 10/1936 | Borowski | | |
| 2,780,951 A | 2/1957 | Bram | | |
| 2,834,238 A * | 5/1958 | Stover, Sr. | ............ | B25B 13/52 81/361 |
| 3,728,916 A | 4/1973 | Brantley | | |
| 3,838,615 A | 10/1974 | McFarland et al. | | |
| 4,458,933 A * | 7/1984 | Thomas | ............ | B65G 7/12 294/137 |
| 4,543,858 A | 10/1985 | Luck | | |
| 4,598,615 A | 7/1986 | Tate | | |
| 4,838,465 A * | 6/1989 | Metzger | ............ | E04G 21/04 222/526 |
| 4,913,010 A | 4/1990 | Doss | | |
| 4,987,804 A | 1/1991 | Greenawalt | | |
| 5,440,955 A | 8/1995 | Freeland | | |
| 5,833,224 A * | 11/1998 | Holte | ............ | B25B 1/205 269/130 |
| 7,275,463 B2 | 10/2007 | Sipos et al. | | |
| 2011/0167964 A1* | 7/2011 | Price | ............ | B25B 13/52 81/64 |

FOREIGN PATENT DOCUMENTS

WO   WO 2011/059805   * 5/2011

OTHER PUBLICATIONS

Rothenberger website; http://www.rothenberger.com/en/products/-/662-easygrip-automatic-strap-wrench-for-plastic-pipes--20-160-mm-(34-6)/; (4 pages).

* cited by examiner

*Primary Examiner* — Dean Kramer
(74) *Attorney, Agent, or Firm* — Mark E. Bandy; Rankin, Hill & Clark LLP

(57) ABSTRACT

A tool for selective attachment to pipe or other elongated objects. The tool includes a handgrip for gripping the tool by hand, which is attached to a base. The tool includes a flexible fastener or strap for wrapping around the pipe, and a tensioner for exerting tension on the fastener to clamp the pipe between the fastener and the base.

29 Claims, 79 Drawing Sheets

GRIPPING TOOLS

CROSS REFERENCES TO RELATED APPLICATIONS

This application claims priority from Indian application serial No. 2550/MUM/2014 filed on Aug. 7, 2014. This application also claims priority from Indian application serial No. 1049/CHE/2015 filed on Mar. 4, 2015.

FIELD

The present subject matter relates to gripping tools and grasping devices. In particular, the present subject matter relates to tools for gripping pipes. The present subject matter also relates to methods using the various gripping tools.

BACKGROUND

Even though pipe is relatively lightweight for its size, it is conventionally sold in long lengths that may be difficult to grasp and carry for long distances, such as is sometimes required on construction sites and during maintenance projects. Plumbers and others often struggle handling pipe or other elongated objects by hand due to their relative large diameters. Joining together two pieces of pipe by glue joint coupling often requires the effort of two people, since one operator must hold the coupling and the other operator must grasp the pipe and insert the pipe inside the coupling. The pipe can be slippery and awkward to grip due to the diameter of the pipe and worksite conditions. Often larger diameter pipes are being assembled in a trench for underground applications, which further complicates the task because of the limited amount of space available for two people to position themselves relative to the pipe and because of the dirt and moisture that may be present. Conventional equipment used to grasp tubular objects tends to be bulky, can damage the object being held, and is often awkward to use when grasping objects in difficult to access areas. Another shortcoming of most conventional equipment is its inability to allow movement of tubular objects axially as well as rotationally while the equipment is at least partially engaged with the object.

Devices are known for gripping pipe or other elongated objects with a rounded outer surface. One known device is a pipe wrench of various designs, such as groove joint pliers used to engage pipe or other fittings. These devices generally include a pair of jaws and one or more handgrips connected to the jaws. These devices are designed to rotate the pipe about its longitudinal axis. One disadvantage of these devices is that they are not designed to push the pipe in a direction along its longitudinal axis, which could be helpful for inserting the pipe into a coupling. Another disadvantage of these tools is that force must be exerted on the one or more handgrips of the device in order to grip an outside surface of the pipe between the jaws. In situations where continuous gripping of the pipe is needed, continuous force must be applied to the one or more handgrips. This required application of force may result in fatigue to an operator of the device. It is for these reasons that these tools are not adequate for carrying or otherwise transporting the pipe from one location to another or for moving the pipe in a direction along its longitudinal axis.

Although satisfactory in certain respects, a need remains for an improved pipe handling tool. In particular, it would be desirable to ensure that upon engaging the tool to a pipe or other elongated object that the pipe is adequately secured to the tool without requiring the application of force to the handgrip, that the handgrip is in a desirable ergonomic position for handling the pipe when clamped thereto, and that the tool can be easily and quickly engaged to, or disengaged from, the pipe.

SUMMARY

The difficulties and drawbacks associated with previous tools and practices are addressed in the present subject matter as follows.

In one aspect, the present subject matter provides a tool for handling elongated objects. The tool comprises a base having an engaging surface for contacting an object. The tool also comprises a first handle portion affixed to and extending from the base. The tool additionally comprises a second handle portion releaseably engageable with at least one of the base and the first handle portion. The second handle portion includes a pair of projections that are fittingly engageable within a capture region defined in the base which enable the second handle portion to be pivotally positioned between an open position and a closed position upon engagement with at least one of the base and the first handle portion. The tool further comprises a flexible fastener having a first end engaged with the second handle portion. And, the tool also comprises provisions for maintaining tension applied to the fastener.

In another aspect, the present subject matter provides a tool for handling elongated objects. The tool comprises a base having an engaging surface for contacting an object. The tool also comprises a first handle portion affixed to and extending from the base. The tool also comprises a second handle portion pivotally secured to the base by a pivot pin, the second handle portion pivotally positionable between an open position and a closed position. The tool additionally comprises a flexible fastener having a first end engageable with the second handle portion. And, the tool comprises provisions for maintaining tension applied to the fastener.

As will be realized, the subject matter described herein is capable of other and different embodiments and its several details are capable of modifications in various respects, all without departing from the claimed subject matter. Accordingly, the drawings and description are to be regarded as illustrative and not restrictive.

DETAILED DESCRIPTION OF THE EMBODIMENTS

Figure 1:
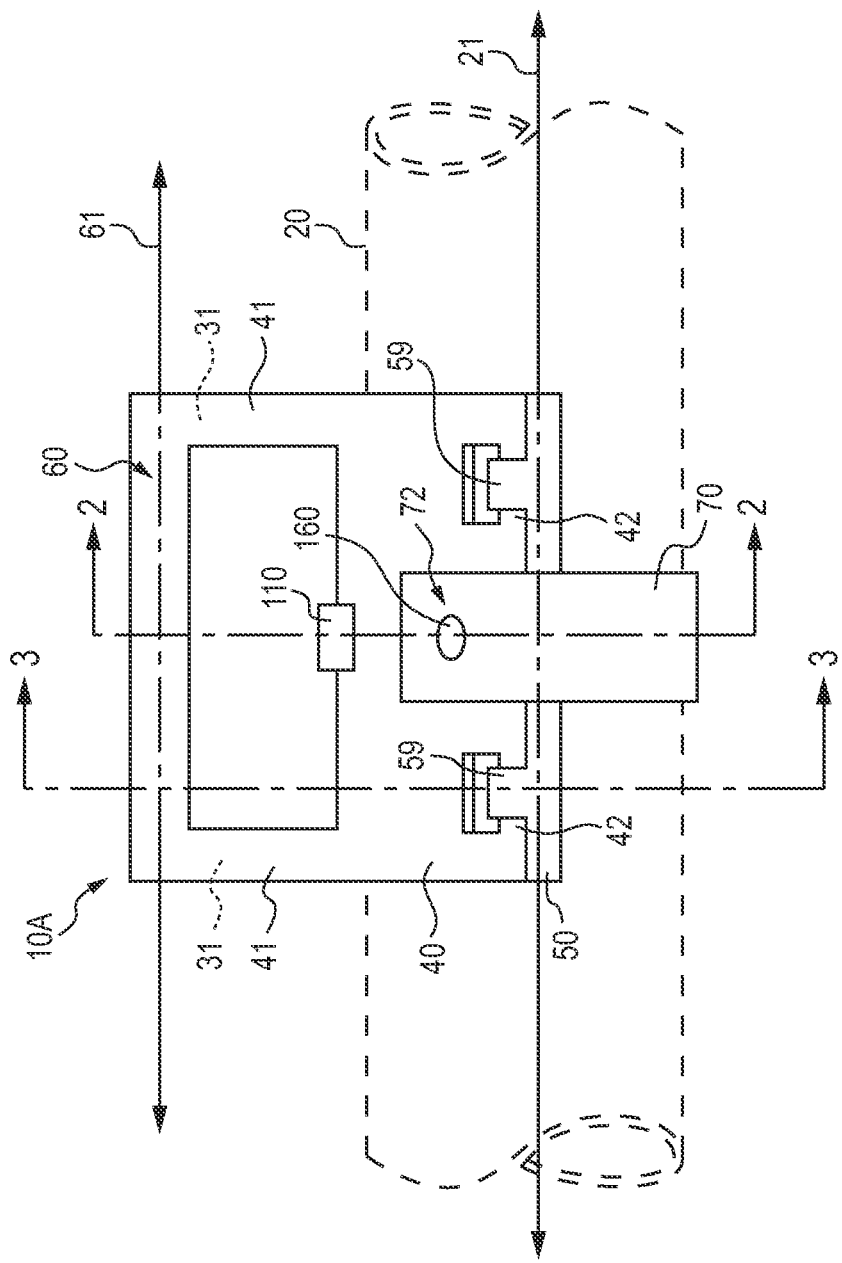
FIG. 1 is a schematic side view of a tool in accordance with the present disclosure.

Several objects of the gripping tools and related systems of the present subject matter, are as follows.

An object of the present subject matter is to provide a gripping tool or grasping device which addresses the previously noted problems of orienting and holding an object.

Another object of the present subject matter is to provide a gripping tool which allows a user to exert an axial force onto an object while at the same time applying a torque to rotate the object in position.

Another object of the present subject matter is to provide a gripping tool which can be used in areas that are difficult to access.

Another object of the present subject matter is to provide a gripping tool which provides adequate friction and tension to securely retain and/or engage an object and avoid slipping.

Yet another object of the present subject matter is to provide a gripping tool which is easy and quick acting to lock and unlock.

A further object of the present subject matter is to provide a gripping tool which has a comfortable and ergonomic handle.

Another object of the present subject matter is to provide a gripping tool which eases loading in all directions.

Yet another object of the present subject matter is to provide a gripping tool which can be used with a variety of attachable accessories for assisting in orienting an object in a desired position.

The present subject matter provides tools for attachment to a pipe or other elongated object in order to allow for transport, movement, gripping or otherwise secure handling of the elongated object.

Tools in accordance with the present subject matter can be selectively engaged and secured to a pipe or other elongated objects with ease and quickness, and without requiring constant force to be exerted on a handgrip of the tool in order to clamp the elongated object with the tool. The tools are configured to enable ergonomically correct positioning of a user's hand when a handgrip of the tool is used to grasp the tool for lifting, transporting or otherwise manipulating the elongated object.

It should, of course, be understood that the description and drawings herein are merely illustrative and that various modifications and changes can be made in the structures disclosed without departing from the present disclosure. In general, the figures of the exemplary tools are not necessarily to scale. It will also be appreciated that the various identified components of the exemplary tool disclosed herein are merely terms of art that may vary from one manufacturer to another and should not be deemed to limit the present disclosure.

In many embodiments, tools in accordance with the present subject matter generally include a handgrip for gripping the tool by hand. The handgrip is attached to a base, which has an engaging surface configured to engage an associated pipe or other elongated object during clamping of the pipe. The tools also include a fastener, such as a strap or band for example, which can be extended around a perimeter of an associated pipe for clamping the pipe. The fastener has two opposite ends that are each designed to be operatively or directly attached to the base. The tool also includes a tensioner for exerting and/or maintaining tension on the fastener to thereby clamp the associated pipe between the fastener and the base and/or to a handle or handle portion.

An anchor may be used to operatively or directly attach one end of the fastener to the base. The present subject matter also provides a quick connect coupling for quickly and easily operatively connecting and disconnecting another end of the fastener to the base and/or to a handle or handle portion.

In many embodiments, the present subject matter provides gripping tools that utilize a flexible strap which is positioned around an object to be gripped such as a pipe, and a unique assembly which readily engages an end of the strap, tightens the strap around the object, and then locks the strap to maintain the tightened state. The engaging, tightening, and locking assembly includes a pair of pivotable levers arranged on a handle of the tool. These and other details are all described as follows.

The tools can provide a comfortable, ergonomically correct carrying handgrip for pipe or other elongated objects. Tools in accordance with the present subject matter can securely clamp the pipe near the center of gravity of the pipe, or elsewhere on the pipe, thereby providing a convenient handgrip for carrying or otherwise manipulating the pipe. Accordingly, the tools may allow one person to manipulate or transport one or more pipes or other elongated objects with ease.

The tools can also aid in the process of handling or transporting an elongated object having a relatively large diameter, such as for example, in the assembly of PVC pipe into couplings. The tools may be especially useful for elongated objects having a diameter, measured perpendicular to its longitudinal axis, in the range of about 2 to 8 inches, or larger or smaller, for example. The present subject matter provides quickly installed, removable tools to assist in such grasping of large diameter pipe.

The tools can be used for installation or transporting of other material such as steel pipe, copper tube, stainless steel tube, and the like. The tools can also be used for single pieces or bundles of non-pipe/non-tube products such as structural steel, i.e. L-shaped. T-shaped, C-shaped, I-shaped and similar beams, for example. The tools can be used to manipulate several pieces of material at once, such as one or more of copper tubes, lumber, or rebar, which are often provided in multiple pieces. Essentially, any product with a generally slender lateral dimension and a greater longitudinal length can be manipulated, moved, or transported with the tools of the present subject matter. Use of the tools can reduce effort needed to manipulate or transport the elongated objects and can be used in a number of trades such as plumbing, mechanical contracting, structural steel workers, concrete workers, carpenters, and other trades requiring the manipulation of long, slender products.

Furthermore, in many embodiments the tool includes a quick connect coupling, which allows one end of the fastener to be quickly disconnected from the tool and wrapped around an elongated object, and then quickly reconnected to the tool so that the fastener can be tensioned to clamp the elongated object between the fastener and the base. In certain embodiments, the quick connect coupling does not require threading a length of the fastener through an aperture in the device, such as through a tensioning mechanism, each time the device is clamped to a pipe, as is conventionally required. However, the present subject matter is not limited to such configurations and includes a variety of devices in which an end or length portion of the fastener is received in and/or engaged within the device.

Specific aspects of devices in accordance with the present subject matter will now be discussed in more detail.

In accordance with the present subject matter and in several embodiments, the tool includes a handgrip for gripping the device by hand. The handgrip may be connected to the base by one or more legs or other members extending between the handgrip and the base. It will be understood however, that the tool does not necessarily include legs, such as when the handgrip is directly connected to the base. In one aspect, the handgrip is situated on a side of the base that is opposite from the engaging surface.

The size and shape of the handgrip is not particularly limited by the present subject matter, and in conjunction with the one or more legs, can include various configurations that are generally D-shaped, V-shaped, U-shaped, or any other shape. In certain embodiments, the handgrip and legs together form a generally U-shaped handle attached to the base. In yet other embodiments, the handgrip can be in the form of an outwardly extending member sized and shaped for grasping.

In several embodiments, upon securing the tool to an associated elongated object such as a pipe, a longitudinal axis of the handgrip is non-perpendicular to a longitudinal axis of the pipe. This means that the longitudinal axis of the handgrip is not oriented at right angles to the longitudinal axis of the pipe. In one aspect, the longitudinal axis of the handgrip is generally parallel to a longitudinal axis of the pipe.

The positioning of the handgrip with respect to the pipe in these orientations allows for holding, transport, movement, or stabilization of the pipe while maintaining an ergonomically correct positioning of a user's hand and wrist while gripping the handgrip, which reduces the amount of strain that may be otherwise associated with transporting a pipe or other elongated object by hand or by using a conventional tool.

In particular versions of tools of the present subject matter, the handgrip is in the form of two or more handle portions which are configured to be engaged together. Various assemblies are contemplated including handle portions with alignment provisions that serve to promote engagement and/or stability of the handle(s) upon closure together.

In accordance with the present subject matter, the tool includes a base having an engaging surface for engagement and contact with the associated elongated object. The size, shape, and composition of the base is not particularly limited by the present subject matter and can include any size, shape, or material that is capable of adequately clamping and securing an elongated object.

In one embodiment, the base comprises a generally V-shaped plate or member. The inside or interior face of the V-shaped base plate defines an inside surface that includes an engaging surface. The engaging surface is the portion of the base that comes into direct contact with an associated elongated object, such as a pipe, when the tool is secured to the pipe. In one aspect, the handgrip is situated on a side of the base opposite from the engaging surface. In accordance with the present subject matter, the engaging surface may be flat or curved, smooth or undulating.

The base plate may comprise other forms such as curved, angular, or flat configurations or combinations thereof; and may be composed of material comprising metal or metal alloy, one or more polymers, fiberglass, carbon fiber, wood, or other materials or combinations thereof.

In one embodiment, the base plate includes a polymer material applied to the base, and defines the engaging surface. For example, the base may comprise a V-shaped plate having a polymer material on the inside surface of the V-shaped plate. The polymer material may be applied to the inside surface of the base and define an engaging surface. The polymer material may provide increased friction with a surface of an associated elongated object when compared to the material forming the base. The polymer material may thereby resist slipping or rotation of the elongated object in relation to the tool when the elongated object is clamped by the tool. The polymer material defining the engaging surface is not particularly limited by the present subject matter, and may include any polymer material useful for increasing friction when compared to the material of the base. In one embodiment, the polymer material defining the engaging surface includes an elastomer polymer material.

In one embodiment, the handgrip, legs, and/or base comprise one integral piece or structure, such as an injection molded polymer piece or a molded metal piece, for example. In another embodiment, the handgrip, optional legs, and/or base are distinct pieces or structures that may be attached to each other; such as metal pieces for example, that may be welded together or otherwise joined to form the tool.

In particular versions of the present subject matter tools, the base includes a handle portion affixed to and/or formed with the base. The base can also comprise a receiving region for engagement with another handle portion. Thus, one handle portion is selectively removable from and selectively engageable with the base and other handle portion.

In accordance with the present subject matter, the tool includes a fastener, strap, band, chain, belt, or other means for securing the tool to an elongated object, such as a pipe. In accordance with the present subject matter, the exemplary tools can include more than one fastener for clamping the elongated object. In several embodiments, upon securing the tool to an associated elongated object such as a pipe, both the engaging surface of the base and the fastener contact the pipe.

The fastener is not particularly limited by the present subject matter, and can comprise any material that can suitably clamp a pipe to the tool. The fastener can be rigid or flexible, or have any degree of rigidity or flexibility. The fastener can comprise a chain, a metal ribbon, a nylon strap, a leather or polymer belt, a composite material, or any other material or combination thereof that has adequate tensile strength to be tensioned for securing an elongated object in the tool. In one embodiment, the fastener comprises a nylon strap.

In several embodiments, the fastener is wound around a perimeter of the pipe and each end of the fastener is operatively connected to the base, handle, and/or handle portions. In this way, when tension is applied to the fastener, an associated pipe situated between the fastener and the base is thereby clamped. In several embodiments, one end of the fastener is directly connected to the base and the other end of the fastener is operatively connected to the base through the quick connect coupling. In this way, an end of the fastener can be quickly and easily connected and disconnected from the base using the quick connect coupling so as to allow the tool to be quickly engaged to, and disengaged from, a pipe.

In accordance with the present subject matter, in certain embodiments the tool includes a tensioner for exerting tension and/or maintaining on the fastener to thereby clamp the elongated object between the fastener and the base. The tensioner is not particularly limited by the present subject matter and can include for example, a hinged or pivoting tensioner, a ratcheting tensioner, a threaded tensioner, or other types of tensioners or combinations thereof.

In certain embodiments, the tensioner is operatively connected to at least one end of the fastener in order to exert tension on the fastener for clamping the pipe between the fastener and the base. The tensioner may exert force or tension on one or both ends of the fastener, or on any portion of the fastener between the two ends. In one embodiment, the tensioner is operatively connected to one end of the fastener. In another embodiment, the tensioner is operatively connected to two ends of the fastener.

The tensioner may exert tension/force on the fastener by pulling, cinching, or crimping, for example. In one embodiment, the tensioner clamps the elongated object between the fastener and the base by pulling on the fastener.

In accordance with the present subject matter, the exemplary tool includes an anchor for connecting one end of the fastener to the base. The anchor may be used to directly attach one end of the fastener to the base, or may be used to operatively connect one end of the fastener to the base through one or more other components of the tool. In certain versions, the anchor permanently affixes an end of the fastener to the base, handle, or handle portion. In other versions, the anchor enables detachment of the fastener end.

In several embodiments, the anchor may comprise a length adjustment mechanism for selectively adjusting a length of the fastener extending between the anchor and the quick connect coupling so that such length generally corresponds to the linear distance around the outside circumference or periphery of an associated elongated object to be clamped.

The anchor is not particularly limited by the present subject matter and can include glue, adhesive, screw(s), bolt(s), rivet(s), pet(s), fastener(s), a strap adjustor, a cam buckle, a ratchet assembly, or other type of anchoring system and combinations thereof, for directly or operatively connecting one end of the fastener to the base, handle, or handle portion.

In accordance with the present subject matter, in certain embodiments the tool includes a quick connect coupling for selectively and operatively connecting an end of the fastener to the base, handle, or handle portion. The quick connect coupling allows one end of the fastener to be quickly and easily connected/disconnected to the base, handle, or handle portion. In certain embodiments, the quick connect coupling does not require threading and then feeding a length of the fastener through an aperture in the pipe, or removing the fastener therefrom, each time the tool is clamped to a pipe. In this way, the tool can be applied to a pipe by simply wrapping a free end of the fastener around the pipe and connecting the free end of the fastener to the base using the quick connect coupling.

In embodiments using a quick connect coupling, the quick connect coupling does not require the fastener to be threaded and fed through an aperture in the base, such as through a cam buckle, a ratchet assembly, or a strap adjuster, for example. Accordingly, the quick connect coupling allows for quick and easy attachment of a free end of the fastener to the base, handle, or handle portion.

The quick connect coupling is not particularly limited by the present subject matter and can include for example, a lift-off type hinge connection comprising one or more journals associated with the base, that are selectively engageable to one or more corresponding bearings associated with the fastener; a hook-type connection comprising a hook associated with the fastener, that is selectively inserted into a depression associated with the base; a finger-type connection comprising a finger associated with the base, that is selectively inserted into an aperture associated with the fastener; or other types of connections and combinations thereof capable of providing a quick connect coupling between the fastener and the base.

Figure 2:
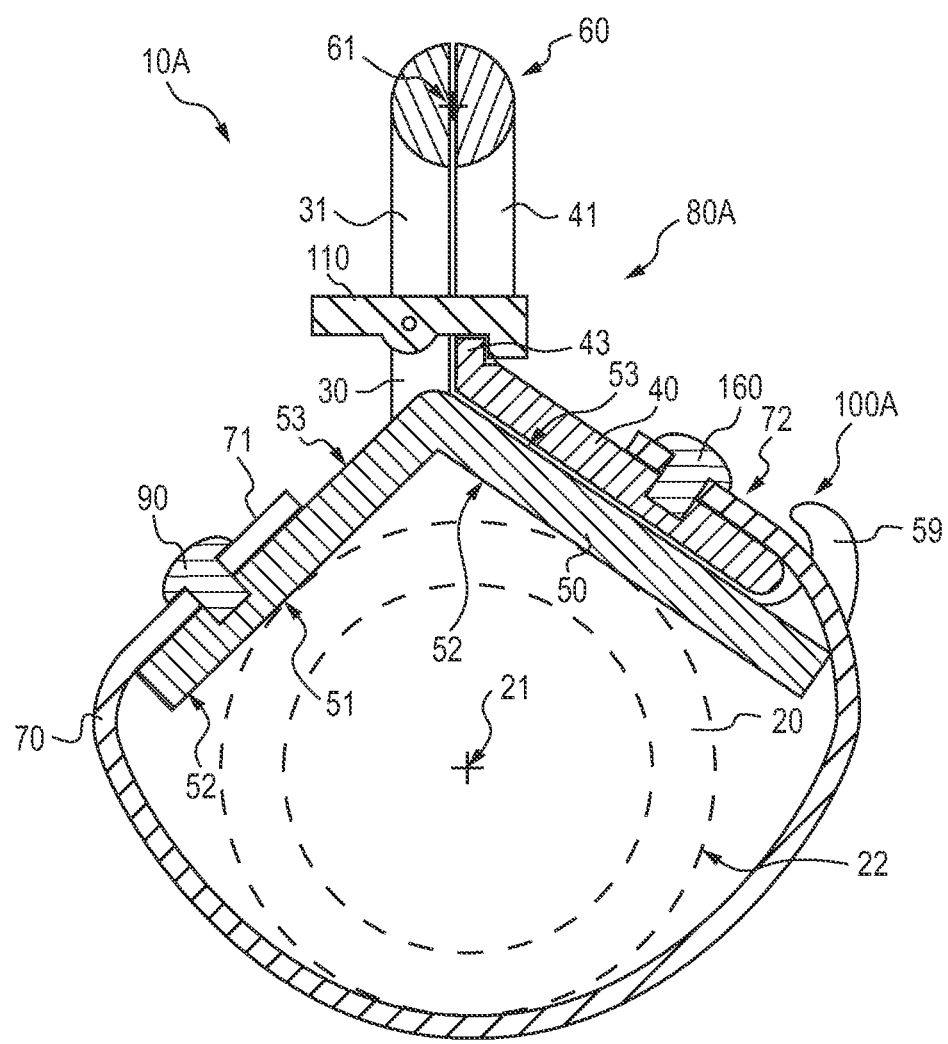
FIG. 2 is a schematic cross-sectional view of the tool of FIG. 1 through line 2-2.

Referring now to the drawings, wherein like numerals refer to like parts throughout the several views, FIGS. 1-3 show a tool 10A and an associated pipe 20. The tool 10A includes a first handle portion 30 and a second handle portion 40 defining a pivoting jaw member. As shown in FIG. 2, the tool 10A is a split handle design wherein the first handle portion 30 and the second handle portion 40 come together to form a handgrip 60.

The first handle portion 30 includes two legs 31 at each end of the first handle portion 30 that extend between the handgrip 60 and a base 50.

The base 50 comprises a V-shaped base plate including an inside or interior surface 52 and an outside or exterior surface 53. The inside surface 52 includes an engaging surface 51 for engaging an outer surface 22 of an associated pipe 20 when the tool 10A is attached to the associated pipe 20. It will be appreciated however, that the base 50 can include other forms or shapes in accordance with the present subject matter, such as comprising a flat or curved configuration. The base 50 includes two bearings 59. It will be appreciated that the base 50 can include one or more bearings as desired.

The second handle portion 40 includes two legs 41 at each end of the second handle portion 40 extending between the handgrip 60 and the base 50. The second handle portion 40 is shown to include two journals 42 that are configured to be selectively engaged with the bearings 59 on the base 50. As shown in FIGS. 1-3, the base 50 includes two bearings 59 and the second handle portion includes two corresponding journals 42. However, it will be understood that the base 50 can include one or more bearings, and the second handle portion 40 can include one or more corresponding journals. In one aspect, the base 50 includes one bearing extending along an entire longitudinal length of the base, and the second handle portion includes one or more journals that can selectively engage the bearing.

As seen in the figures, the tool 10A includes a fastener 70. The fastener 70 is wrapped around the pipe 20 and includes a first end 71 attached to the base 50 by an anchor 90, and a second end 72 that is attached to the second handle portion 40 by a connector 160. The connector 160 is not particularly limited and can include a fastener, adhesive, or other connection between the fastener 70 and the second handle portion 40.

Figure 3A:
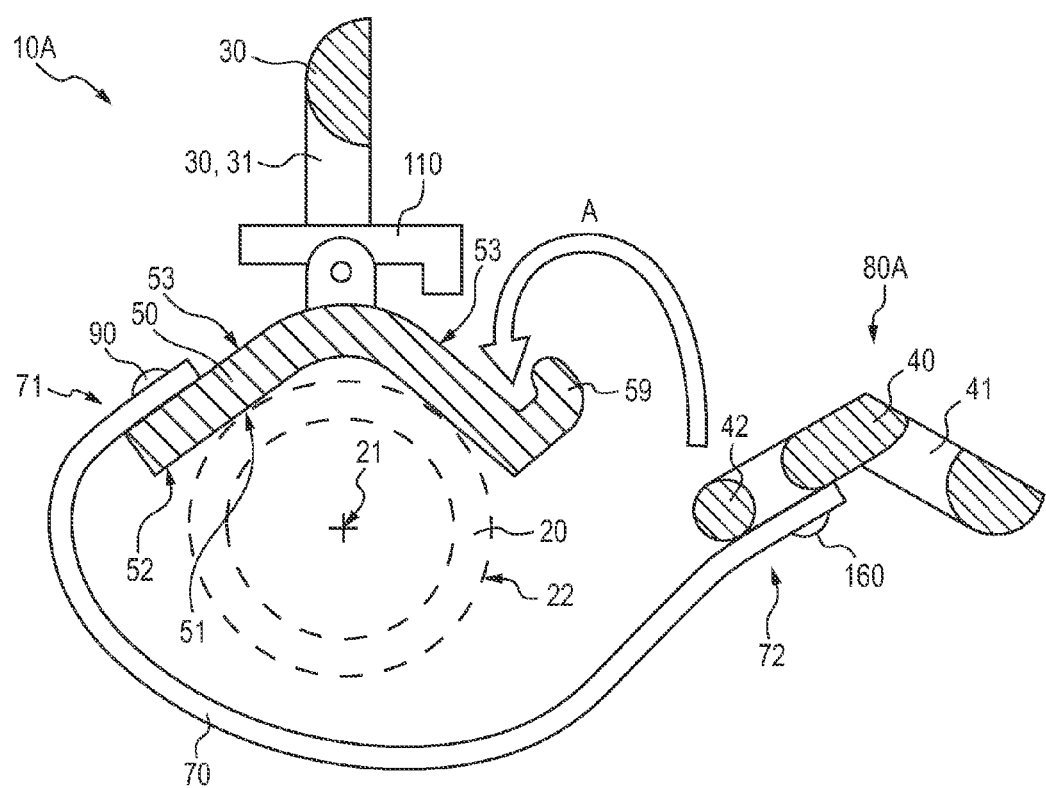
FIGS. 3A-3C are schematic cross-sectional views of the tool of FIG. 1 through line 3-3 and shown in various configurations.
Figure 3B:
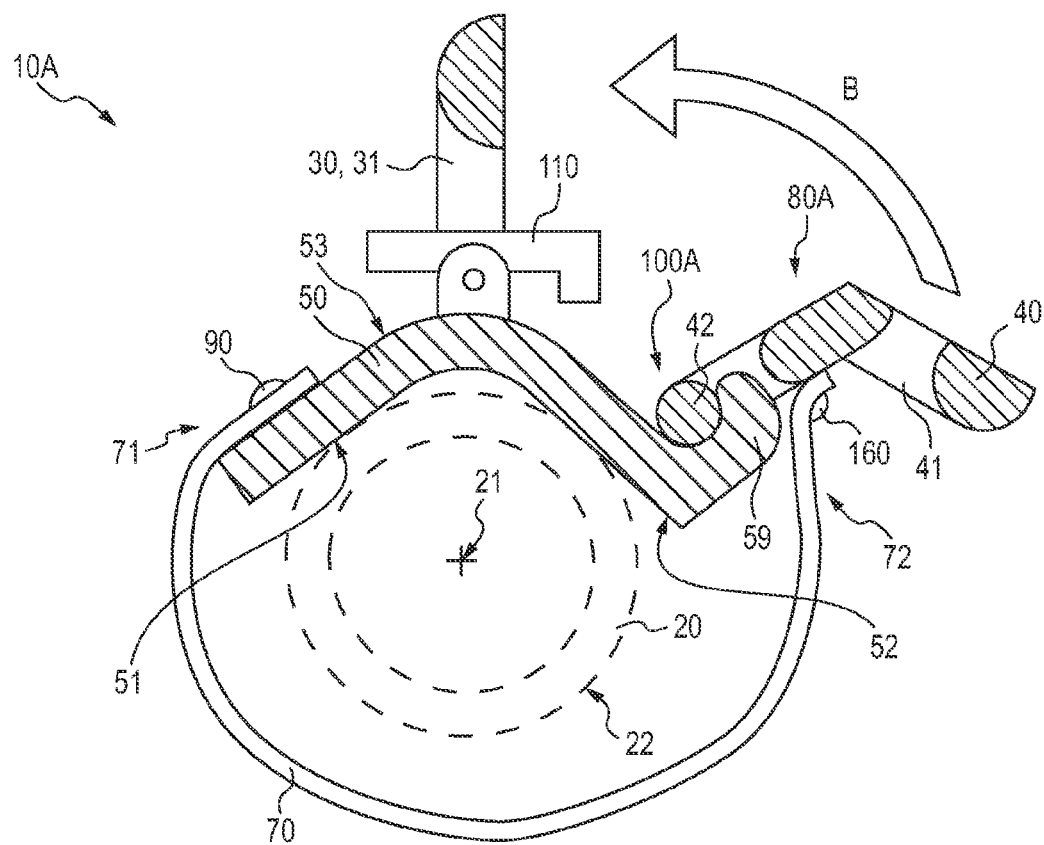
Figure 3C:
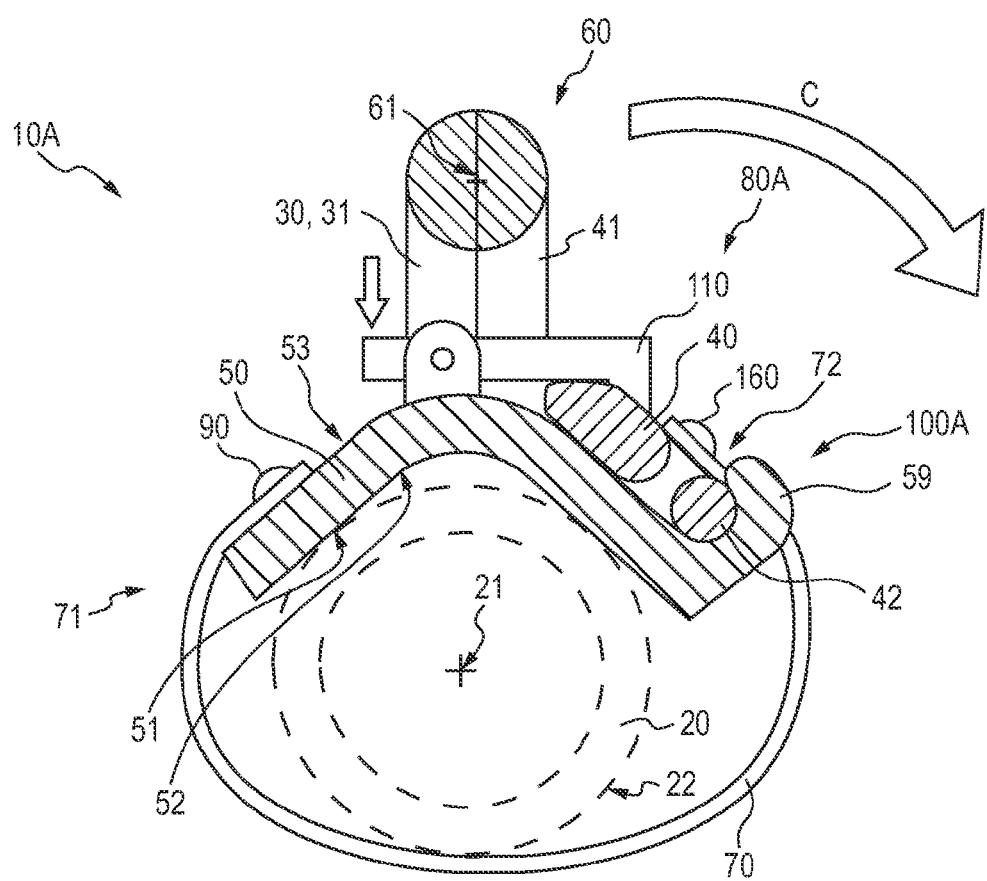

In the embodiment shown in FIGS. 1-3, the second handle portion 40 can be characterized as a pivoting jaw member. The second handle portion 40 can be so characterized because the second handle portion 40 is configured to pivot in relation to the first handle portion 30 around a quick connect coupling 100A, which comprises the journal 42 and bearing 59. In this way, the pivoting jaw member, i.e. the second handle portion 40, acts as a pivoting tensioner 80A for applying tension to the fastener 70 when moved to a closed position (FIGS. 2 and 3C). When the pivoting jaw member 40 is in a closed position, the pipe 20 is clamped between the fastener 70 and the base 50.

FIGS. 1 and 2 show the tool 10A in a closed position, wherein the first handle portion 30 and the second handle portion 40 are brought together to clamp the associated pipe 20. As shown in FIG. 1, handgrip 60 and legs 31, 41 form a generally U-shaped handle structure attached to the base 50. As shown in FIGS. 1 and 2, when the tool 10A is secured to the associated pipe 20, the fastener 70 in conjunction with the base 50 completely surrounds the associated pipe 20.

Furthermore, a longitudinal axis 61 of the handgrip 60 is substantially parallel with a longitudinal axis 21 of the associated pipe 20.

Pivoting movement of the pivoting jaw member 40 in relation to the first handle portion 30 is shown for example between FIGS. 3A-3C, wherein the pivoting jaw member 40 can be moved (arrow A in FIG. 3A) into engagement with the base 50 (FIG. 3B), and pivoted (arrow B in FIG. 3B) about the quick connect coupling 100A, between an open position (FIG. 3B) and a closed, clamping position (FIG. 3C).

In FIG. 3A, the tool 10A is shown to be in a disconnected state/configuration, wherein the pivoting jaw member 40 is not engaged with the first base 50. In this disconnected state, the tool 10A can be easily clamped to the pipe 20, wherein the base 50 is brought into proximity with the pipe 20, and the free end (i.e. second end 72) of the fastener 70, which is connected to the pivoting jaw member 40, can be wrapped around a perimeter of the pipe 20.

The pivoting jaw member 40 can be moved, as indicated by the arrow A shown in FIG. 3A, from a disconnected configuration (FIG. 3A) into engagement with the first handle portion 30 and to a connected configuration (FIG. 3B). More specifically, the fastener 70 is looped around the pipe 20, and the journal 42 of the pivoting jaw member 40 is operatively engaged with the bearing 59 of the base 50 as shown in FIG. 3B. In this way, the second end 72 of the fastener 70 is thereby operatively connected to the base 50, wherein the journal 42 and the bearing 59 together define a quick connect coupling 100A between the fastener 70 and the base 50. As will be appreciated, the selectively engageable bearing 59 and journal 42 may comprise a lift-off hinge type quick connect coupling.

In order to clamp the pipe 20 or other elongated object between the fastener 70 and the base 50, the pivoting jaw member 40 is pivoted, as indicated by the arrow B in FIG. 3B, in relation to the first handle portion 30 from an open position (FIG. 3B) to a closed position (FIG. 3C). Such pivoting movement will apply tension to the fastener 70 for clamping the pipe 20 in the tool 10A. Such pivoting movement will also bring the first handle portion 30 and pivoting jaw member 40 together to thereby define the handgrip 60.

As shown in FIG. 3C, the pipe 20 is completely surrounded by, and clamped between, the fastener 70 and the base 50, and both the fastener 70 and the base 50 contact an outer surface 22 of the associated pipe 20. Furthermore, as can be seen between FIGS. 3B and 3C, an area (when viewed in two dimensions as in the noted figures) between the fastener 70 and the engaging surface 51 is reduced when tension is applied to the fastener 70 by moving the second handle portion 40 from an open position (FIG. 3B) to a closed position (FIG. 3C). This reduction in the area between the fastener 70 and the engaging surface 51 thereby clamps the pipe 20 between the fastener 70 and the base 50. As will be understood, other embodiment tensioners described and depicted herein also are capable of exerting tension on the fastener and reducing an area (as seen from a cross-sectional view, e.g. FIGS. 3A-3C) between the fastener and the engaging surface.

When the pipe 20 is secured in the tool 10A as shown in FIGS. 1, 2, and 3C, the longitudinal axis 61 of the handgrip 60 is substantially parallel with the longitudinal axis 21 of the pipe 20. However, it will be understood that in accordance with the present subject matter, that the longitudinal axis 61 of the handgrip 60 does not have to be exactly parallel, or substantially parallel with the longitudinal axis 21 of the pipe 20. Rather, the handgrip 60 can have any orientation, as long as the longitudinal axis 61 of the handgrip 60 is not perpendicular to the longitudinal axis 21 of the pipe 20, i.e. as long as planes within which the axes 21, 61 extend, do not meet (i.e. intersect) at a right angle (i.e. 90°).

In several embodiments, the tool includes a latch for locking the second handle portion in a specific position relative to the first handle portion. For example, as shown in FIGS. 1, 2 and 3C, a latch 110 can be in a locking position (FIGS. 1, 2 and 3C), wherein the latch 110 engages a catch 43 on the pivoting jaw member 40 to thereby lock the pivoting jaw member 40 in the closed position. The latch 110 may be biased, such as by a spring for example, to the locking position. The latch 110 may be selectively moved from the locking position to an unlocking position, wherein the latch 110 does not engage the catch 43 so that the pivoting jaw member 40 can be pivoted from the closed position, away from the first handle portion 30, to an open position (FIG. 3B).

In order to remove the tool 10A from the pipe 20, the process depicted from FIG. 3A-3C can be performed in reverse for example. Namely, the latch 110 can be moved to an unlocking position so that the latch 110 does not engage the catch 43, and the pivoting jaw member or second handle portion 40 is thereby unlocked from the first handle portion 30. The pivoting jaw member or second handle portion 40 can then be pivoted as indicated by the arrow C in FIG. 3C, from a closed position (FIG. 3C) to an open position (FIG. 3B). The journal 42 can then be disconnected from the bearing 59, whereby the pivoting jaw member 40 is disengaged from the base 50 as shown in FIG. 3A.

In this way, the tool 10A can be selectively attached or removed from the pipe 20 without having to thread and feed a length of a strap through an aperture in a device. Furthermore, the tool 10A can clamp the pipe 20 without a user having to maintain force on the handgrip 60 of the tool 10A, and the handgrip 60 is ergonomically positioned for easy manipulation of the pipe 20.

As shown in FIGS. 1-3, the fastener 70 is operatively attached to the base 50 and has a length extending from the anchor 90 to the quick connect coupling 100A that is sized for a particular diameter pipe or other elongated object. That is, a first end 71 of the fastener 70 is attached to the base 50 by anchor 90, and a second end 72 of the fastener 70 is attached to the second handle portion 40 by connector 160. However, in order to accommodate pipe or other elongated objects of varying diameter, the present disclosure provides alternate configurations of the anchor that are capable of adjusting a length of the fastener extending between the anchor and the quick connect coupling in order to accept objects of varying diameter.

Several embodiment anchor variations are depicted in FIG. 4-7, which can be incorporated into the tool 10A shown in FIGS. 1-3, by replacing anchor 90 for example. It will be understood however, that the present subject matter will not be limited by these variations to the anchor, and that other anchor configurations can be utilized for adjusting a length of the tensioner extending between the anchor and the quick connect coupling in order to accommodate objects of varying diameter.

Figure 4:
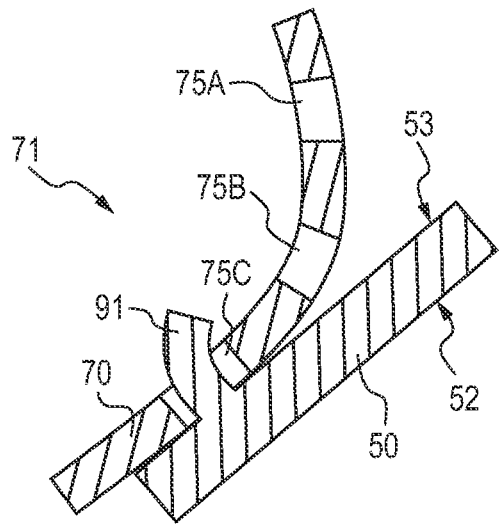
FIG. 4 is a schematic cross-sectional view of a portion of a tool in accordance with the present disclosure.

In one embodiment as shown in FIG. 4, the anchor comprises a peg 91 for anchoring the first end 71 of the fastener 70 to the base 50. In this embodiment, the fastener 70 can include a series of holes 75A-75C along a length of the fastener 70. The holes 75A-75C are sized to accept the peg 91 so that the fastener 70 can be anchored to the base 50. As shown, the peg 91 is situated on the outside surface 53 of the base 50.

Figure 8:
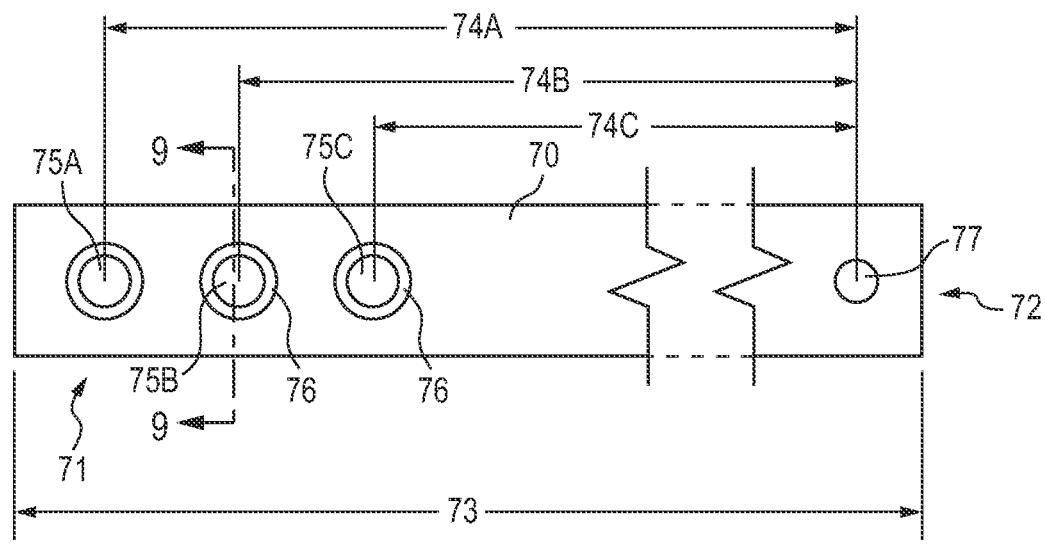
FIG. 8 is a schematic top elevational view of a fastener in accordance with the present disclosure.
Figure 9:
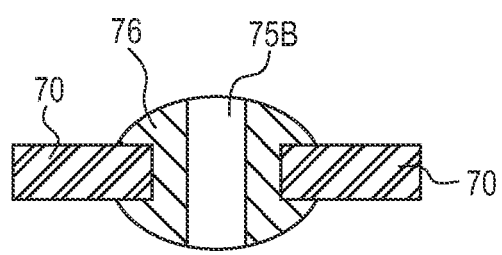
FIG. 9 is a schematic cross-sectional view of the fastener of FIG. 8 taken through line 9-9.

An exemplary fastener that can be used in conjunction with the peg 91 in this embodiment is depicted in more detail in FIGS. 8 and 9. Therein, a fastener 70 is shown with a series of holes 75A-75C extending along a length 73 of the fastener 70 near the first end 71 of the fastener 70. This series of holes 75A-75C is generally formed at the first end 71 of the fastener 70 so as to selectively engage the peg 91. The fastener can include more or less holes than that depicted in the figures. The second end 72 of the fastener 70 can include an aperture 77 for connecting to the pivoting jaw member 40 with the connector 160, as depicted in FIGS. 1-3.

The fastener 70 can include rivets 76, wherein each rivet 76 includes a passage that defines each of holes 75A-75C. The rivets 76 can be formed from metal or other durable material, to thereby reinforce the holes 75A-75C, making the holes 75A-75C more durable and resistant to deformation and tearing of the fastener 70.

One of the holes 75A-75C can be selectively attached to the peg 91 to thereby attach the first end 71 of the fastener 70 to the base 50 and to selectively adjust a length of the fastener 70 extending between the peg 91 and the quick connect coupling. For example, a length of the fastener 70 extending between the peg 91 and the quick connect coupling can be adjusted to length 74A by inserting hole 75A over peg 91. In a similar way, either of holes 75B or 75C can be inserted over peg 91 to adjust the length of the fastener 70 to be length 74B or 74C, respectively. The fastener 70 can include more or less holes than that depicted in FIGS. 4 and 8 as desired for a particular application.

Figure 5:
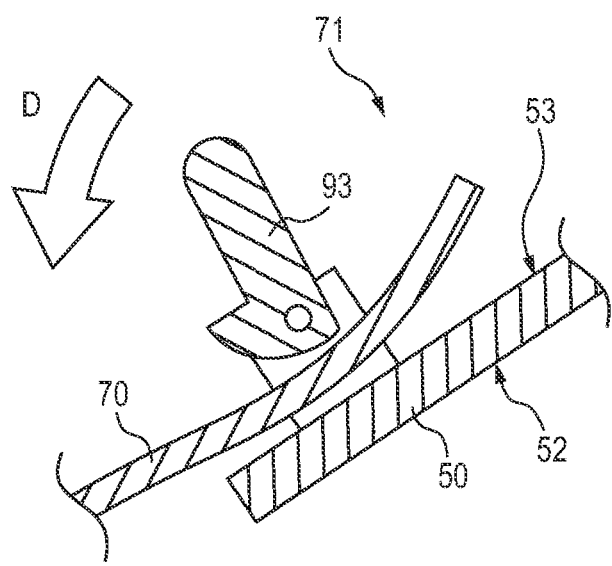
FIG. 5 is a schematic cross-sectional view of a portion of a tool in accordance with the present disclosure.

In another embodiment as shown in FIG. 5, the anchor comprises a cam buckle 93 for selectively adjusting a length of the fastener 70 extending between the cam buckle 93 and the quick connect coupling. The cam buckle 93 is shown in FIG. 5 in an unbuckling position, such that the first end 71 of the fastener 70 can be freely fed through the cam buckle 93. As will be understood, the cam buckle 93 can be moved, as indicated by the arrow D in FIG. 5, to a buckling position such that the cam buckle 93 pinches or otherwise engages the first end 71 of the fastener 70 between the buckle 93 and the outside surface 53 of the base 50, for example. In this way, a length of the fastener 70 extending between the cam buckle 93 and the quick connect coupling can be easily and quickly adjusted.

Figure 6:
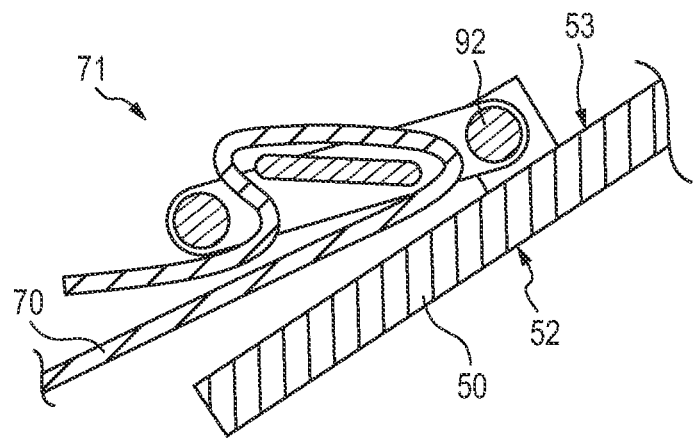
FIG. 6 is a schematic cross-sectional view of a portion of a tool in accordance with the present disclosure.

In another embodiment as shown in FIG. 6, the anchor comprises a strap adjuster 92, through which the first end 71 of the fastener 70 is threaded. The strap adjuster 92 is configured to secure the first end 71 of the fastener 70 to the base 50. The strap adjuster 92 is connected to the outside surface 53 of the base 50 and can be used for example, when the fastener 70 comprises a strap. In this configuration, the first end 71 of the fastener 70 can be easily fed through the strap adjuster 92 in order to adjust a length of the fastener 70 extending between the strap adjuster 92 and the quick connect coupling.

Figure 7:
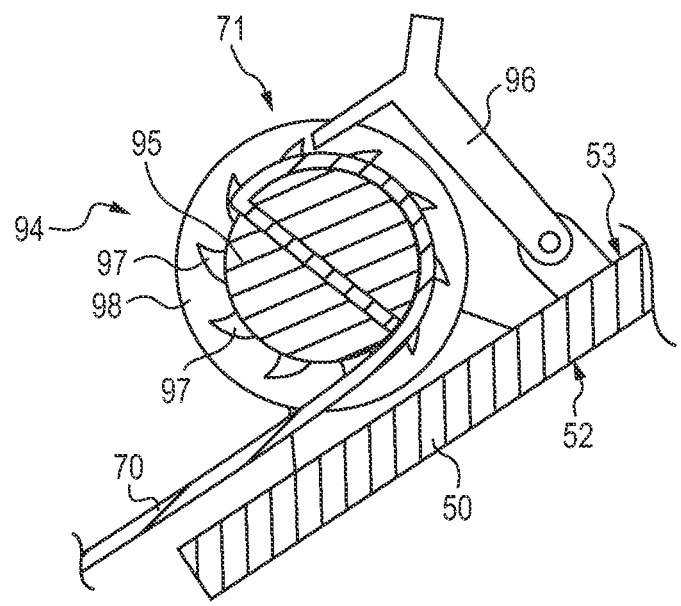
FIG. 7 is a schematic cross-sectional view of a portion of a tool in accordance with the present disclosure.

In still another embodiment as shown in FIG. 7, the anchor can comprise a ratchet assembly 94. The ratchet assembly 94 can be connected to the outside surface 53 of the base 50. The ratchet assembly 94 can include a drum 95, pawl 96, and teeth 97. The first end 71 of the fastener 70 can be fed around the ratchet drum 95 and secured thereto. The length of the fastener 70 extending between the ratchet assembly 94 and the quick connect coupling can be easily adjusted by hand, wherein a knob 98 is used to rotate the drum 95 to draw up a length of the fastener 70 around the drum 95. A pawl 96 is biased, such as by a spring (not shown), into engagement with teeth 97 of the ratchet assembly 94 in order to prevent unwinding of the fastener 70 from the drum 95. The pawl 96 can be moved away from the teeth 97 in order to allow the fastener 70 to unwind from the drum 95 and to expand the length of the fastener 70 extending between the ratchet assembly 94 and the quick connect coupling.

In accordance with the present subject matter, the anchor can comprise various other fastener length adjustment mechanisms. No matter what type of length adjustment mechanism is used to adjust a length of the fastener extending between the anchor and the quick connect coupling, it will be understood that the other end, e.g. the second end, of the fastener can be selectively engaged to, or disengaged from, the base by the quick connect coupling. Furthermore, once the length of the fastener extending between the anchor and the quick connect coupling is adjusted to correspond to the linear distance around the outside circumference or periphery of the elongated object, then the tensioner can be operated to exert tension on the fastener for clamping the elongated object between the fastener and the base.

Figure 10:
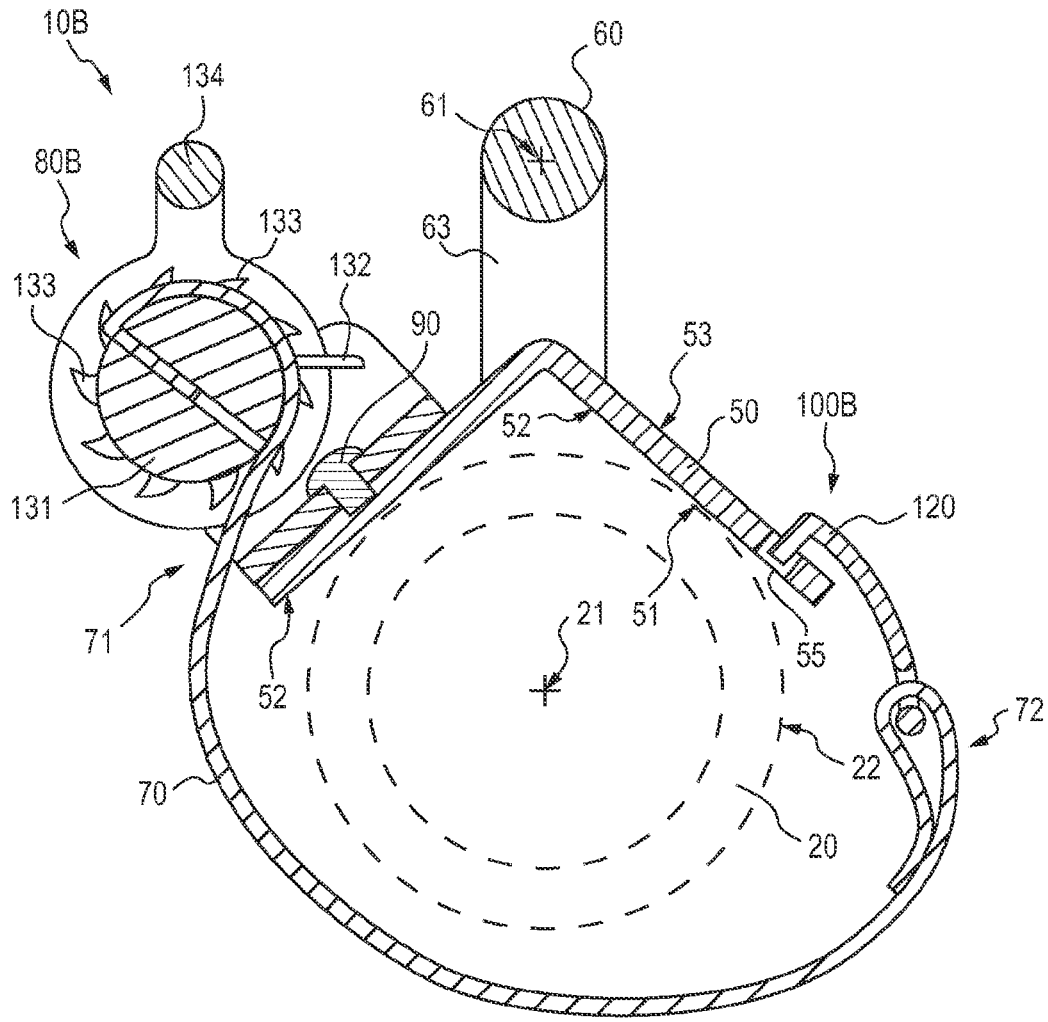
FIG. 10 is a schematic cross-sectional view of a tool in accordance with the present disclosure.

Another exemplary embodiment tool is shown in FIG. 10. The tool 10B includes a ratcheting tensioner 80B that, in conjunction with the anchor 90, operatively attaches the first end 71 of the fastener 70 to the base 50. The second end 72 of the fastener 70 is operatively connected to the base 50 by a quick connect coupling 100B. In this embodiment and unless otherwise specified, various aspects of the tool 10B not described herein are similar in nature to corresponding aspects of the tool 10A shown in FIGS. 1 through 3.

As shown, the tool 10B includes a handgrip 60 connected to a base 50 by one or more legs 63. In this embodiment, the tool 10B can comprise a unitary body, wherein the base 50, the one or more legs 63, and the handgrip 60 are integral to each other.

Furthermore, the first end 71 of the fastener is connected to a ratcheting tensioner 80B that operatively connects the first end 71 of the fastener 70 to the base 50. The ratcheting tensioner 80B can include a drum 131, a pawl 132, teeth 133 engaged by the pawl, and a ratchet handle 134 for rotating the drum 131 in order to wind the fastener 70 around the drum 131 and to exert tension on the fastener 70. The ratcheting tensioner 80B can be positioned on an outside surface 53 of the base 50 and connected to the base 50 through an anchor 90, as shown in FIG. 10.

The second end 72 of the fastener 70 can be connected to a hook 120, which is configured to engage a depression 55 or aperture in the base 50 by being inserted into the depression 55. The hook 120 and depression 55 together define a quick connect coupling 100B, which can be used to quickly, easily, and selectively engage the second end 72 of the fastener 70 to the base 50.

FIG. 10 depicts the tool 10B in a connected configuration, (i.e. the quick connect coupling 100B is operatively joining the second end 72 of the fastener 70 to the base 50) but in an unclamped state in which the fastener 70 is not under tension (i.e. the tool 10B is not clamping the pipe 20).

Although not shown in FIG. 10 to be in a clamped state, the handgrip 60 has a longitudinal axis 61 that is substantially parallel to a longitudinal axis 21 of the associated pipe 20. It will be understood that such configuration of the longitudinal axis 61 of the handgrip 60 with respect to the longitudinal axis 21 of an associated pipe 20 will be maintained upon clamping of the pipe 20 in the tool 10B.

In order to engage the tool 10B to the associated pipe 20 and clamp the pipe 20 between the fastener 70 and the base 50, the second end 72 of the fastener 70 can be disengaged from the base 50 by removing the hook 120 from the depression 55 in the base 50. In this way, the inside surface 52 of the base 50 can be placed on the pipe 20 as shown, and the free end (i.e. second end 72) of the fastener 70 can be wrapped around a perimeter of the pipe 20. The hook 120 can then be reinserted in the depression 55 as shown in FIG. 10. In this way, the perimeter of an associated pipe 20 is completely surrounded by the fastener 70 in combination with the base 50.

In order to securely grip or clamp the pipe 20 with the tool 10B, the ratcheting tensioner 80B can be operated to exert tension on the fastener 70 by using the ratchet handle 134 to turn the drum 131 and wind the fastener 70 around the drum 131. By using the ratcheting tensioner 80B, an operator can adjust a length of the fastener 70 extending between the ratcheting tensioner 80B and anchor 90, and the quick connect coupling 100B to correspond to the linear distance around the outside circumference of the pipe. Further ratcheting will exert tension on the fastener 70 to clamp the pipe 20 between the fastener 70 and the base 50.

In order to remove the associated pipe 20 from the tool 10B, tension may be released from the fastener 70 by disengaging the pawl 132 from the teeth 133 so that the fastener 70 can unwind from the drum 131. The hook 120 may then be removed from the depression 55 in order to operatively disconnect the second end 72 of the fastener 70 from the base 50 and to remove the tool 10B from the pipe 20.

Figure 11:
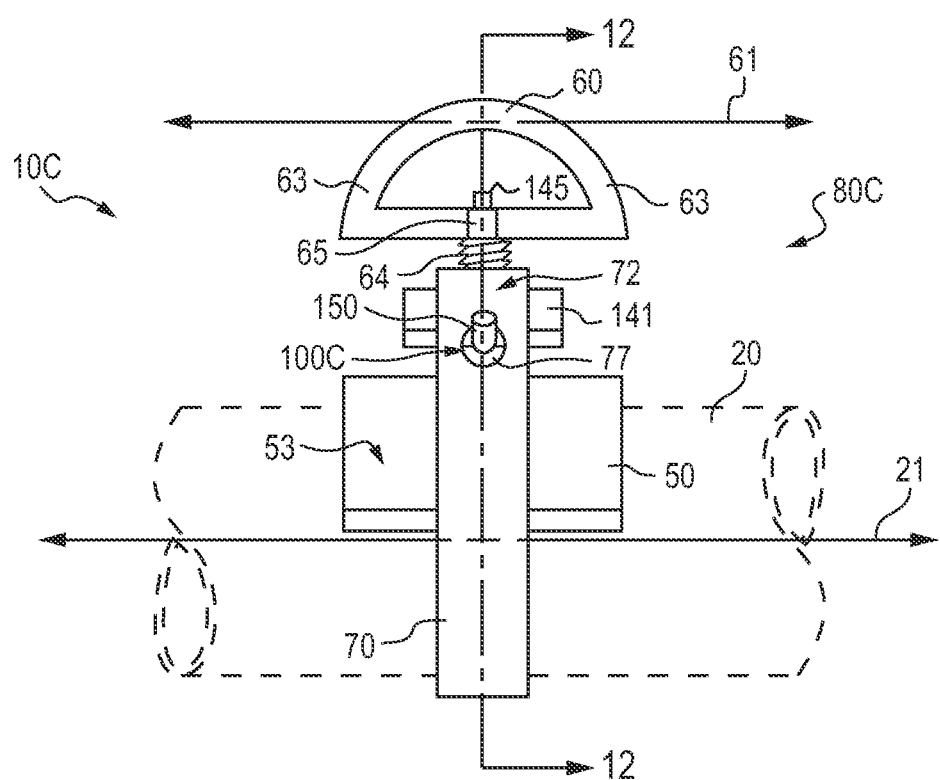
FIG. 11 is a schematic side view of a tool in accordance with the present disclosure.
Figure 12:
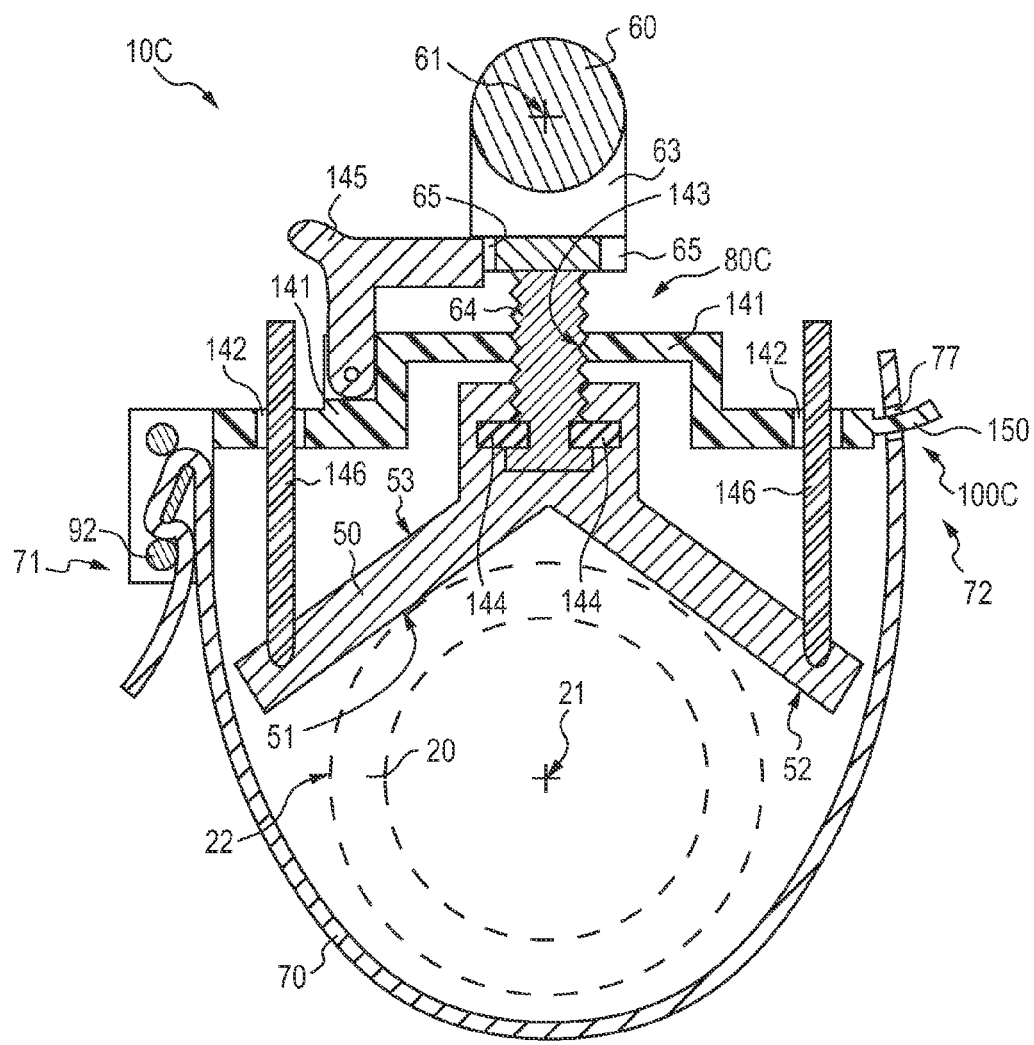
FIG. 12 is a schematic cross-sectional view of the tool in FIG. 11 taken through line 12-12.

Another exemplary embodiment tool is shown in FIGS. 11 and 12. As shown, the tool 10C includes a handgrip 60 with a longitudinal axis 61. The handgrip 60 is operatively connected to the base 50. More specifically, the handgrip 60 is attached by one or more legs 63 to a threaded part 64. The threaded part 64 is attached to the base 50 with a retaining ring 144 that retains the threaded part 64 to the base 50 and allows rotation of the threaded part 64 about its longitudinal axis. As shown in FIG. 11, the handgrip 60 and legs 63 together form a generally D-shaped handle for the tool 10C.

The tool 10C includes a fastener 70 operatively connected to the base 50, and a threaded tensioner 80C for exerting tension on the fastener 70. The tensioner 80C comprises a plate 141 having a threaded portion 143 for engaging the threaded part 64. The plate 141 includes guide holes 142 sized to receive guides 146 extending from the outer surface 53 of the base 50. The guides 146 and guide holes 142 are configured to resist rotation of the plate 141 when the handgrip 60 and threaded part 64 are rotated.

The plate 141 includes an anchor, shown for example to comprise a strap adjuster 92, for attaching a first end 71 of the fastener 70 to the plate 141. The strap adjuster 92 can be used to adjust a length of the fastener 70 extending between the strap adjuster 92 and the quick connect coupling 100C. It will be appreciated, that any other type of anchor as described herein can be used in place of, or in combination with, the strap adjuster 92.

The plate 141 also includes a finger 150 that is sized to be inserted through an aperture 77 in the second end 72 of the fastener 70, thereby defining a quick connect coupling 100C that operatively connects the fastener 70 to the base 50.

The tool 10C is configured, such that rotation of the handgrip 60 causes the threaded part 64 to rotate around a longitudinal axis of the threaded part 64. As the threaded part 64 rotates, the threaded portion 143 of plate 144 engages the threaded part 64 and the plate 141 thereby moves, i.e., is linearly displaced, in relation to the base 50. As the threaded part 64 is rotated, the guides 146 extend through the guide holes 142 in the plate 141 and thereby inhibit rotation of the plate 141 relative to the base 50.

Rotating the threaded part 64 in one direction causes the plate 141 to move towards the base 50; and rotating the threaded part 64 in the opposite direction causes the plate 141 to move away from the base 50. Because the pipe 20 is positioned between the fastener 70 and the base 50, movement of the plate 141 away from the base 50 thereby exerts tension on the fastener 70 and clamps the pipe 20 between the fastener 70 and the base 50.

The tool 10C can also include a lock 145 for resisting rotational movement of the handgrip 60 and threaded part 64. The lock 145 may be biased, for example by a spring (not shown), to a locked position as shown in FIGS. 11 and 12. When in a locked position, the lock 145 can reside within a notch 65 in the handgrip 60. The lock 145 inhibits rotation of the handgrip 60 in a rotational direction in relation to the base 50, and thereby allows the tool 10C to be used to move or otherwise manipulate the associated pipe 20 without further unwanted rotation of the handgrip 60.

As shown, the tool 10C includes two notches 65 on either side of the tool 10C. These two notches 65 can be used to lock the handgrip in a rotational position such that a longitudinal axis 61 of the handgrip 60 is substantially parallel to a longitudinal axis 21 of an associated pipe 20. However, it will be understood that the tool 10C can include fewer or more notches, which may be able to lock the handgrip in other positions relative to the pipe, such as for example, in a position such that the longitudinal axis 61 of the handgrip 60 is transverse to, but not intersecting, a longitudinal axis 21 of the associated pipe 20.

In order to attach the tool 10C to an associated pipe 20, the fastener 70 is disconnected from the plate 141 by removing the second end 72 from the finger 150. The free end (i.e. the second end 72) of the fastener 70 is then wrapped around the pipe 20 and reconnected to the plate 141 by inserting the aperture 77 over the finger 150. Course adjustment of fastener 70 may be accomplished by pulling an end 79 to shorten or lengthen fastener 70 through strap adjuster 92. The handgrip 60 is then rotated to thereby move the plate 141 away from the base 50, which exerts tension on the fastener 70 and clamps the pipe 20 between the fastener 70 and the base 50. The lock 145 can then be inserted into notch 65 to rotationally lock the handgrip 60 with respect to the base 50.

In order to remove the associated pipe 20 from the tool 10C, the lock 145 is moved out of a notch 65 and the handgrip 60 is rotated in an opposite direction from that previously performed for clamping, to thereby rotate the threaded part 64 in the opposite direction. Such opposite rotation of the threaded part 64 moves the plate 141 toward to the base 50 and decreases tension on the fastener 70 to allow for removal of the second end 72 of the fastener 70 from the finger 150 on the plate 141.

Figure 13:
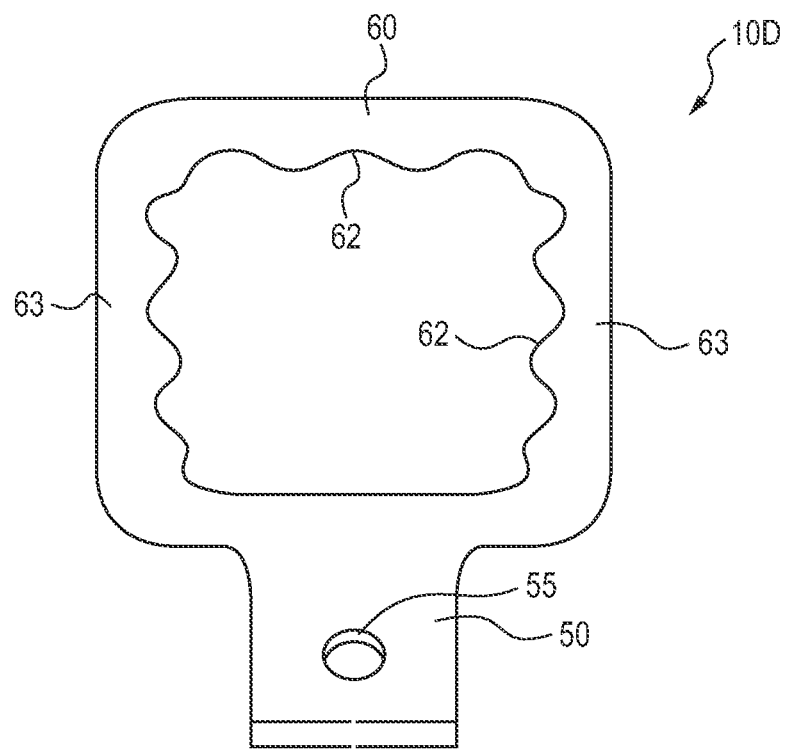
FIG. 13 is a schematic side elevational view of a tool in accordance with the present disclosure.

In another embodiment as shown in FIG. 13, a tool 10D includes finger recesses 62 on the handgrip 60, and optionally on the one or more legs 63, to aid in securely gripping the tool 10D by hand. In this embodiment, the tool 10D can comprise a one-piece device made from injection molded polymer material, for example. Although not shown, it will be understood that the tool 10D will also include a fastener, tensioner, anchor, and a quick connect coupling.

Figure 14:
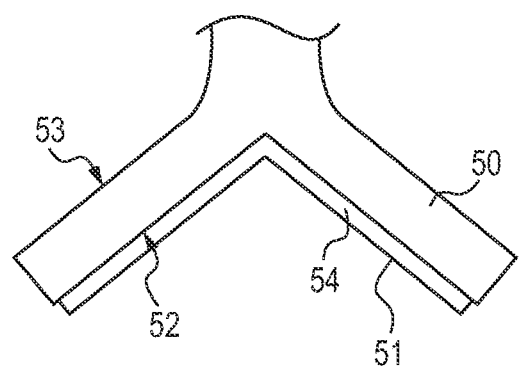
FIG. 14 is a schematic front elevational view of a base in accordance with the present disclosure.

In another embodiment as shown in FIG. 14, a base 50 can optionally include an elastomer polymer material 54 applied to the inside surface 52 of the V-shaped base 50, thereby defining the engaging surface 51. Such elastomer polymer material 54 can be used to provide increased friction between the tool and an associated pipe to resist movement of the pipe relative to the base 50 when the pipe is clamped by the tool.

Figure 15:
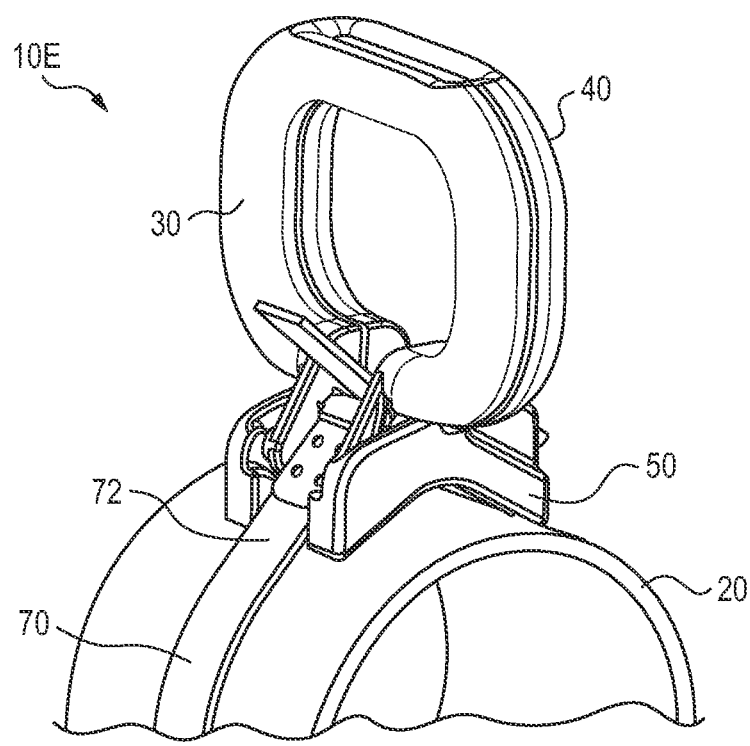
FIG. 15 is a perspective view of another tool in accordance with the present disclosure.
Figure 16:
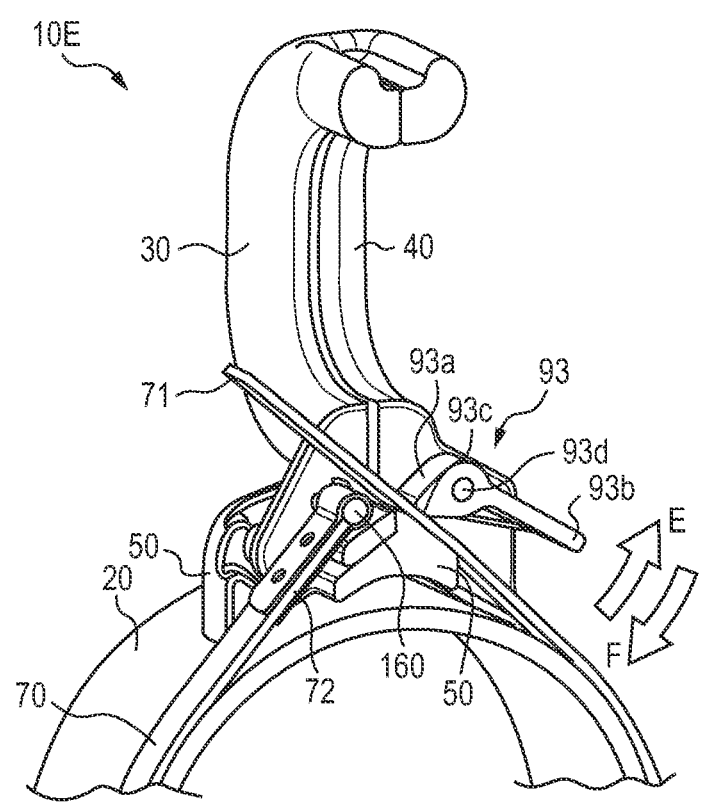
FIG. 16 is a perspective cross sectional view illustrating the tool of FIG. 15.
Figure 17:
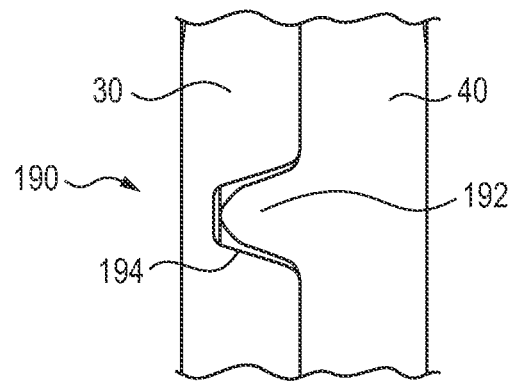
FIG. 17 is a detailed view of an alignment feature used in the too of FIG. 15.

FIGS. 15-19 illustrate another tool 10E in accordance with the present subject matter. The tool 10E comprises a base 50, a first handle portion 30, a second handle portion 40, and a fastener 70. The handle portions 30, 40 are sized and shaped to fittingly engage each other upon closure of the handle portions. In certain versions, the handle portions are halves of a handle which are generally symmetrical relative to one another. The fastener 70 includes a first end 71 and a second end 72 attached to the base 50 and/or the first handle portion 30 by a connector 160. The tool 10E also comprises a cam buckle 93 pivotally attached to the base 50 and configured to releasably engage the fastener 70. As shown in FIG. 16, the cam buckle 93 defines a head end 93a, an opposite handle end 93b, and optional teeth 93c disposed on the head end for promoting engagement with the fastener 70. The cam buckle 93 is pivotally positionable about a post 93d as shown by arrows E and F. The cam buckle 93 can include biasing provisions that urge the cam buckle 93 toward movement in the direction of arrow E for example to engage the fastener 70. The tool 10E is used to engage a pipe, such as pipe 20, by positioning the fastener 70 about the pipe 20, and inserting the fastener end 71 between the head end 93a of the cam buckle 93 and the base 50, and pulling the end 71 to thereby apply tension to the fastener 70. The cam buckle 93 provides quick adjustment of the length of fastener 70 and hence tension.

Figure 18:
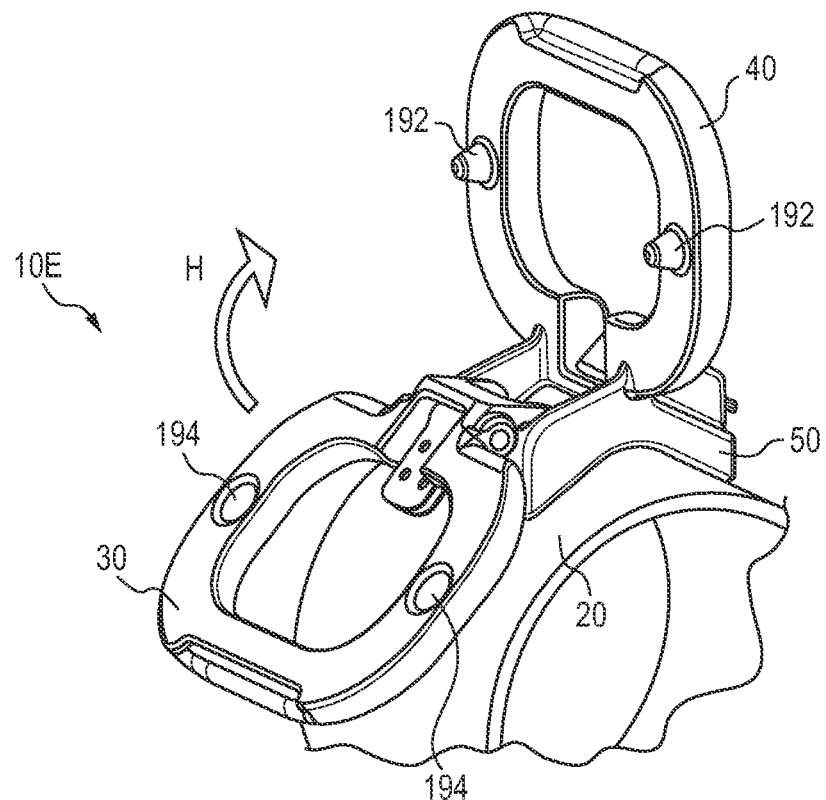
FIG. 18 is another perspective view of the tool of FIG. 15 illustrating the alignment feature.
Figure 19:
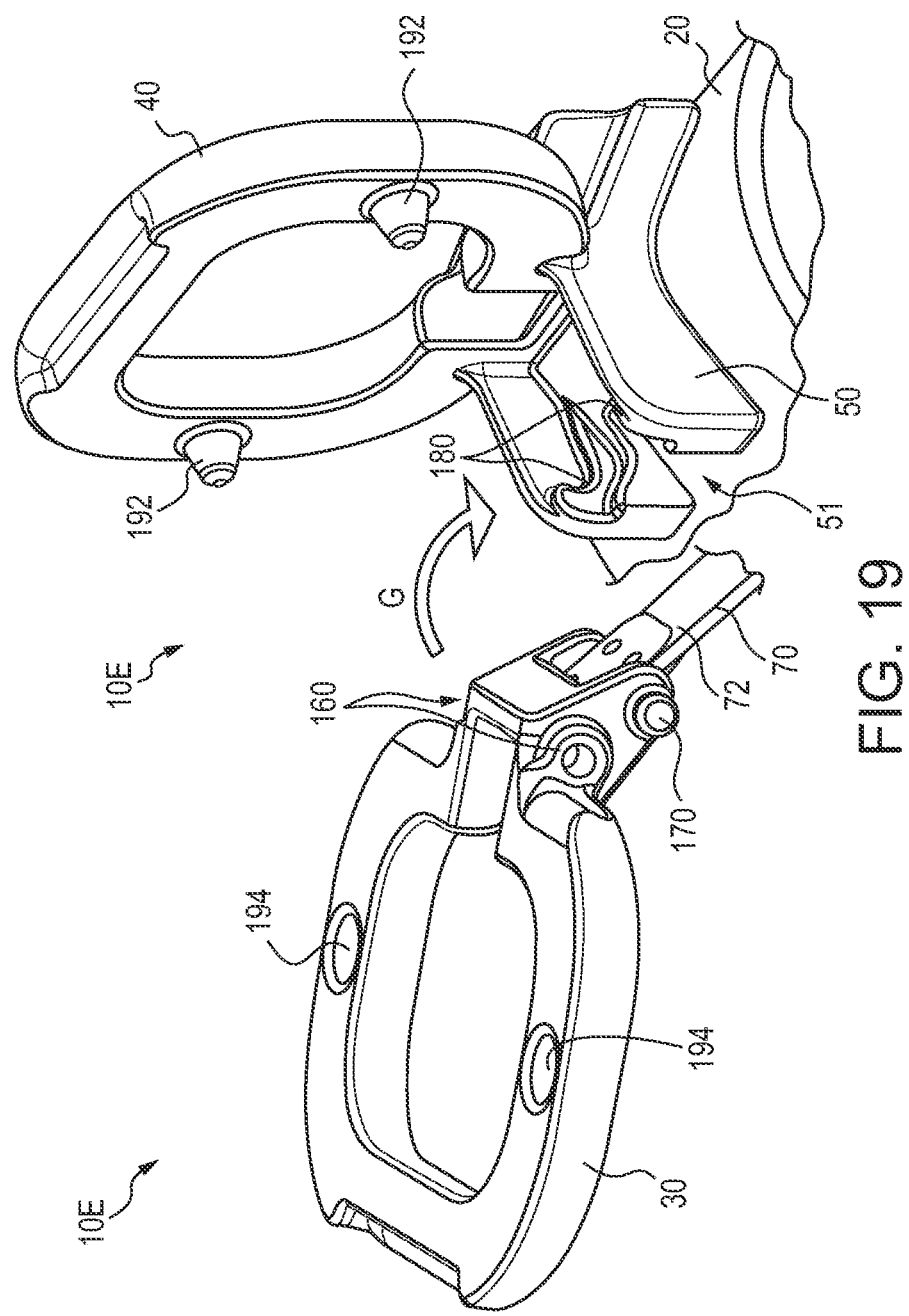
FIG. 19 is another perspective view of the tool of FIG. 15 depicting engagement between portions of the tool.

The tool 10E also includes handle tensioning provisions which function to apply tension to the fastener (or reduce an effective length of the fastener) upon displacing one or both handles 30, 40 from an open position (such as shown in FIGS. 18 and 19) to a closed position (as depicted in FIG. 15). In the particular embodiment shown in the referenced figures, the handle tensioning provisions comprise one or more, and particularly a pair of, projections or shoulders 170 formed in the handle portion 30 which are sized and shaped to be received within capture regions 180 defined in the base 50. Thus, the projections are fittingly engageable within the capture regions. More specifically, upon positioning the shoulders 170 within the capture regions 180, as shown by arrow G in FIG. 19, the handle portion 30 is pivotally positionable therein. As a result of the spacing between the connector 160 and the shoulders 170, when the shoulders 170 are captured and received in regions 180, upon pivoting the handle portion 30 in the direction of arrow H in FIG. 18, tension is applied to the fastener 70.

Specifically, upon placing the handle portion 30 into an initial "open" engagement position with the base 50 and handle portion 40, the pair of shoulders 170 are received within the capture regions 180. As the handle portion 30 is pivoted toward the handle portion 40 such that the handles are "closed", the shoulders 170 slide along inclined cam surfaces of the capture regions 180. During this displacement of the handle portion 30, increasing tension is applied to the fastener 70. As closure of the handles continues, the position of an axis extending through the shoulders 170 is relocated to an opposite side of the fastener end 72. This change in position of the shoulders 170 relative to the fastener end 72 results in maintenance of the tension applied to the fastener 70. In addition, upon positioning the handle portions together to a closed position, tension on the fastener serves to maintain the closed position of the handle portions. This configuration of shoulders 170 and capture regions 180 incorporated into the handle portion 30 and the base 50 is referred to periodically herein as a "toggle mechanism" and is described in greater detail herein and particularly with regard to FIGS. 26A-26C.

In certain embodiments, the handle portion 30 and the base 50 are configured so that upon initially engaging the handle portion 30 with the base 50, and positioning the handle 30 to an open position; the tension of the fastener 70 can be adjusted typically by releasing the cam buckle 93 and pulling the loose end 71 of the fastener 70. During this operation, the handle portion 30 and the base 50 are configured such that the handle portion 30 is frictionally retained within the base rather than becoming disengaged and separated therefrom. That is, the handle portion 30 is adjustably positionable while frictionally engaged with the base. In particular versions, the capture regions 180 include a resting surface on which the shoulders 170 are positioned during this initial engagement between the handle portion 30 and the base 50.

The tool 10E also includes alignment provisions 190 that promote aligned engagement between the handle portions 30 and 40. The alignment provisions 190 can be in a variety of different forms and configurations however as depicted in the referenced figures includes one or more projections 192 extending from a face of the second handle portion 40, and one or more receiving recesses 194 defined along a face of the first handle portion 30. The projections 192 and the recesses 194 are located relative to their respective handle portions 30, 40 such that upon closing the handles to the position shown in FIG. 15, each projection 192 extends at least partially into a corresponding recess 194. It will be understood that the present subject matter includes alternate arrangements such as providing the projections 192 with the handle portion 30 and the recesses 194 with the handle portion 40. The alignment provisions serve to increase stability of the tool particularly during states in which the handles are closed and the fastener is tensioned.

In many embodiments, the base 50 defines one or two passages 51 each of which has a width at least as great as the fastener 70. Each passage 51 is located proximate a handle portion (reference being made to the handles being in a closed position). Passage(s) 51 enable the fastener 70 to extend within the passage at a variety of different orientations which may result from gripping pipes of different diameters. Typically upon closing the handle portion(s), the fastener extends within or is at least partially located within the passage(s).

Figure 20:
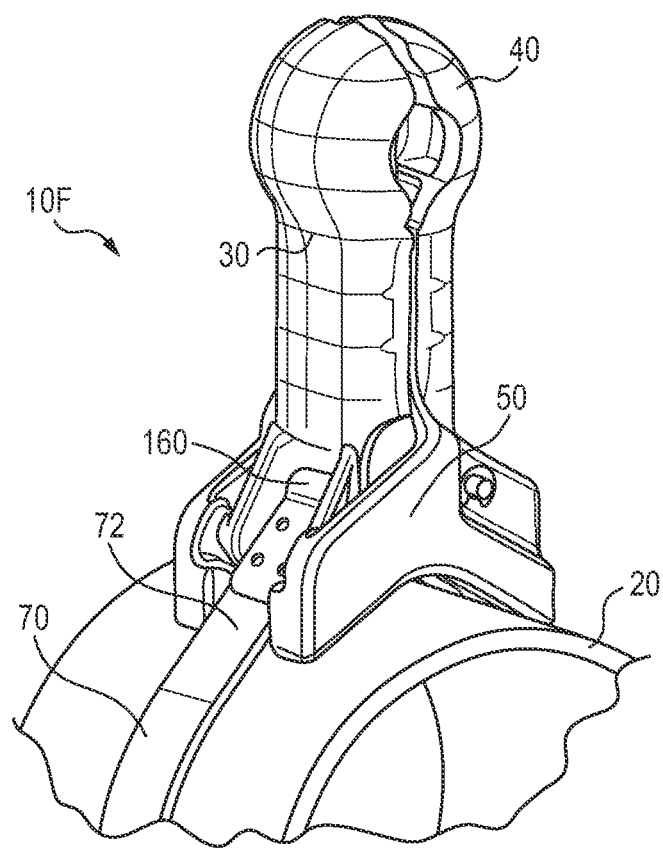
FIG. 20 is a perspective view of another tool in accordance with the present disclosure.
Figure 21:
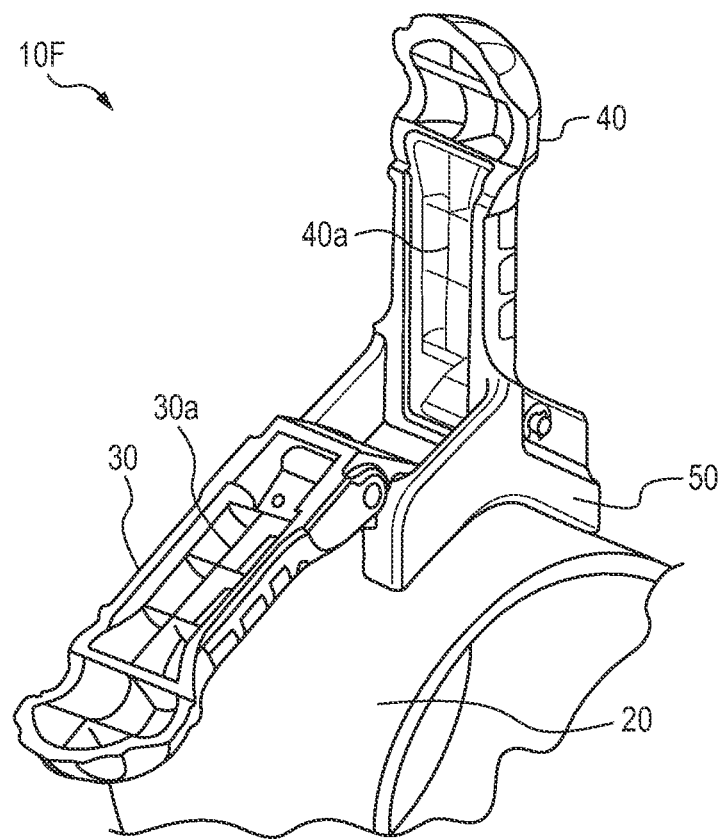
FIG. 21 is another perspective view of the tool shown in FIG. 20.
Figure 22:
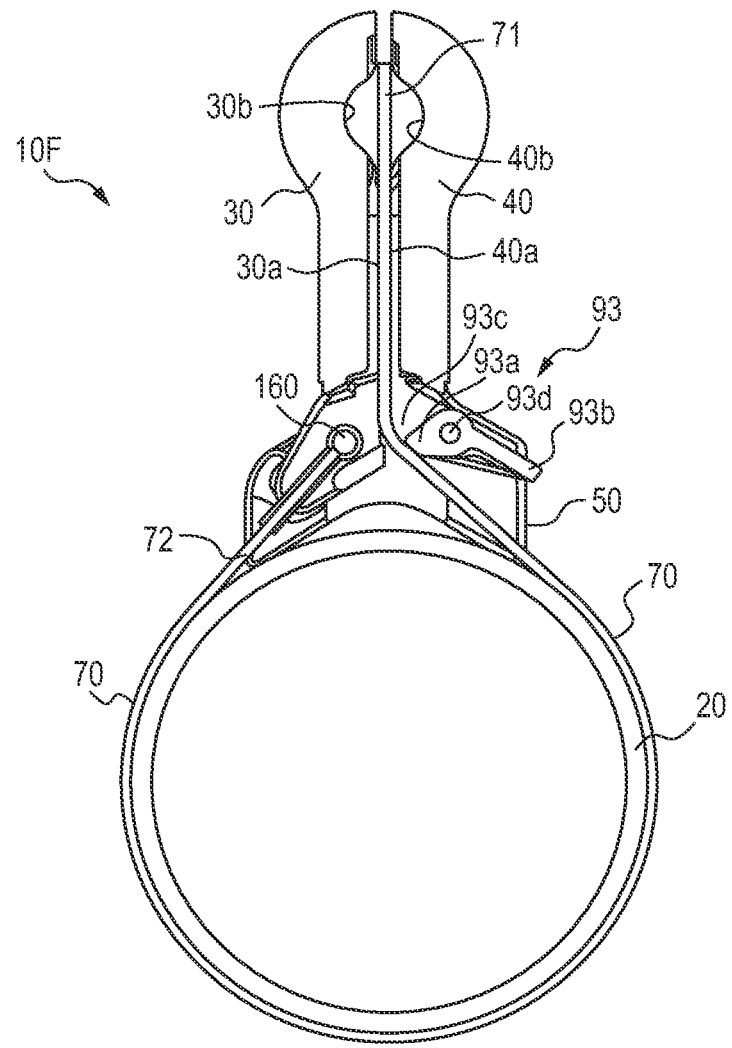
FIG. 22 is a cross sectional view of the tool depicted in FIG. 20.
Figure 23:
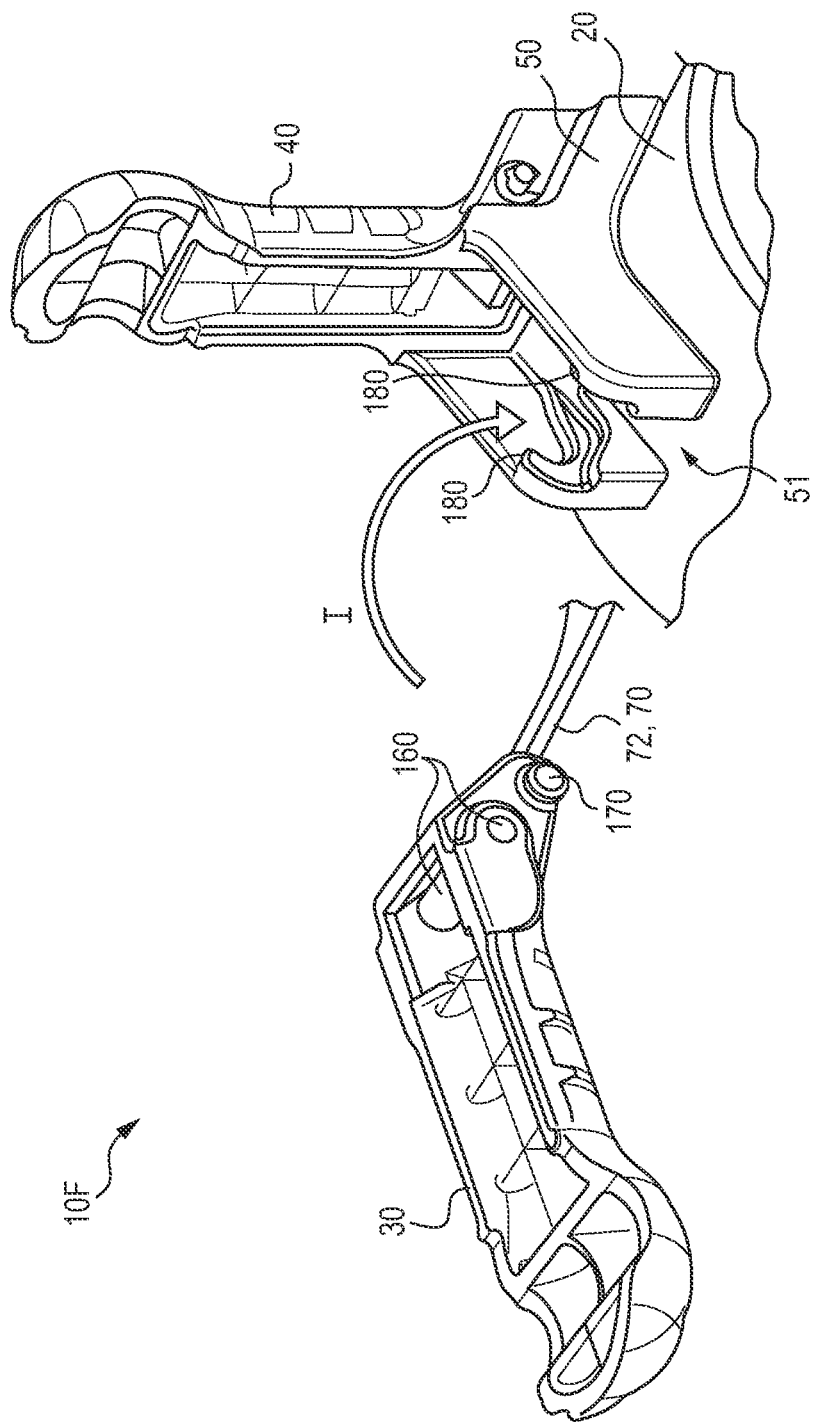
FIG. 23 is another perspective view of the tool of FIG. 20 showing engagement between portions of the tool.

FIGS. 20-23 illustrate another tool 10F in accordance with the present subject matter. The tool 10F is similar in many respects to the previously described tool 10E, except for the shape of the handle. The tool 10F comprises a base 50, a first handle portion 30, a second handle portion 40, and a fastener 70. The handle portions 30, 40 can be symmetrical halves that fittingly engage each other upon closure. The base 50 can define one or more passages 51 as previously described. The fastener 70 includes a first end 71 and a second end 72 attached to the base 50, and/or first handle portion 30 by a connector 160. The tool 10F also comprises a cam buckle 93 pivotally attached to the base 50 and configured to releasably engage the fastener 70. As shown in FIG. 22, the cam buckle 93 defines a head end 93a, an opposite handle end 93b, and optional teeth 93c for promoting engagement with the fastener 70. The cam buckle 93 is pivotally positionable about a post 93d. The cam buckle 93 can include biasing provisions that urge the cam buckle 93 toward movement so as to engage the fastener 70. The tool 10F is used to engage a pipe, such as pipe 20, by positioning the fastener 70 about the pipe 20, and inserting the fastener end 71 between the head end 93a of the cam buckle 93 and the base 50, and pulling the end 71 to thereby apply tension to the fastener 70.

The tool 10F also includes handle tensioning provisions which function to apply tension to the fastener (or reduce an effective length of the fastener) upon displacing one or both handles 30, 40 from an open position (such as shown in FIG. 21) to a closed position (as depicted in FIGS. 20 and 22). In the particular embodiment shown in the referenced figures, the handle tensioning provisions comprise one or more, and particularly a pair of, projections or shoulders 170 formed in the handle portion 30 which are sized and shaped to be received within capture regions 180 defined in the base 50. More specifically, upon positioning the shoulders 170 within the capture regions 180, as shown by arrow I in FIG. 23, the handle portion 30 is pivotally positionable therein. As a result of the spacing between the connector 160 and the shoulders 170, when the shoulders 170 are captured and received in regions 180, upon pivoting the handle portion 30 in the direction of arrow I in FIG. 23, tension is applied to the fastener 70.

The tool 10F also includes supplemental fastener engagement provisions in which a portion of the fastener 70, and specifically the first end 71 opposite the attached end 72, is engaged and captured between the handle portions 30, 40 upon closing those handle portions together as illustrated in FIG. 22. Specifically, in many embodiments, the fastener 70 is captured by contacting both interior faces 30a and 40a of the handle portions 30, 40 upon closing the handles together. Such contact results in frictional engagement between the fastener 70 and handle portions 30, 40 and further secures the fastener 70. In particular embodiments, the handle portions 30, 40 are configured such that at closure of the handle(s), an end of the fastener can be disposed between the handle portions.

In certain embodiments, each or both of the handle portions 30, 40 can be configured to include a grasping region such as regions 30b, 40b to facilitate separation of the handle portions from one another. The grasping regions such as 30b, 40b, can be provided in a variety of different shapes and arrangements however a curved recess as depicted in FIG. 22 enables a user to insert a finger into the region between the handle portions 30, 40, and displace the handle portions apart from one another.

Figure 24:
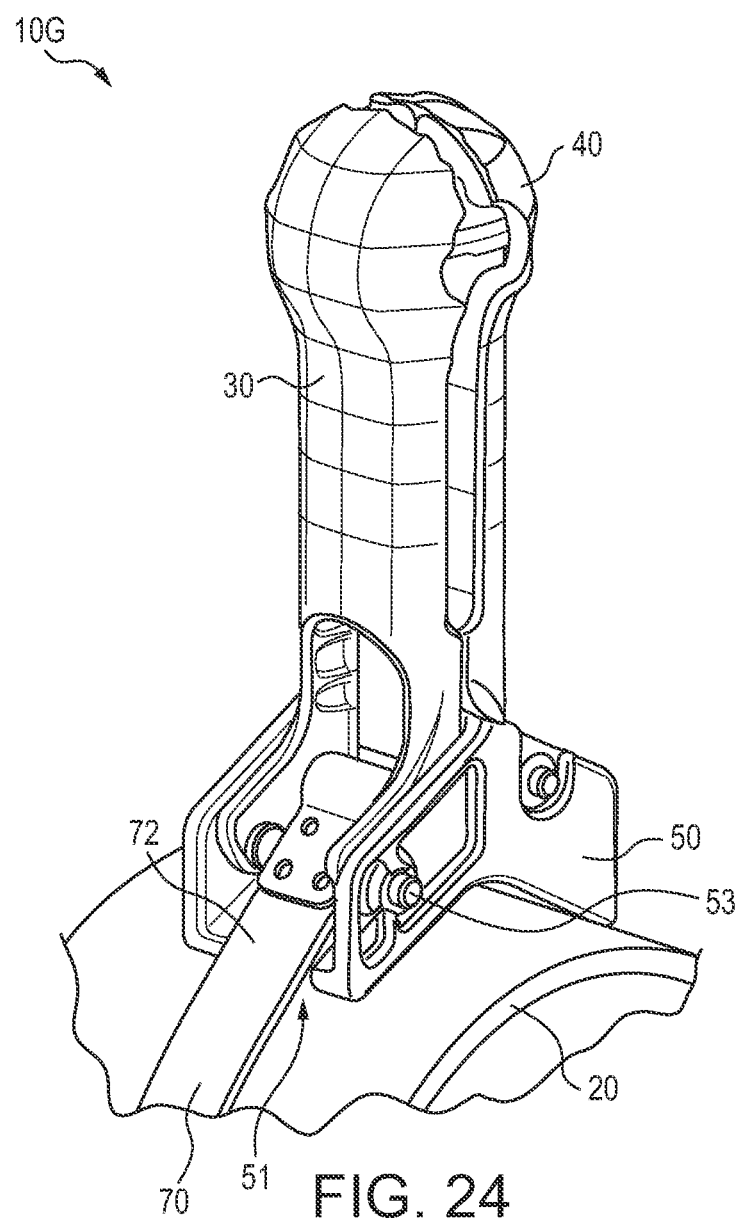
FIG. 24 is a perspective view of another tool in accordance with the present disclosure.
Figure 25:
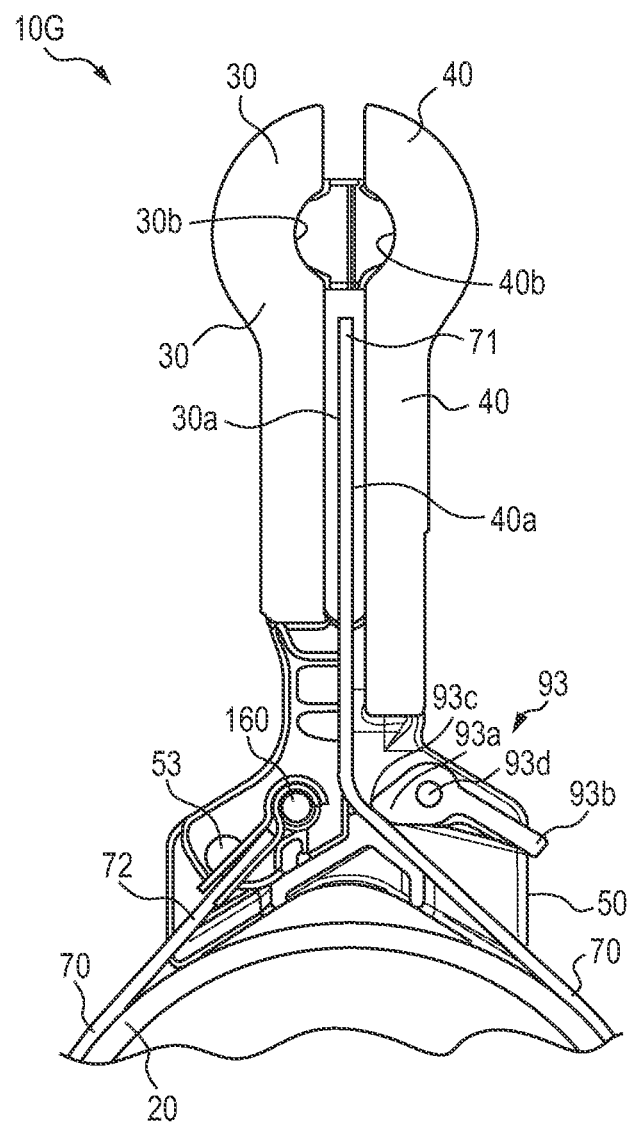
FIG. 25 is a cross sectional view of the tool depicted in FIG. 24.

FIGS. 24-27 illustrate another tool 10G in accordance with the present subject matter. The tool 10G is similar to the previously described tool 10E and includes handle alignment features. The tool 10G comprises a base 50, a first handle portion 30, a second handle portion 40, and a fastener 70. The base 50 can define one or more passages 51 as previously described. The fastener 70 includes a first end 71 and a second end 72 attached to the base 50 and/or first handle portion 30 by a connector 160. In certain embodiments, the second end 72 can include a hook 72a or other member so that the second end 72 of the fastener 70 is disengageable from the connector 160. The tool 10G also comprises a cam buckle 93 pivotally attached to the base 50 and configured to releasably engage the fastener 70. As shown in FIG. 25, the cam buckle 93 defines a head end 93a, an opposite handle end 93b, and optional teeth 93c for promoting engagement with the fastener 70. The cam buckle 93 is pivotally positionable about a post 93d. The cam buckle 93 can include biasing provisions that urge the cam buckle 93 toward movement so as to engage the fastener 70 for example. The tool 10G is used to engage a pipe, such as pipe 20, by positioning the fastener 70 about the pipe 20, and inserting the fastener end 71 between the head end 93a of the cam buckle 93 and the base 50, and pulling the end 71 to thereby apply tension to the fastener 70.

Figure 26:
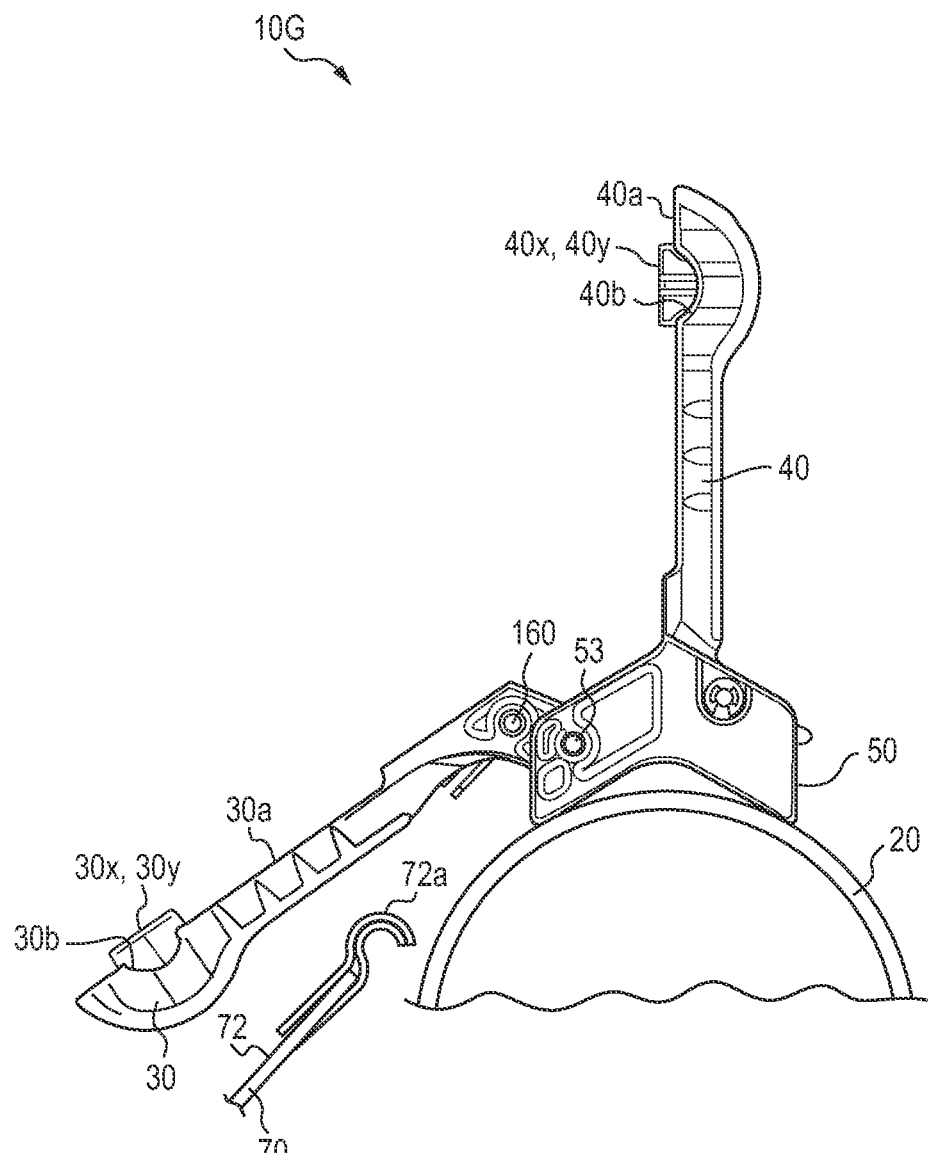
FIG. 26 is another view of the tool of FIG. 24 showing engagement between portions of the tool.

The tool 10G also includes handle tensioning provisions which function to apply tension (or reduce an effective length) of the fastener upon displacing one or both handles 30, 40 from an open position (such as shown in FIG. 26) to a closed position (as depicted in FIGS. 24 and 25). In the particular embodiment shown in the referenced figures, the handle tensioning provisions can be in the same or similar form as described in association with tools 10E and 10F. The previously described toggle mechanism can be used in the tool 10G.

In the particular version of the tool 10G shown in the referenced figures, the handle portion 30 is pivotally attached to the base 50 by a pivot pin 53. Although the pivot pin 53 precludes linear movement of the pivoting axis of the handle portion 30 relative to the base, a similar toggle mechanism is provided as previously described with regard to the tool 10E. Specifically, referring to FIGS. 25 and 26, upon positioning the handle portion 30 from an open position (as shown in FIG. 26) to a closed position (as shown in FIG. 25), the fastener 70 secured to connector 160 (and a tension force vector extending through the fastener 70) is repositioned from one side of the pivot pin 53 (FIG. 26) to an opposite side of the pivot pin 53 (as seen in FIG. 25). This is another example of a toggle mechanism.

Figure 26A:
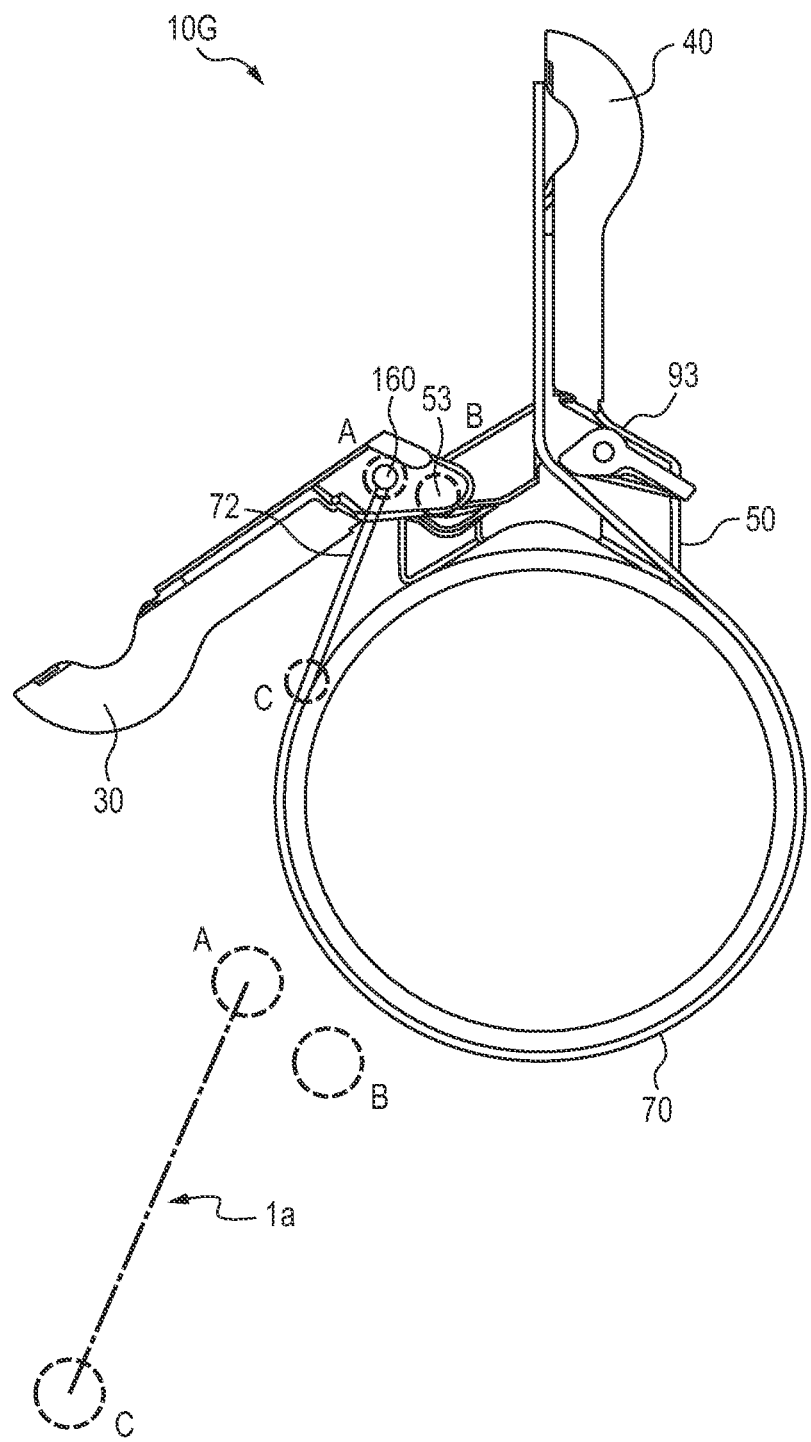
FIGS. 26A-26C are schematic views illustrating a toggle mechanism used in the tool of FIG. 24 and other tools.
Figure 26B:
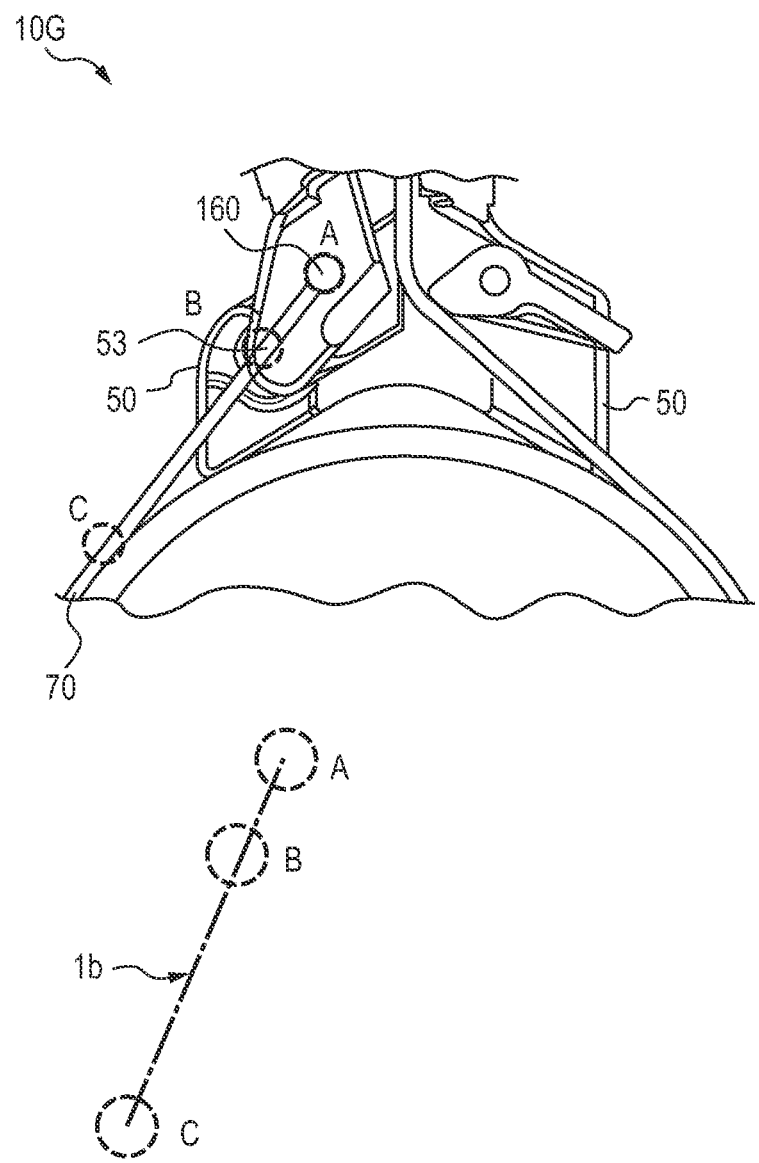
Figure 26C:
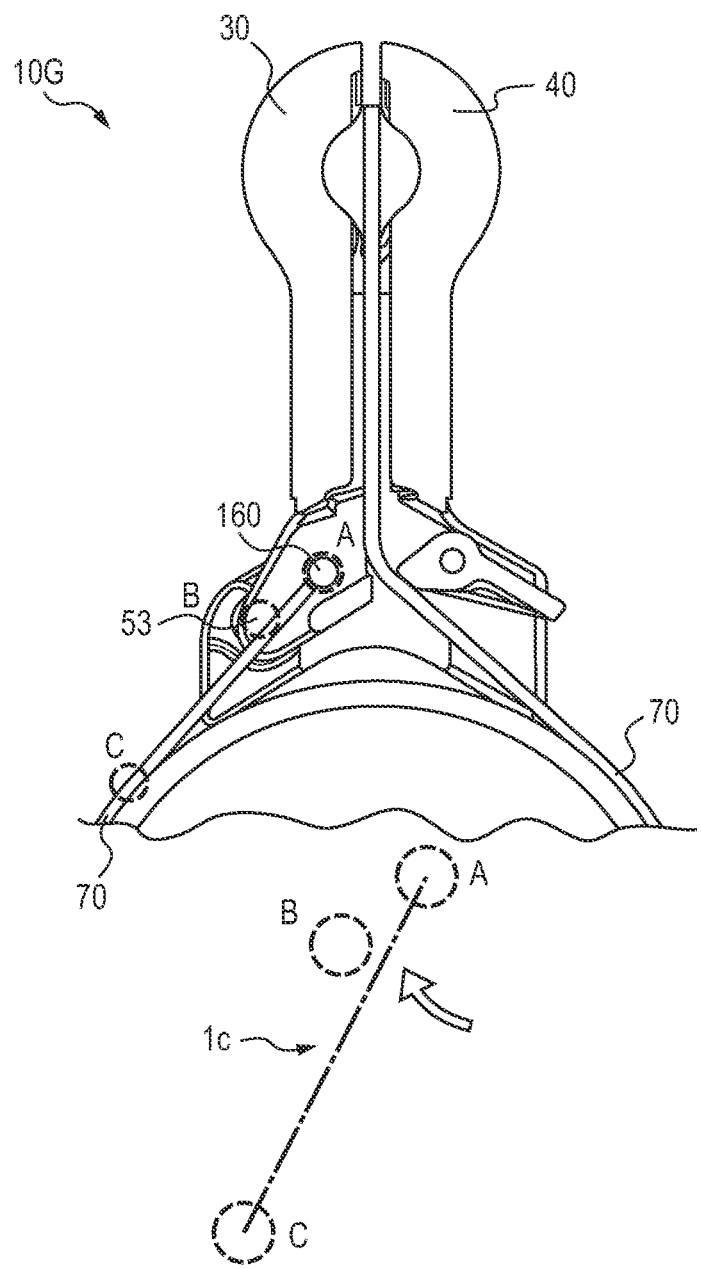

More specifically, FIGS. 26A-26C illustrate operation of the toggle mechanism embodied in the tool 10G. FIG. 26A depicts the handle portion 30 in an open position. In this state, the pivot pin 53 is located at location B and on one side of the point of attachment between the fastener end 72 and the handle 30, i.e., the connector 160, which is shown at location A. Upon positioning the handle portion 30 toward a closed position as shown in FIG. 26C, location A is repositioned to an opposite side of the pivot pin 53, i.e., location B. That is, in pivoting the handle portion 30 towards the closed position, the relative positions of locations A and B pass through the orientation shown in FIG. 26B to that depicted in FIG. 26C. In FIGS. 26A-26B, location C is shown as the point of contact between the fastener 70 and the pipe 70 which is closest to the base 50. In FIG. 26A, at an open handle position, the pivot pin 53, i.e., location B, is between the connector 160, i.e., location A, and a central region of the base 50. A captured length of the fastener 70 is shown as 12, i.e., the length of the fastener 70 extending between location C and the connector 160, i.e., location A. In FIG. 26B, as the handle is being closed, the distance between location C and the connector 160, i.e., Ib, is increased, thereby pulling the fastener 70 and increasing tension thereon. In FIG. 26C, upon closing the handle, location B, i.e., the pivot pin 53, passes "across" the fastener 70 and a tension vector extending therealong. Thus, in the handle closed position, tension of the fastener 70 exerts a force on connector 160, i.e., location A, and retains the closed position. The distance between location C and the connector 160 is 1c. In this particular embodiment, $1a<1c<1b$.

Figure 27:
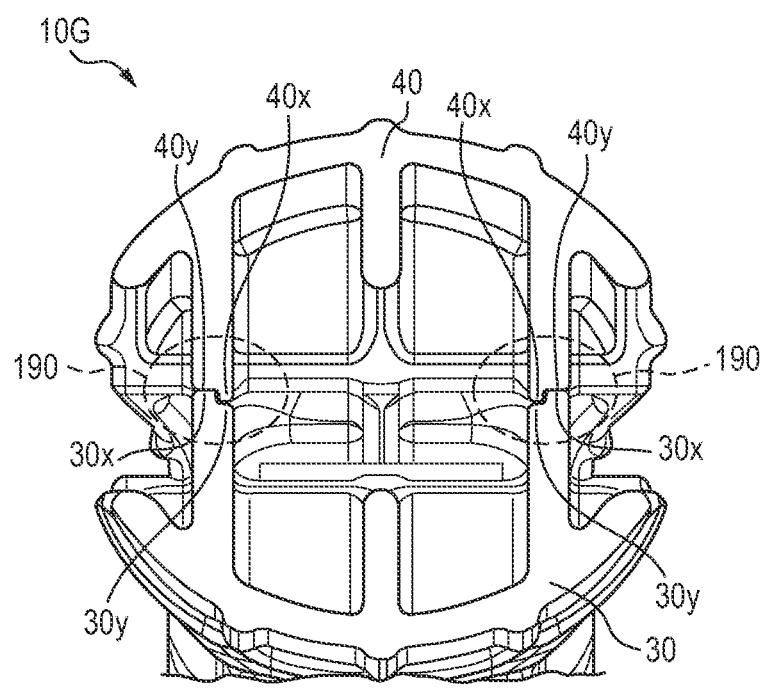
FIG. 27 is a detailed view showing an alignment feature used in the tool of FIG. 24.

The tool 10G also includes alignment provisions 190 that promote aligned engagement between the handle portions 30 and 40. The alignment provisions 190 can be in a variety of different forms and configurations however as depicted in FIG. 27 include one or more projections 40x extending from a face of the second handle portion 40, one or more projections 30x extending from a face of the first handle portion 30, one or more receiving recesses 40y defined along a face of the second handle portion 40, and/or one or more receiving recesses 30y defined along a face of the first handle portion 30. The projections 40x, 30x and the recesses 40y, 30y are located relative to their respective handle portions 30, 40 such that upon closing the handles to the position shown in FIG. 27, each projection 40x, 30x extends at least partially into a corresponding recess 40y, 30y. The alignment provisions serve to increase stability of the tool particularly during states in which the handle portions are closed and the fastener is tensioned. In this embodiment, the alignment provisions 190 are generally located within an interior region of the handle portions 30, 40.

The tool 10G also includes supplemental fastener engagement provisions in which a portion of the fastener 70, and specifically the first end 71 opposite the attached end 72, is engaged and captured between the handle portions 30, 40 upon closing those handle portions together as illustrated in FIG. 25. Specifically, in many embodiments, the fastener 70 is captured by contacting both interior faces 30a and 40a of the handle portions 30, 40 with the fastener 70 upon closing the handles together. Such contact results in frictional engagement between the fastener 70 and handle portions 30, 40 and further secures the fastener 70.

In certain embodiments, each or both of the handle portions 30, 40 can be configured to include a grasping region such as regions 30b, 40b to facilitate separation of the handle portions from one another. The grasping regions such as 30b, 40b, can be provided in a variety of different shapes and arrangements however a curved recess as depicted in FIG. 25 enables a user to insert a finger into the region between the handle portions 30, 40, and displace the handle portions apart from one another.

Figure 28:
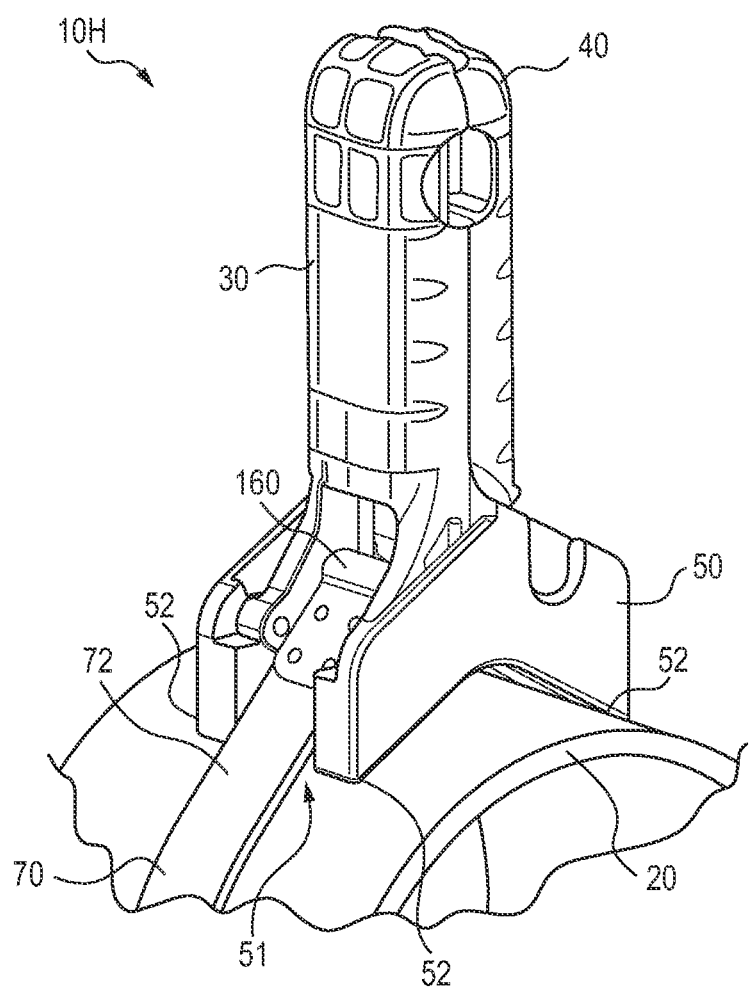
FIG. 28 is a perspective view of another tool in accordance with the present disclosure.
Figure 29:
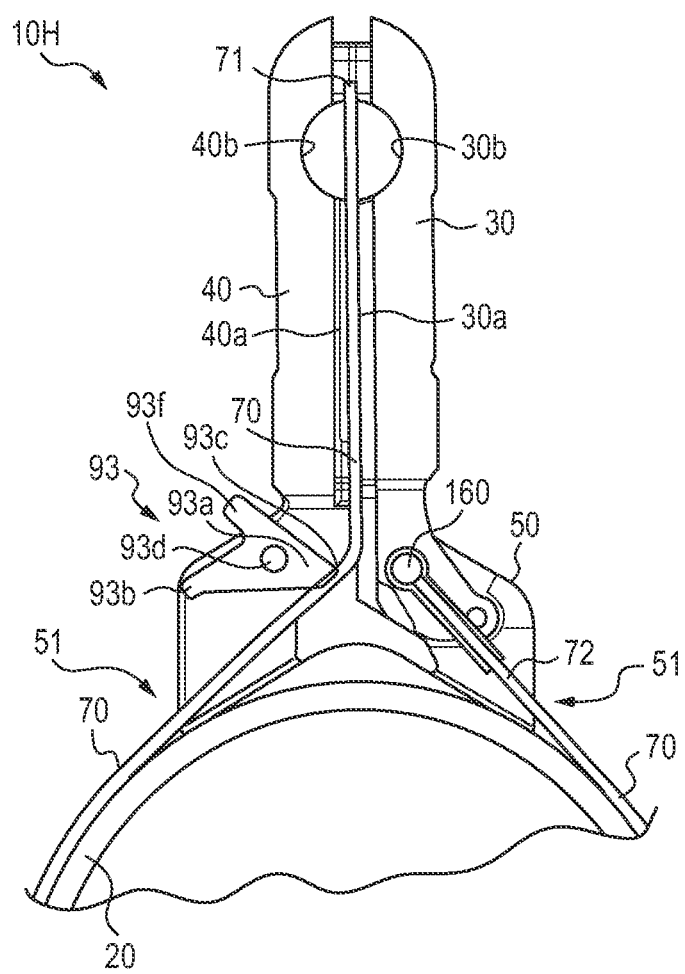
FIG. 29 is a cross sectional view illustrating the tool of FIG. 28.
Figure 30:
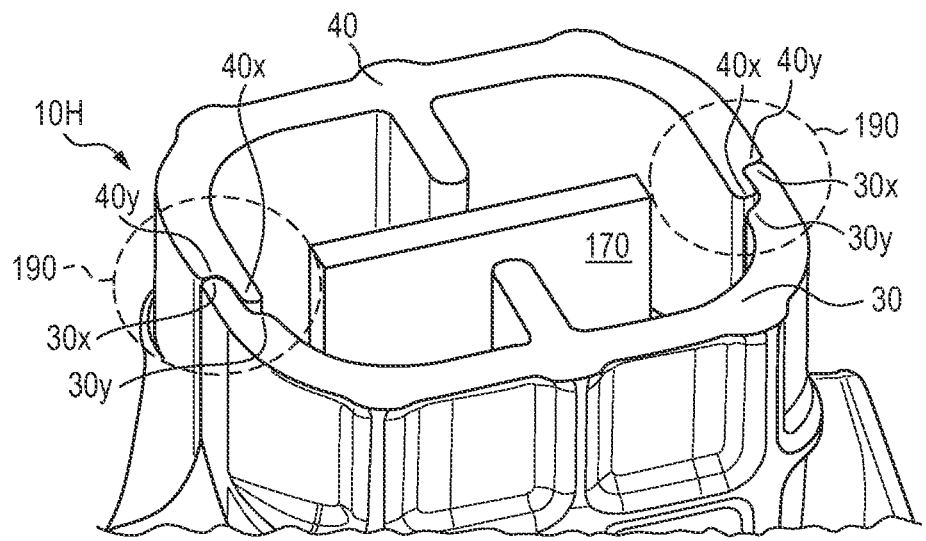
FIG. 30 is a detailed view of an alignment feature used in the tool of FIG. 28.
Figure 31:
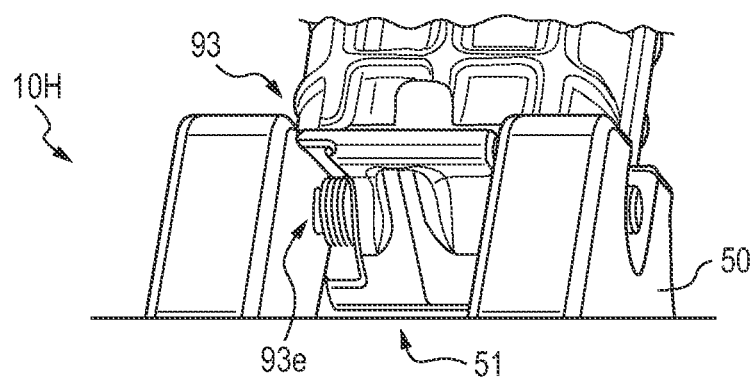
FIG. 31 is a detailed view of the tool of FIG. 28 illustrating a bias feature.
Figure 32:
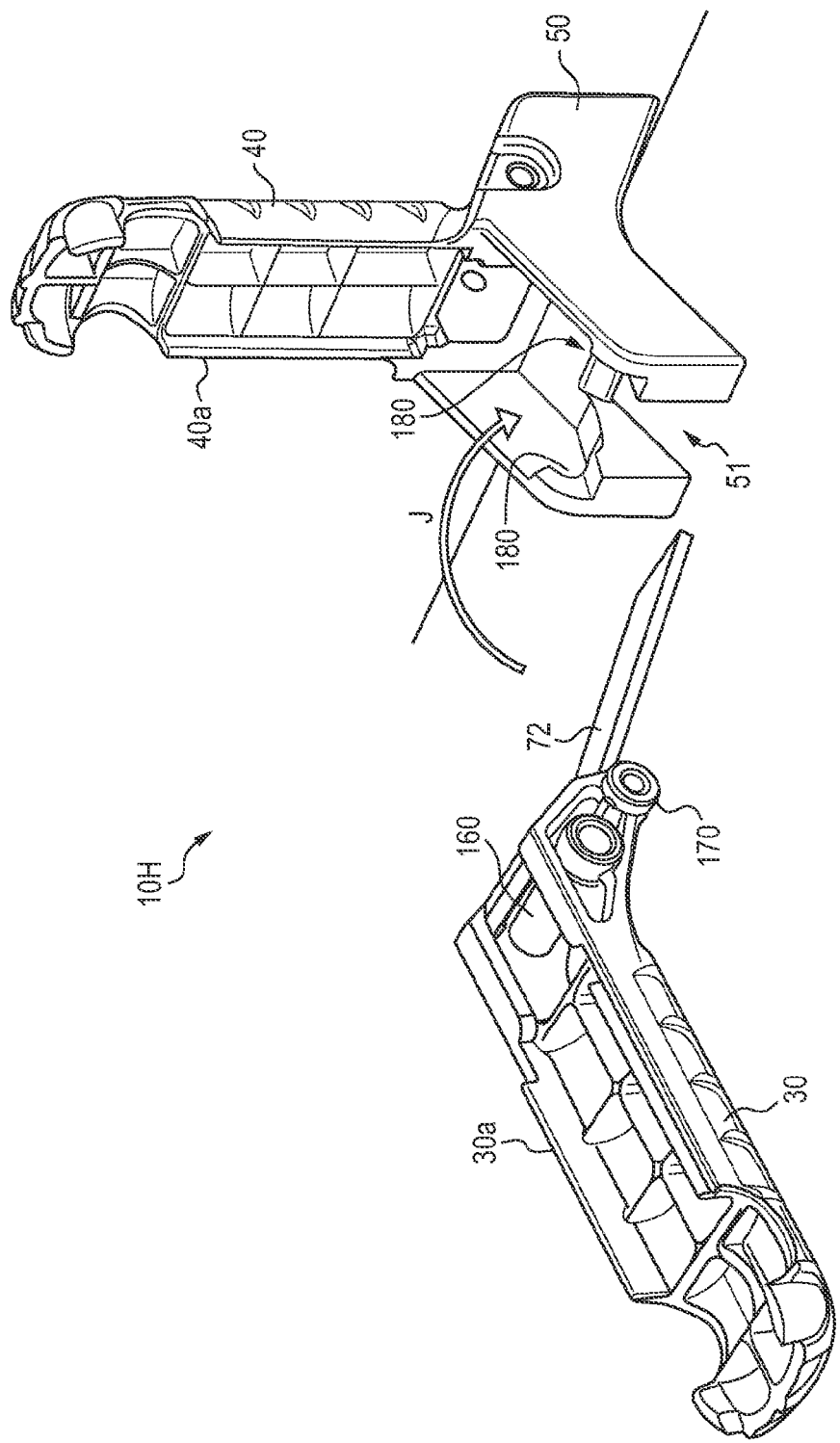
FIG. 32 is another perspective view of the tool of FIG. 28 depicting engagement between portions of the tool.
Figure 33:
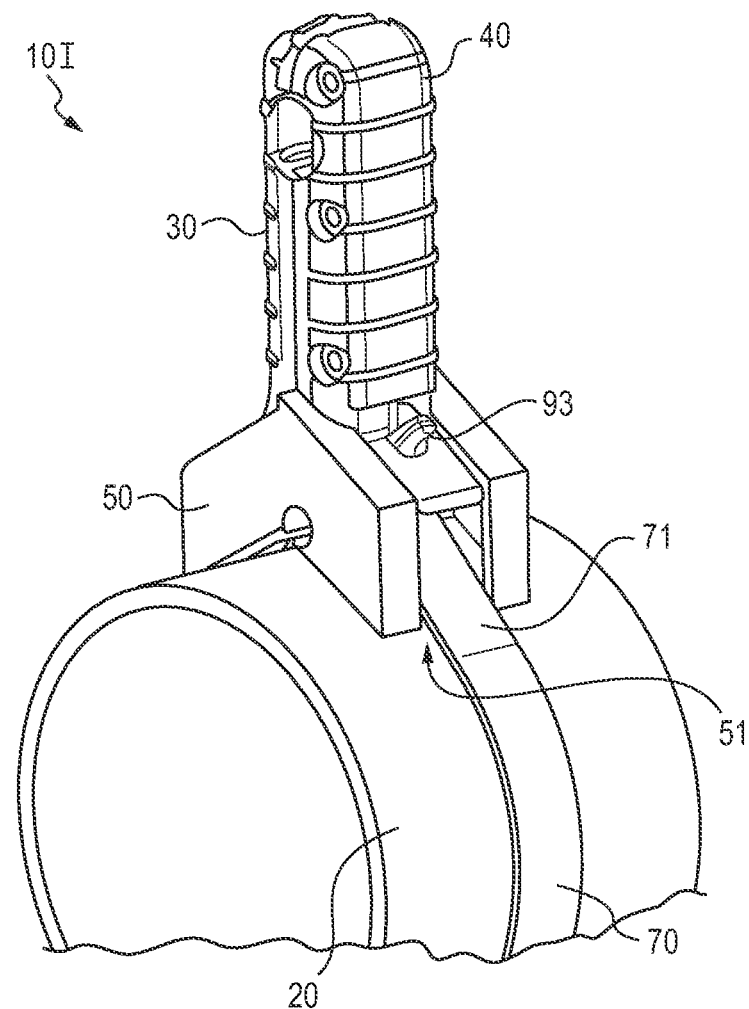
FIG. 33 is a perspective view of another tool in accordance with the present disclosure.
Figure 34:
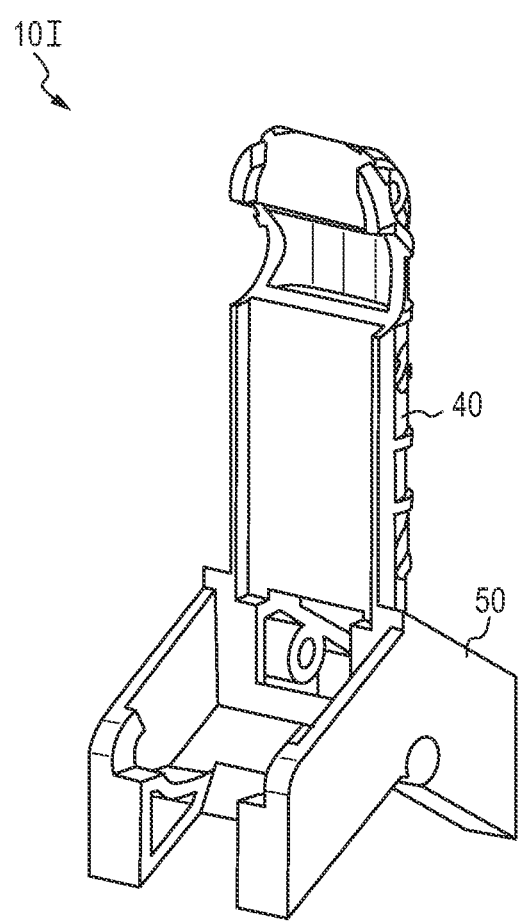
FIG. 34 is a perspective view of a handle portion of the tool of FIG. 33.
Figure 35:
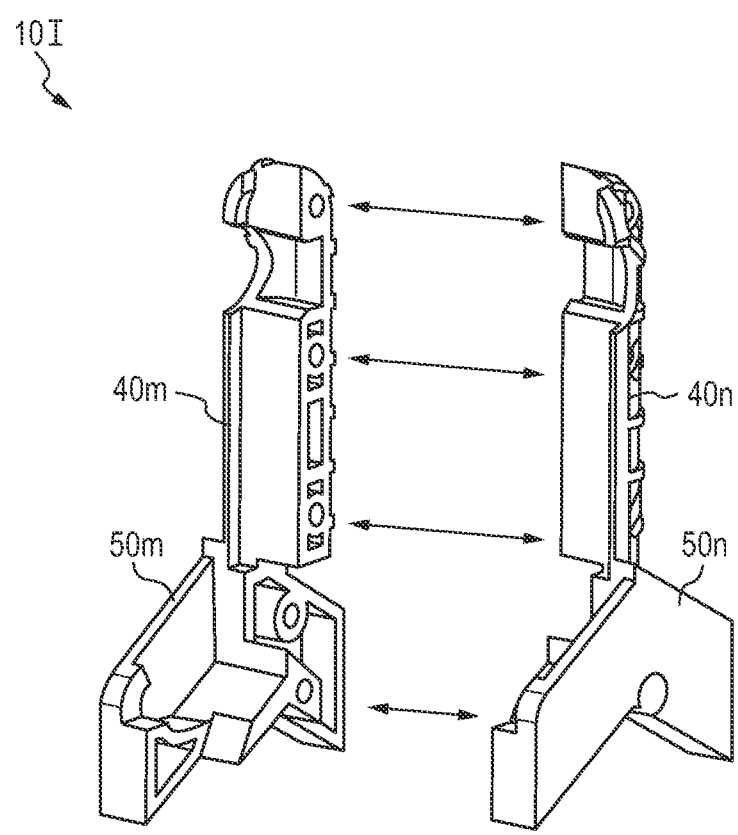
FIG. 35 is a perspective view of portions of the tool of FIG. 33.

FIGS. 28-32 illustrate another tool 10H in accordance with the present subject matter. The tool 10H is similar to the previously described tool 10G but utilizes variant handle portions, and handle alignment provisions and includes a different cam buckle. The tool 10H comprises a base 50, a first handle portion 30, a second handle portion 40, and a fastener 70. The base 50 can define one or more passages 51. The fastener 70 includes a first end 71 and a second end 72 attached to the base 50 and/or the first handle portion 30 by a connector 160. The tool 10H also comprises a cam buckle 93 pivotally attached to the base 50 and configured to releasably engage the fastener 70. As shown in FIG. 29, the cam buckle 93 defines a head end 93a, an opposite handle end 93b, and optional teeth 93c for promoting engagement with the fastener 70. The cam buckle 93 is pivotally positionable about a post 93d. The cam buckle 93 can include biasing provisions that urge the cam buckle 93 toward movement so as to engage the fastener 70 for example. FIG. 31 depicts an example of biasing provisions 93e associated with the cam buckle 93, which can be in the form of a torsion spring for example. The tool 10H is used to engage a pipe, such as pipe 20, by positioning the fastener 70 about the pipe 20, and inserting the fastener end 71 between the head end 93a of the cam buckle 93 and the base 50, and pulling the end 71 to thereby apply tension to the fastener 70. In this embodiment, the cam buckle 93 also includes one or more guard members 93e seen in FIG. 31 that generally extend outward and serve to prevent insertion of an end of the fastener 70 between the cam buckle 93 and the handle portion 40 as shown in FIG. 29. Instead, as will be understood, the fastener 70 and specifically the fastener end 71 is fed or inserted between the cam buckle 93 and the pipe 20. This feature also functions as a "stopper" to restrict excess travel of the cam and promote strap insertion.

The tool 10H also includes handle tensioning provisions which function to apply tension to the fastener (or reduce an effective length of the fastener) upon displacing one or both handles 30, 40 from an open position to a closed position (as depicted in FIGS. 28 and 29). In the particular embodiment shown in the referenced figures, the handle tensioning provisions comprise one or more, and particularly a pair of, projections or shoulders 170 formed in the handle portion 30 which are sized and shaped to be received within capture regions 180 defined in the base 50. More specifically, upon positioning the shoulders 170 within the capture regions 180, as shown by arrow J in FIG. 32, the handle portion 30 is pivotally positionable therein. As a result of the spacing between the connector 160 and the shoulders 170, when the shoulders 170 are captured and received in regions 180, upon pivoting the handle portion 30 toward the closed position, tension is applied to the fastener 70. This configuration can be in the form of the previously described toggle mechanism.

The tool 10H also includes alignment provisions 190 that promote aligned engagement between the handle portions 30 and 40. The alignment provisions 190 can be in a variety of different forms and configurations however as depicted in the referenced figures includes one or more projections 40x extending from a face of the second handle portion 40, one or more projections 30x extending from a face of the first handle portion 30, and one or more receiving recesses 40y defined along a face of the second handle portion 40, and/or one or more receiving recesses 30y defined along a face of the first handle portion 30. The projections 40x, 30x and the recesses 40y, 30y are located relative to their respective handle portions 30, 40 such that upon closing the handles to the position shown in FIGS. 29 and 30, each projection 40x, 30x extends at least partially into a corresponding recess 40y, 30y. The alignment provisions serve to increase stability of the tool particularly during states in which the handle portions are closed and the fastener is tensioned. In this embodiment, the alignment provisions 190 are generally located along an exterior region of the handle portions 30, 40.

The tool 10H also includes supplemental fastener engagement provisions in which a portion of the fastener 70, and specifically the first end 71 opposite the attached end 72, is engaged and captured between the handle portions 30, 40 upon closing those handle portions together as illustrated in FIG. 29. Specifically, in many embodiments, the fastener 70 is captured by contacting both interior faces 30a and 40a of the handle portions 30, 40 with the fastener 70 upon closing the handles together. Such contact results in frictional engagement between the fastener 70 and handle portions 30, 40 and further secures the fastener 70.

In certain embodiments, each or both of the handle portions 30, 40 can be configured to include a grasping region such as regions 30b, 40b to facilitate separation of the handle portions from one another. The grasping regions such as 30b, 40b, can be provided in a variety of different shapes and arrangements however a curved recess as depicted in FIG. 29 enables a user to insert a finger into the region between the handle portions 30, 40, and displace the handle portions apart from one another.

FIG. 28 also illustrates a plurality of laterally extended contact points 52 between an underside of the base 50 and an outer surface of the pipe 20. Providing such contact points 52 spaced from the fastener 70 serves to increase stability and engagement of the tool once clamped or secured to the pipe 20. These features enable delivery of torque as well as axial force to the tool and ultimately to the pipe 20.

FIGS. 33-37 illustrate another tool 10I in accordance with the present subject matter. The tool 10I is similar to the previously described tool 10H. The tool 10I comprises a base 50, a first handle portion 30, a second handle portion 40, and a fastener 70. The base 50 can include one or more passages 51. The fastener 70 includes a first end 71 and a second end 72 attached to the base 50 and/or the first handle portion 30 by a connector 160. The tool 10I also comprises a cam buckle 93 pivotally attached to the base 50 and configured to releasably engage the fastener 70. The cam buckle 93 is generally as previously described. The cam buckle 93 can include biasing provisions that urge the cam buckle 93 toward movement so as to engage the fastener 70 for example. The tool 10I is used to engage a pipe, such as pipe 20, by positioning the fastener 70 about the pipe 20, and inserting the fastener end 71 between the head end of the cam buckle 93 and the base 50, and pulling the end 71 to thereby apply tension to the fastener 70.

The tool 10I also includes handle tensioning provisions which function to apply tension (or reduce an effective length) of the fastener upon displacing one or both handles 30, 40 from an open position to a closed position. In the particular embodiment shown in the referenced figures, the handle tensioning provisions comprise one or more, and particularly a pair of, projections or shoulders 170 formed in the handle portion 30 which are sized and shaped to be received within capture regions 180 defined in the base 50. More specifically, upon positioning the shoulders 170 within the capture regions 180, as shown by arrow K in FIG. 36, the handle portion 30 is pivotally positionable therein. As a result of the spacing between the connector 160 and the shoulders 170, when the shoulders 170 are captured and received in regions 180, upon pivoting the handle portion 30, tension is applied to the fastener 70. This configuration can be in the form of the previously described toggle mechanism.

The tool 10I may optionally include alignment provisions (not shown) that promote aligned engagement between the handle portions 30 and 40. The alignment provisions 190 can be in a variety of different forms and configurations. The alignment provisions serve to increase stability of the tool particularly during states in which the handle portions are closed and the fastener is tensioned.

The tool 10I may also include supplemental fastener engagement provisions in which a portion of the fastener 70, and specifically the first end 71 opposite the attached end 72, is engaged and captured between the handle portions 30, 40 upon closing those handle portions together. Specifically, in many embodiments, the fastener 70 is captured by contacting both interior faces 30*a* and 40*a* of the handle portions 30, 40 with the fastener 70 upon closing the handles together. Such contact results in frictional engagement between the fastener 70 and handle portions 30, 40 and further secures the fastener 70.

Figure 36:
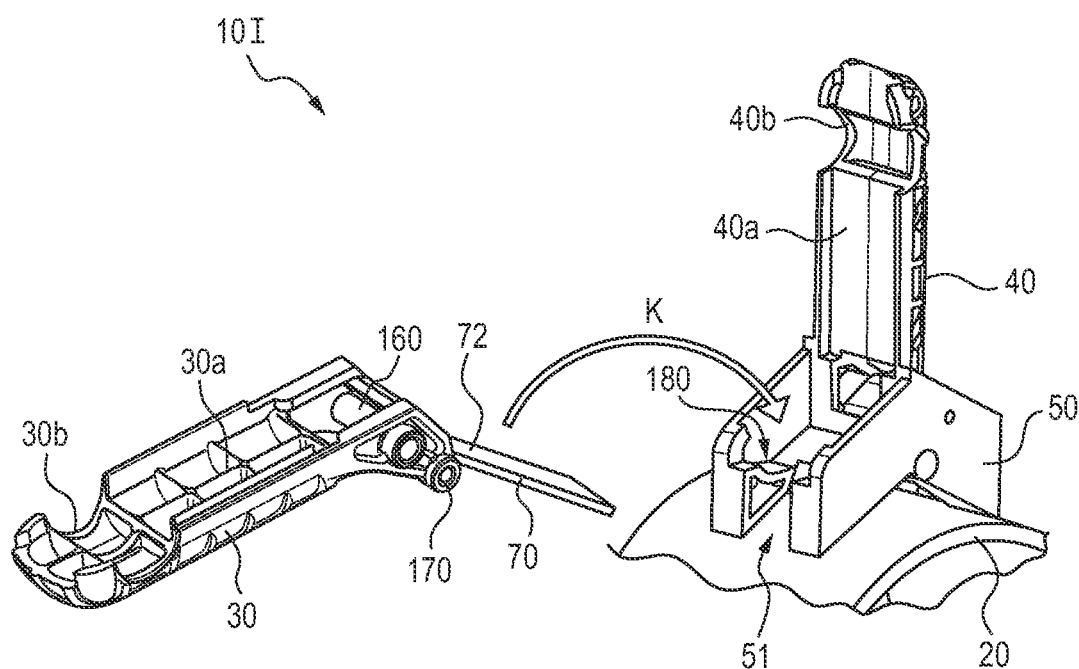
FIG. 36 is another perspective view of the tool of FIG. 33 depicting engagement between portions of the tool.
Figure 37:
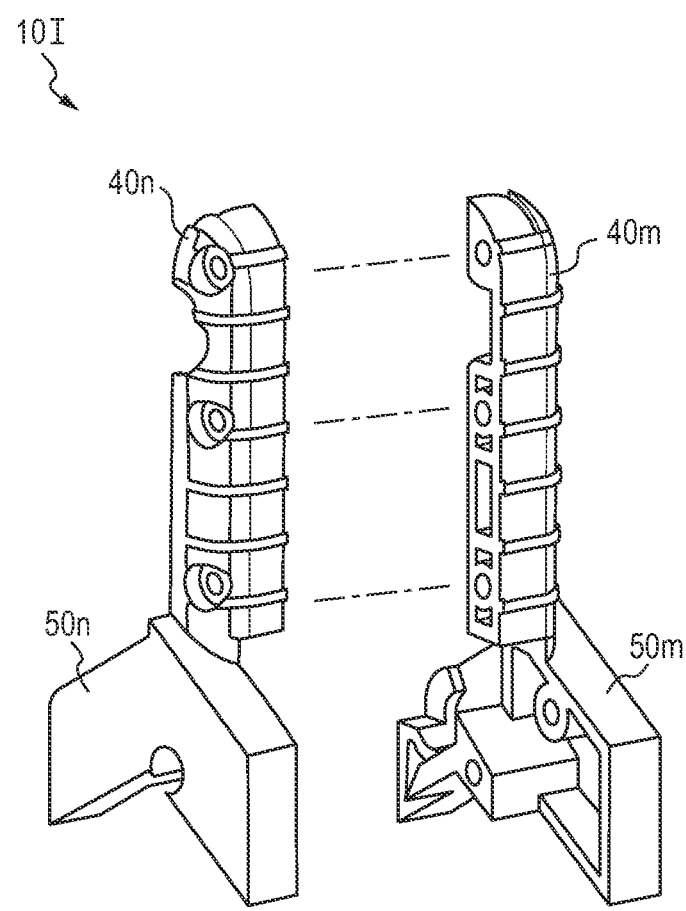
FIG. 37 is another perspective view of portions of the tool of FIG. 33.

In certain embodiments, each or both of the handle portions 30, 40 can be configured to include a grasping region such as regions 30*b*, 40*b* to facilitate separation of the handle portions from one another. The grasping regions such as 30*b*, 40*b*, can be provided in a variety of different shapes and arrangements however a curved recess as depicted in FIG. 36 enables a user to insert a finger into the region between the handle portions 30, 40, and displace the handle portions apart from one another.

One or more components of the tool can be formed from an assembly of two or more components. For example, in the tool 10I, one or both of the handle portions can be formed from handle subcomponents. For example, referring to FIGS. 34, 35, and 37, the handle portion 40 and base 50 are depicted as fashioned from a first subcomponent of a first handle subcomponent 40*m* and a base subcomponent 50*m*, and a second subcomponent of a second handle subcomponent 40*n* and a base subcomponent 50*n*. The use of multiple subcomponents can enable improved manufacturing. The various subcomponents can be secured to one another using techniques known in the art such as the use of fasteners, adhesives, and thermal joining methods.

Figure 38:
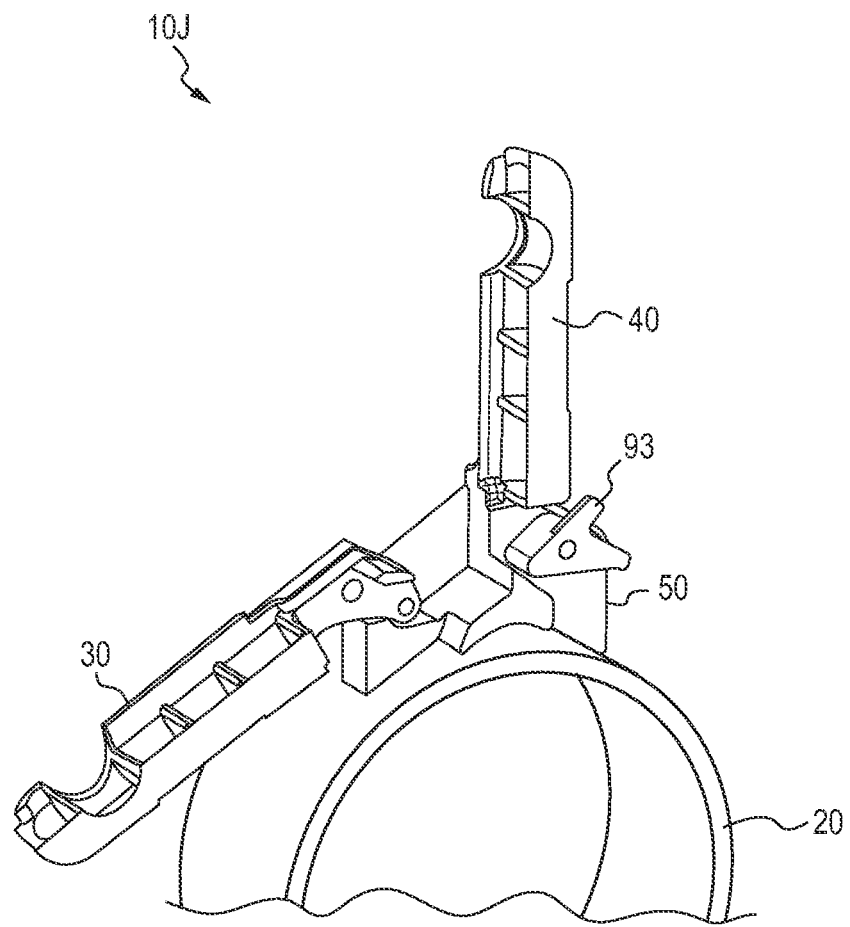
FIGS. 38-41 illustrate aspects of another tool in accordance with the present disclosure.
Figure 39:
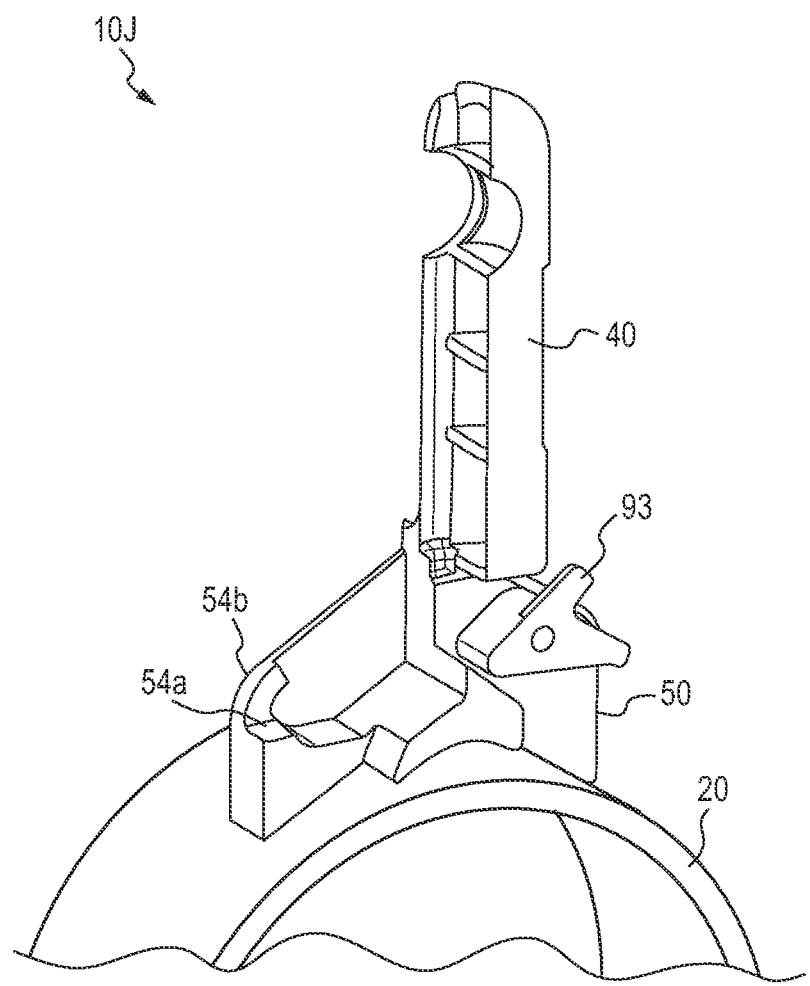
Figure 40:
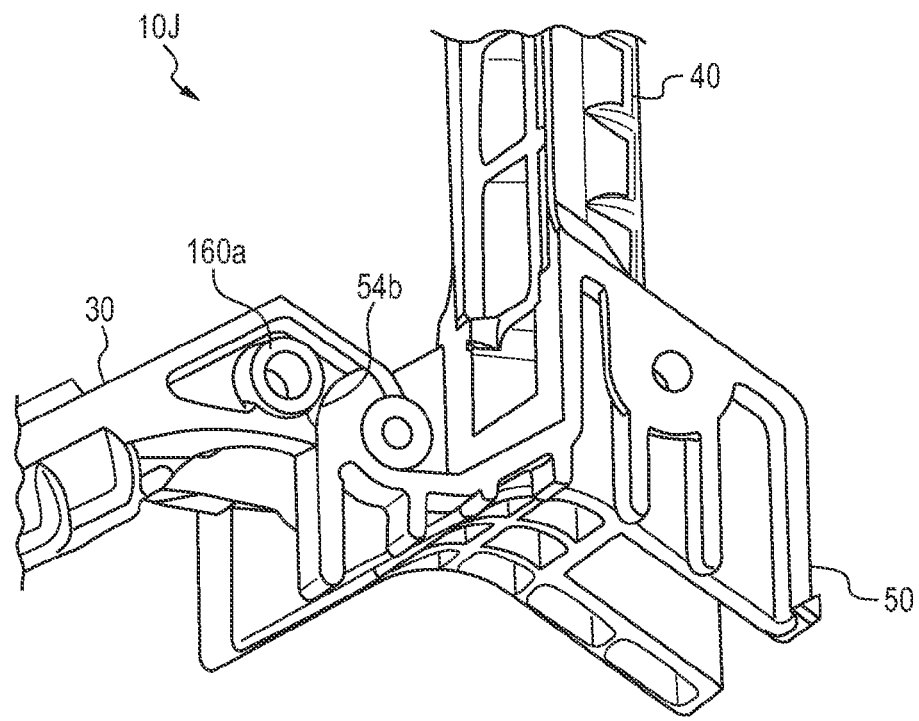
Figure 41:
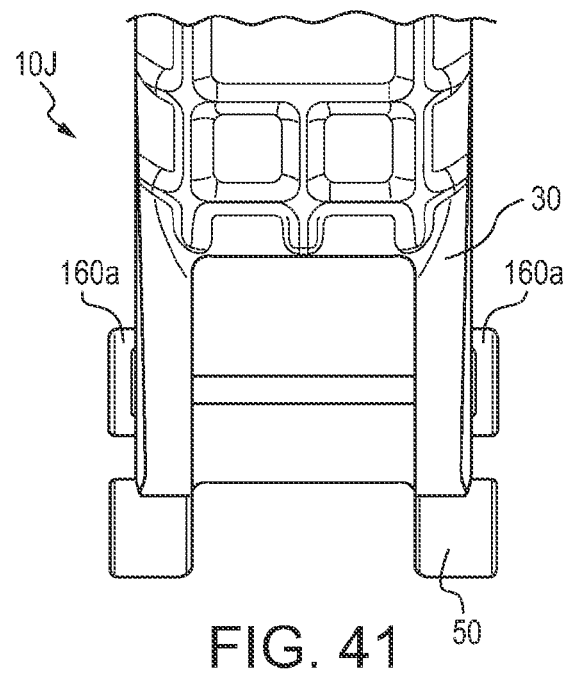

FIGS. 38-41 illustrate another tool 10J comprising a base 50, a handle portion 40 extending from the base, and another handle portion 30 pivotally engageable with the base 50. The tool 10J also comprises a cam buckle 93 as previously described. The tool 10J is similar in many respects to the previously described tools. The tool 10J includes a resting surface 54*a* defined in the base 50. Upon positioning the handle portion 30 to a fully opened position as shown in FIG. 38, a portion of an outer surface of the handle 30 contacts the resting surface 54*a*. Thus, the resting surface 54*a* of the base 50 serves to support the handle 30 and retain the handle 30 in this position.

The handle portion 30 can also include outwardly projecting members 160*a* which generally correspond to receiving provisions for the connector 160 which secures the fastener to the handle 30. The base 50 can also include secondary resting surfaces 54*b* which are located such that upon positioning the handle 30 to its fully opened position as shown in FIG. 38, the projecting members 160*a* of the handle 30 contact and are supported by the secondary resting surfaces 54*b* of the base 50. These provisions, i.e., resting surfaces 54*a* and 54*b*, can also prevent unintended or excessive displacement of the handle 30 in or towards an open position.

Figure 42:
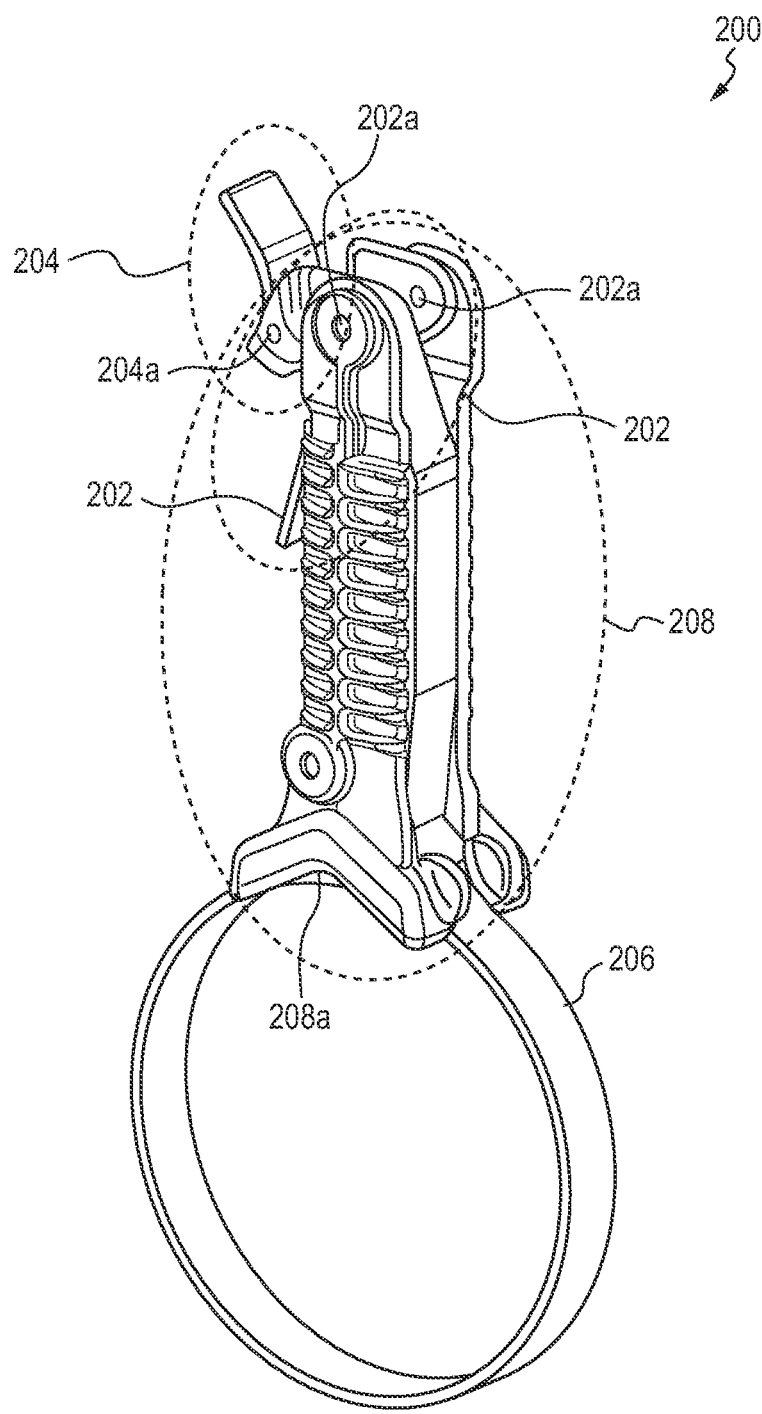
FIG. 42 schematically illustrates a gripping tool in accordance with an embodiment of the present subject matter.
Figure 43:
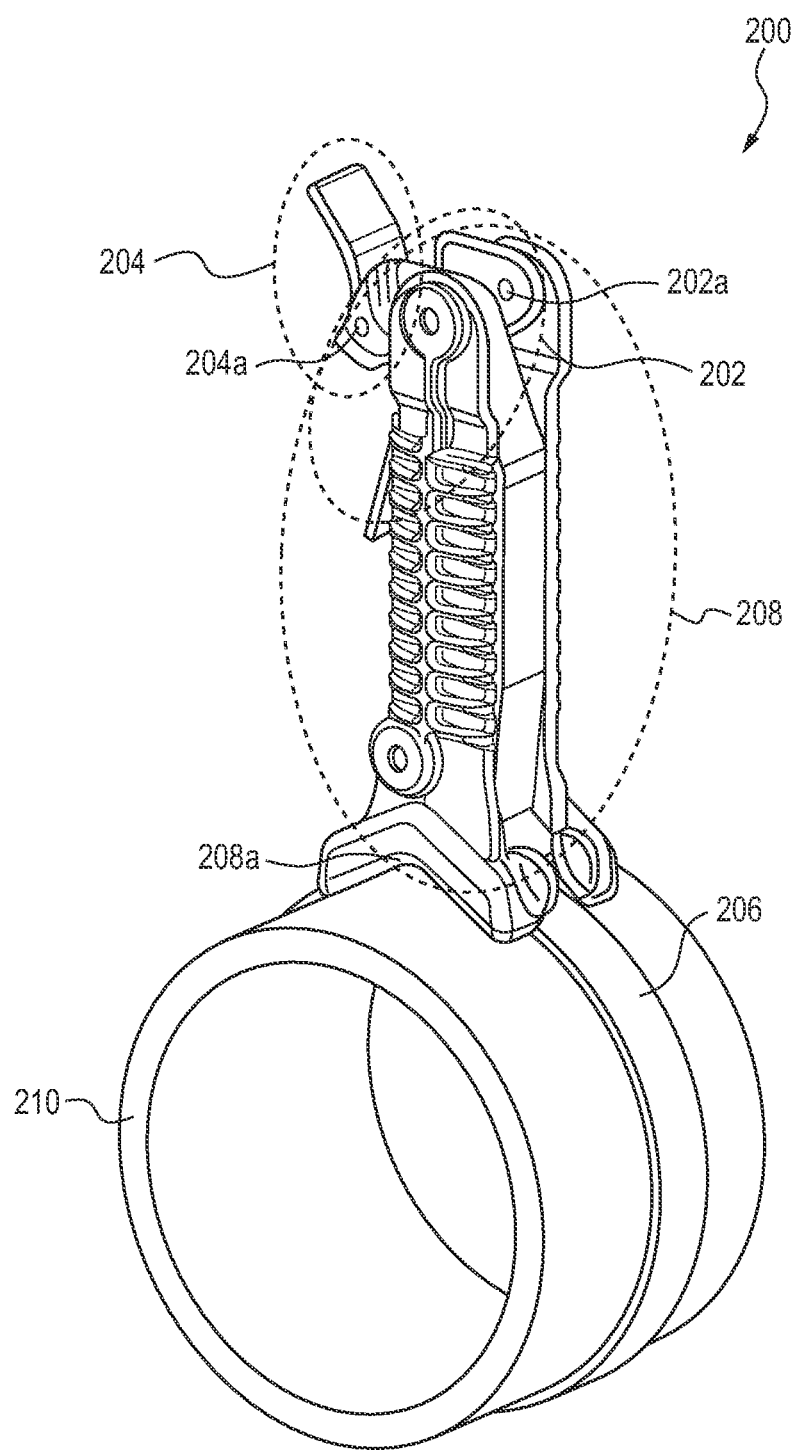
FIG. 43 schematically illustrates the tool of FIG. 42 with a strap of the tool wound around a pipe or other tubular object in accordance with an embodiment of the present subject matter.

Referring to the noted figures, FIG. 42 illustrates a perspective view of a gripping tool 200 in accordance with an embodiment of the present subject matter. The tool 200 includes a handle 208, a flexible strap 206, a lever 202 and a cam lever 204. The lever 202 is pivotably attached to the handle 208 at a pin or axis 202*a*. The cam lever 204 is pivotably attached to the lever 202 at a pin or axis 204*a*. The cam lever 204 is pivotable about a pivot axis defined on the lever 202 (or lever assembly) which in turn is pivotable about one end of the handle 208. The cam lever 204 includes a cam portion having teeth (not shown in FIG. 42) that engage the strap 206 and prevent the strap 206 from slipping in one direction through a region between the teeth and the handle. The cam lever 204 also includes a lever portion that a user selectively positions to release the strap 206. The opposite end of the handle 208 includes a V shaped support 208*a* adapted to hold or otherwise engage the surface of an object 210 to be gripped, as illustrated in FIG. 43. In many applications, the object 210 to be gripped is a hollow circular pipe. However, it is also contemplated that the object 210 can be a solid object with a regular or irregular shape.

FIG. 43 illustrates a perspective view of the tool 200 with the strap 206 wound around or otherwise extending about the object 210 which is typically a pipe in accordance with an embodiment of the present subject matter. The tool 200 allows the strap 206 to be completely disconnected from one side of a V shaped support 208*a* thus providing a user an option of attaching the tool 200 at any given location along the object's extended length without the need to find and insert an end of the object inside the tool 200, and specifically within a loop of the strap 206.

Figure 44:
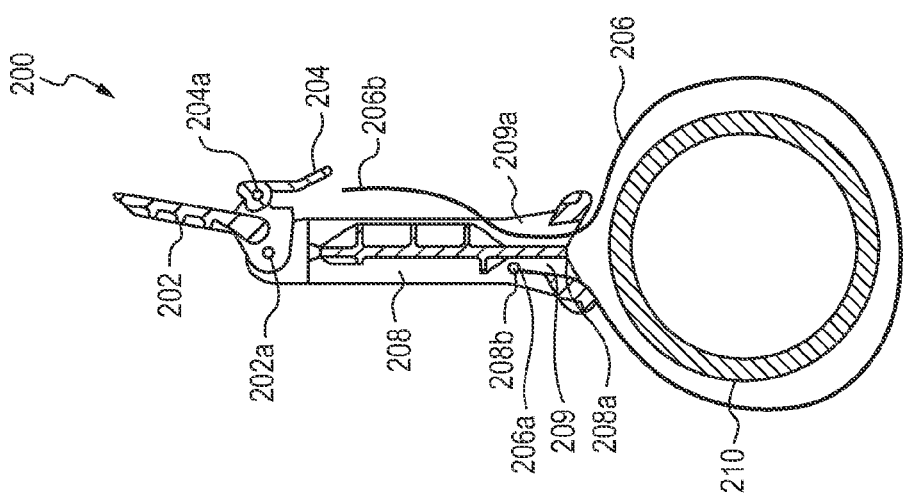
FIG. 44 schematically illustrates the tool of FIGS. 42 and 43, wherein the figure further illustrates an operation of encircling the pipe with the strap in accordance with an embodiment of the present subject matter.

FIG. 44 illustrates the tool 200, wherein the figure further illustrates an operation of encircling the object 210 with the strap 206 in accordance with an embodiment of the present subject matter. The figure illustrates the strap 206 being disconnected from one end of the V shaped support 208*a*, wound around the object 210 and inserted into an opening located at the other end of the V shaped support 208a. Specifically, the strap 206 includes a strap end 206a attached or otherwise engaged with the handle 208 at a post 208b or other affixment member. The other end of the strap, end 206b is passed through a first access opening 209 defined in the V shaped support 208a, wound around the object 210 to be gripped, and inserted through a second access opening 209a defined in the V shaped support 208a.

Figure 45:
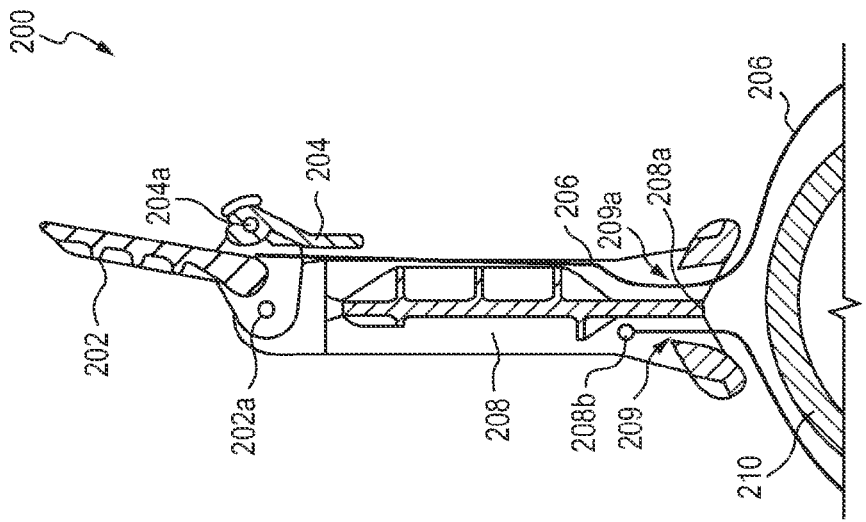
FIG. 45 schematically illustrates the tool of FIGS. 42-44, wherein the figure further illustrates another operation of passing the strap between a cam lever and a lever in accordance with an embodiment of the present subject matter.

FIG. 45 illustrates the tool 200, and further illustrates another operation of passing the strap 206 between the cam lever 204 and the handle 208, and ultimately the lever 202 in accordance with an embodiment of the present subject matter. In order to pass the strap 206 between the cam lever 204 and the lever 202, the cam lever 204 is pivoted about its pivot axis 204a to provide clearance for the strap 206 as described in greater detail herein. In many embodiments, the cam lever 204 is pressed against a springing or biasing action described in greater detail herein.

Figure 46:
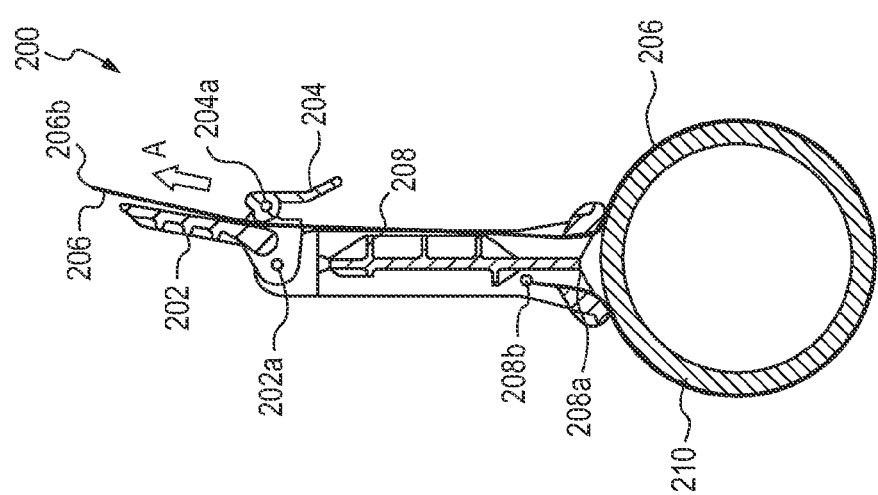
FIG. 46 schematically illustrates the tool of FIGS. 42-45, wherein the figure further illustrates another operation of pulling the strap to tighten the strap around the gripped pipe in accordance with an embodiment of the present subject matter.

FIG. 46 illustrates the tool 200, and further illustrates another operation of pulling the strap 206 to tighten it over or otherwise around the gripped object 210 in accordance with an embodiment of the present subject matter. In many embodiments, the surface of the strap 206 has a relatively high coefficient of friction in comparison to the coefficient of friction for other components of the device. This promotes gripping and assists the strap in gripping the object 210. The length of the strap 206 is sufficiently long to extend about the object 210 in addition for the strap to reach the area of locking between the cam lever 204 and the lever 202. Specifically, the strap end 206b is inserted within a region between the cam lever 204 and the lever 202 and pulled in the direction of arrow A. Typically, the strap 206 is pulled by the user until taut and until there is no slack in the strap along a length portion of the strap extending generally between the cam lever 204 and the post 208b. Once the strap 206 is in this pulled or slightly tensioned state, the cam lever 204 is positioned to engage the strap 206 and more particularly, lock the strap 206 to the assembly of the lever 202 and the cam lever 204. This configuration and locking operation is described in greater detail herein.

Figure 47:
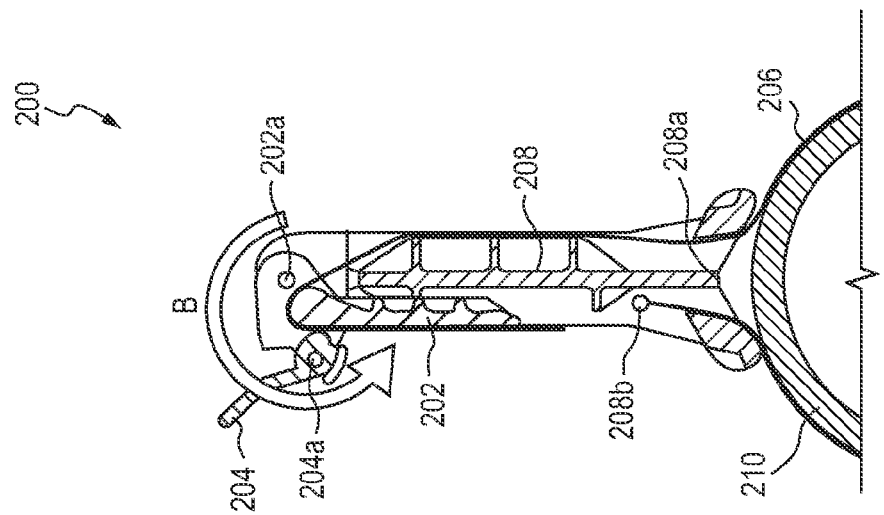
FIG. 47 schematically illustrates the tool of FIGS. 42-46, wherein the figure further illustrates another operation of turning the lever to provide further tension and locking the strap in accordance with an embodiment of the present subject matter.

FIG. 47 illustrates the tool 200, and further illustrates another operation of rotating the lever 202 to provide further tensioning of the strap 206 in accordance with an embodiment of the present subject matter. As previously noted, once the strap 206 is inserted within the region between the cam lever 204 and the lever 202, the strap is further pulled to tighten its grip on the object 210 (as shown by arrow A in FIG. 46). The cam lever 204 is configured to engage and lock the strap 206 and prevent any movement of the strap 206. The cam lever 204 "bites into" or otherwise engages the strap 206 and prevents the strap 206 from slippage when the lever 202 is rotated as shown in FIG. 47 by arrow B to further tighten the strap 206 around the pipe 210.

Figure 48:
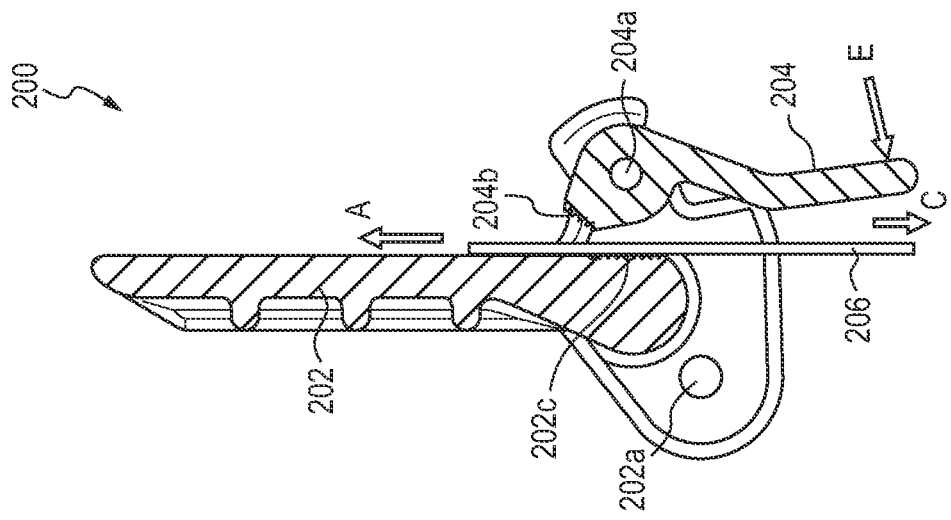
FIG. 48 schematically illustrates a cam lever and lever assembly, wherein the assembly is in a locked configuration in accordance with an embodiment of the present subject matter.

FIG. 48 further illustrates the cam lever 204 and the lever 202 and their assembly as used in the tool 200. The cam lever 204 is in a locked position relative to the strap 206 and the lever 202 in accordance with an embodiment of the present subject matter. Upon positioning the cam lever 204 to this locked position, the strap 206 is prevented from movement in the direction of arrow C. As described in greater detail, the cam lever 204 is positionable between locked and fully unlocked positions. Instead, if the strap 206 is pulled in the direction of arrow A with sufficient force, the strap 206 can be repositioned, i.e., further tensioned, relative to the cam lever 204. The cam lever 204 includes a strap engagement region 204b which in many embodiments may include a plurality of outwardly extending ridges or "teeth" to promote gripping of the strap 206. The present subject matter also includes providing a strap engagement region 202c along a portion of the lever 202. The strap engagement region 202c can include a plurality of outwardly extending ridges or "teeth" to promote gripping of the strap 206.

Figure 49:
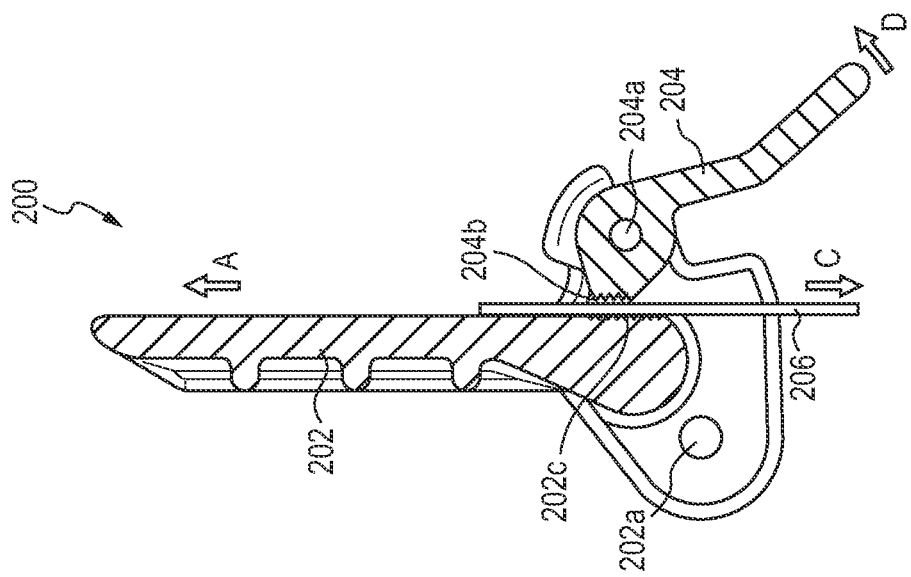
FIG. 49 schematically illustrates the cam lever and lever of the tool of FIG. 42, wherein the cam lever and lever assembly is in an unlocked configuration in accordance with an embodiment of the present subject matter.

FIG. 49 illustrates the cam lever 204 and lever 202 assembly of the tool 200, wherein the cam lever 204 is in an unlocked position relative to the strap 206 and the lever 202 in accordance with an embodiment of the present subject matter. Upon positioning the cam lever 204 to this unlocked position, the strap 206 can freely move in the directions of arrows A and C.

FIGS. 48 and 49 also illustrate a biasing provision used in many embodiments of the present subject matter gripping tools. Biasing provisions can be included in the assembly of the cam lever 204 and the lever 202 to bias the cam lever 204 toward a locked position in the direction of arrow D, about the pivot axis 204a. The biasing provisions can be provided in a variety of different forms such as for example a torsion spring. The biasing provisions urge the cam lever 204 to rotate about the pivot axis 204a in the direction of arrow D, and if the strap 206 is positioned between the cam lever 204 and the lever 202 as shown in FIG. 48, the strap engagement region 204b of the cam lever 204 is urged into contact with the strap 206. FIG. 49 illustrates unlocking the cam lever 204 from engagement with the strap 206 by applying a force to the cam lever 204 in the direction of arrow E. The force is sufficient to overcome the biasing force otherwise urging the cam lever 204 in the direction of arrow D in FIG. 48.

FIGS. 48 and 49 further illustrate additional details and aspects of the locking and unlocking of the strap 206 between the cam lever 204 and the lever 202. In this embodiment, and as previously described, the cam lever 204 is biased to pivot about its pivot axis 204a in the direction of arrow D. With the cam lever 204 in the locked position as shown in FIG. 48, the strap 206 is locked and precluded from movement in the direction of arrow C. If the strap 206 is pulled in the other direction shown by arrow A, in FIG. 49, the cam lever 204 pivots in the direction of arrow E and thereby allows the strap 206 to slide past the teeth or locking region 204b of the cam lever 204 and the lever 202. When the cam lever 204 is depressed against the biasing spring or other biasing provisions, as shown by arrow E illustrated in FIG. 49, the cam lever 204 opens and allows the strap 206 to slide freely through the gap or clearance between the cam lever 204 and the lever 202. Thus, in many embodiments employing biasing, the cam lever 204 is biased toward the locked position depicted in FIG. 48.

In the locked position, illustrated in FIG. 48, the teeth or locking area 204b holds the strap 206 firmly and prevents any slippage. Because of the asymmetrical cam surface, the engagement of the locking area 204b into the strap 206 typically increases with an increasing pull force shown by arrow C, illustrated in FIGS. 48 and 49.

Figure 50:
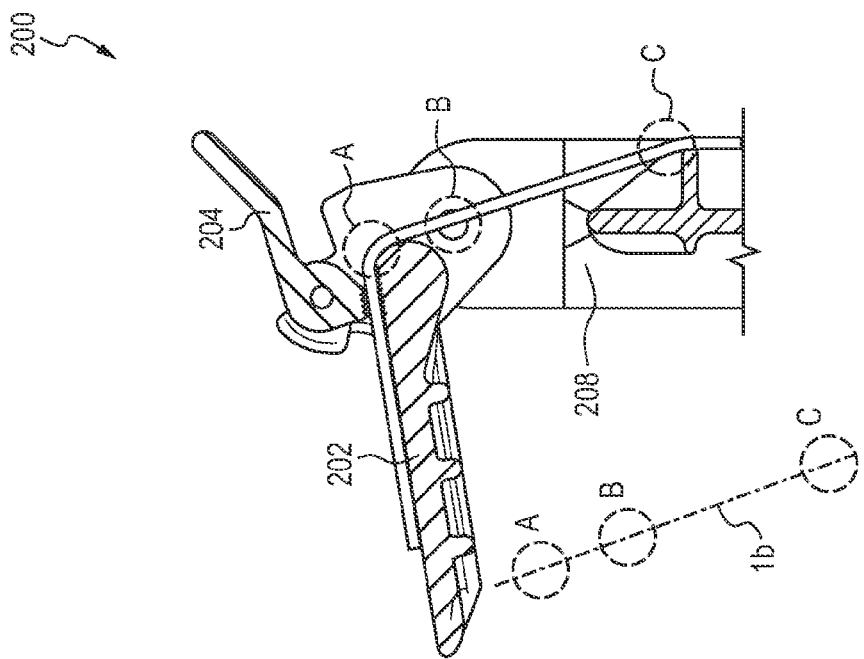
FIG. 50 schematically illustrates a geometric representation of three points of the arrangement of FIG. 49, wherein the lever is in a pulled configuration with 0° of rotation from its open position in accordance with an embodiment of the present subject matter.

FIG. 50 illustrates a geometric representation of three points on the tool 200, wherein the lever 202 is in a pulled configuration in accordance with an embodiment of the present subject matter. The term "pulled configuration" refers to the position of the lever 202 which enables the strap 206 to be pulled in the direction of arrow A shown for example in FIG. 49. "A" represents the point(s) of contact on the strap 206 held between the cam lever 204 and the lever 202, "C" represents the point(s) of contact of the strap 206 on the handle 208, and "B" represents the pivot axis about which the lever 202 is rotated, i.e., axis 202a. Line 1a is the distance between "A" and "C" when the lever 202 is in the pulled configuration, i.e., the lever 202 is oriented at about 0° from its open position.

Figure 51:
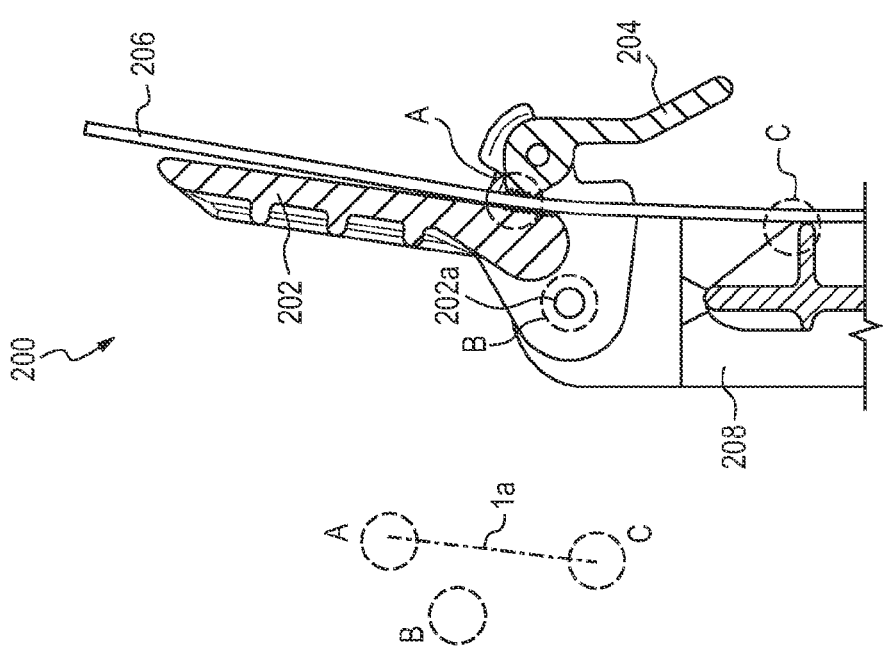
FIG. 51 schematically illustrates a geometric representation of the three points of the arrangement, wherein the lever is rotated by about 90° from its open position in accordance with an embodiment of the present subject matter.

FIG. 51 illustrates a geometric representation of the three points on the tool 200, wherein the lever 202 is rotated by about 90° in accordance with an embodiment of the present subject matter. Line 1b represents the distance between "A" and "C" when the lever 202 is rotated by about 90°. In this position of the lever 202, the locations A, B, and C are generally aligned along the line 1b.

Figure 52:
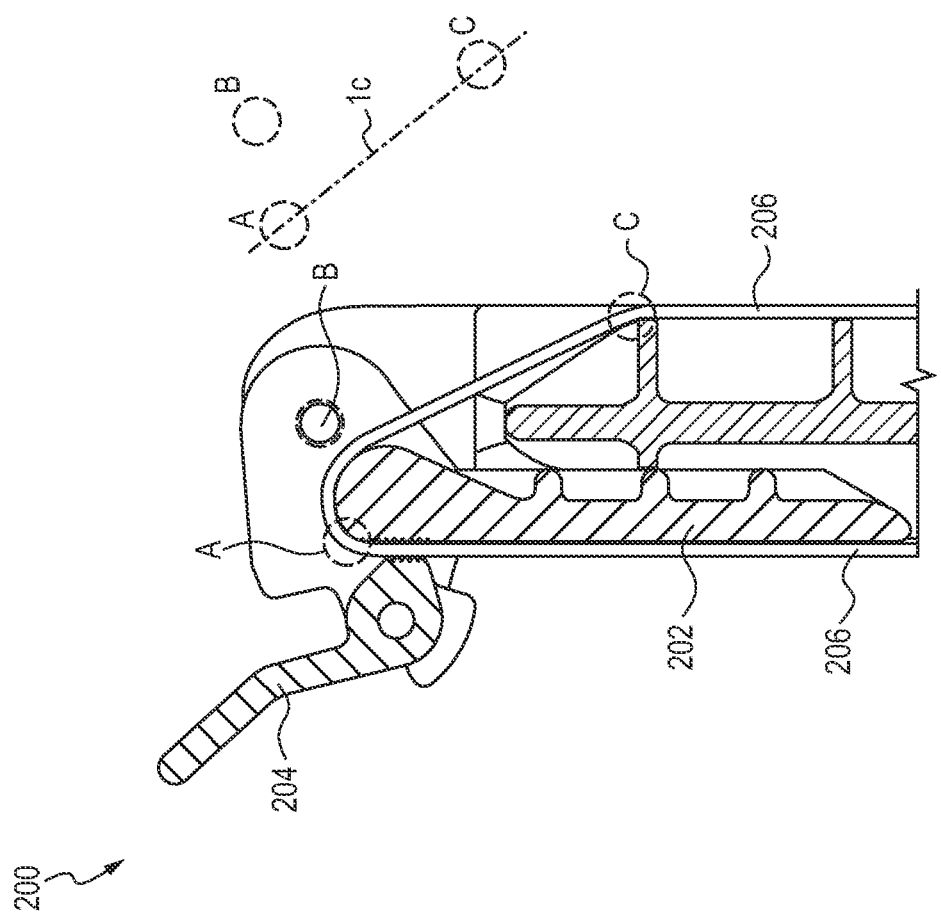
FIG. 52 schematically illustrates a geometric representation of the three points of the arrangement, wherein the lever is rotated by about 180° from its open position in accordance with an embodiment of the present subject matter.

FIG. 52 illustrates a geometric representation of the three points on the tool 200, wherein the lever 202 is rotated by 180° from its open position in accordance with an embodiment of the present subject matter. Line 1c represents the distance between "A" and "C" when the lever 202 is rotated by about 180°.

In accordance with an aspect of certain embodiments of the present subject matter, and with reference to FIGS. 50-52, the distance 1a is less than 1c. And, in particular embodiments, the distance 1a is less than 1b. And, in still other embodiments, the distance 1c is less than 1b, thus $1a<1c<1b$. In addition, in comparing the geometric representations of FIGS. 50 and 52, it will be noted that location 1b is on one side of line 1a in FIG. 50, and on another opposite side of line 1a in FIG. 52.

Figure 53:
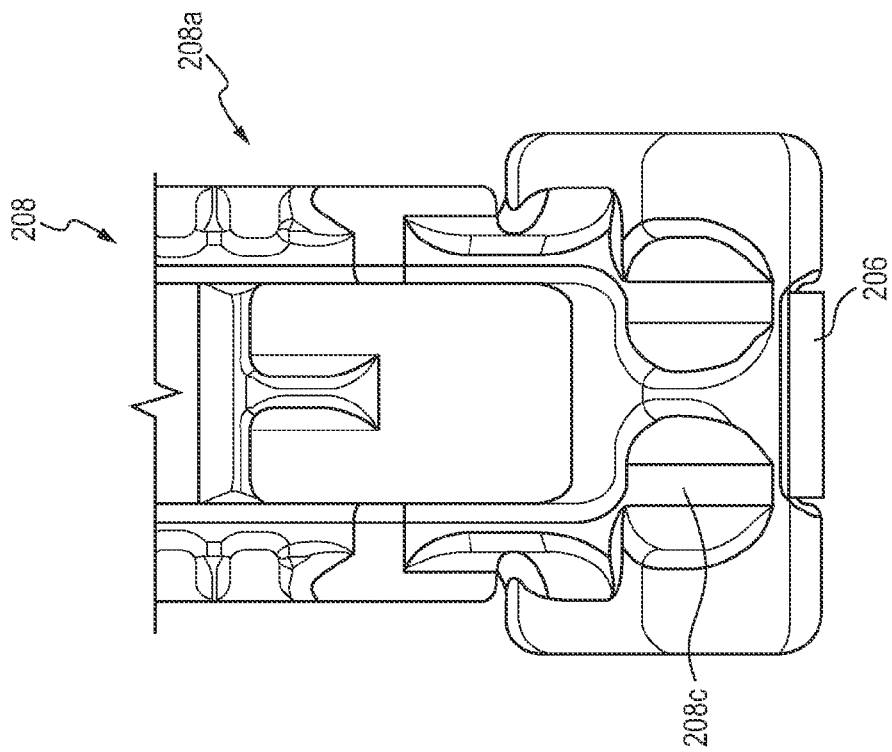
FIG. 53 schematically illustrates a detailed view of a working end of the handle used in the tool of FIG. 42 in accordance with an embodiment of the present subject matter.

FIG. 53 illustrates a detailed view of a working end of the handle 208 including the V support 208a used in the tool 200 in accordance with an embodiment of the present subject matter. The V support 208a of the handle 208 further includes a slot cover 208c. The slot cover 208c is configured to absorb the force exerted by the strap 206 when tightened about the object 210 and pulled along a holding surface of the handle 208. The slot cover 208c also assists in reducing the gap between the strap 206 and the handle 208 surface thus ergonomically proving beneficial for a firmer grip of the handle 208 by the user. The width of the V support 208a is relatively large to allow sufficient surface contact between the handle 208 and the object 210 thus reducing the potential for tilting of the handle (wobbling) when a lateral force (along the main axis of the pipe) is applied to the handle 208.

Figure 54:
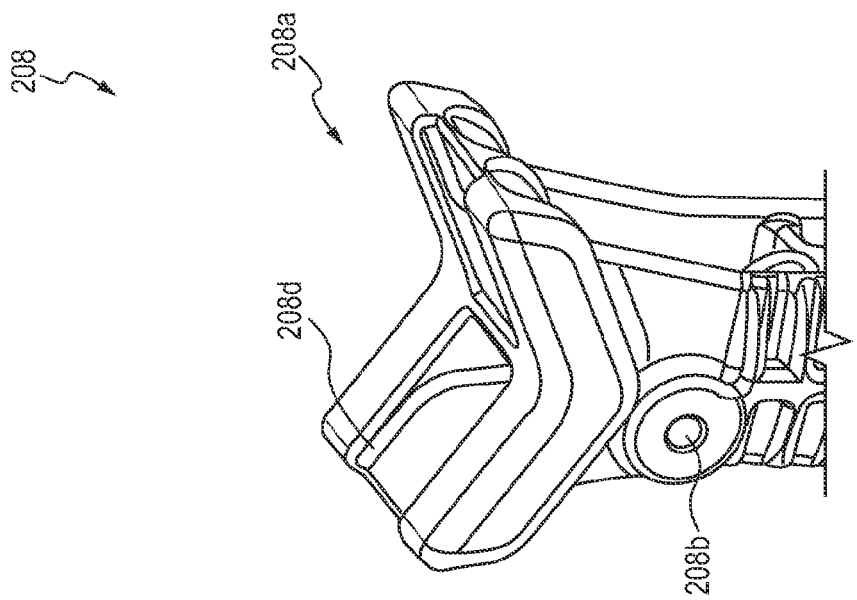
FIG. 54 schematically illustrates a perspective detailed view of the working end of the handle used in the tool of FIG. 42 in accordance with an embodiment of the present subject matter.

FIG. 54 illustrates a perspective view of the working end of the handle 208 used in the tool in accordance with an embodiment of the present subject matter. The V support 208a for the handle 208 further includes a recessed groove 208d to provide a guide way for the passage of the strap. The recessed groove 208d is defined along a face of the V shaped support 208a which, during use of the tool, is directed toward the object to be gripped. That face of the V shaped support is generally directed away from the handle 208. The groove 208d prevents movement of the strap 206 and avoids slipping. In accordance with an embodiment, the depth of the groove 208d is greater than the thickness of the strap 206. In accordance with another embodiment, the depth of the groove 208d is less the thickness of the strap 206. As previously described, the working end of the handle 208 includes a post 208b or connector for the strap 206 (not shown) on the body of the handle 208. This arrangement fixes the strap 206 to the handle 208 while freely allowing the other end of the strap 206 to be wound around the surface of the object 210 and reinserted via the groove 208d and the slot cover 208c of the V support 208a.

Figure 55:
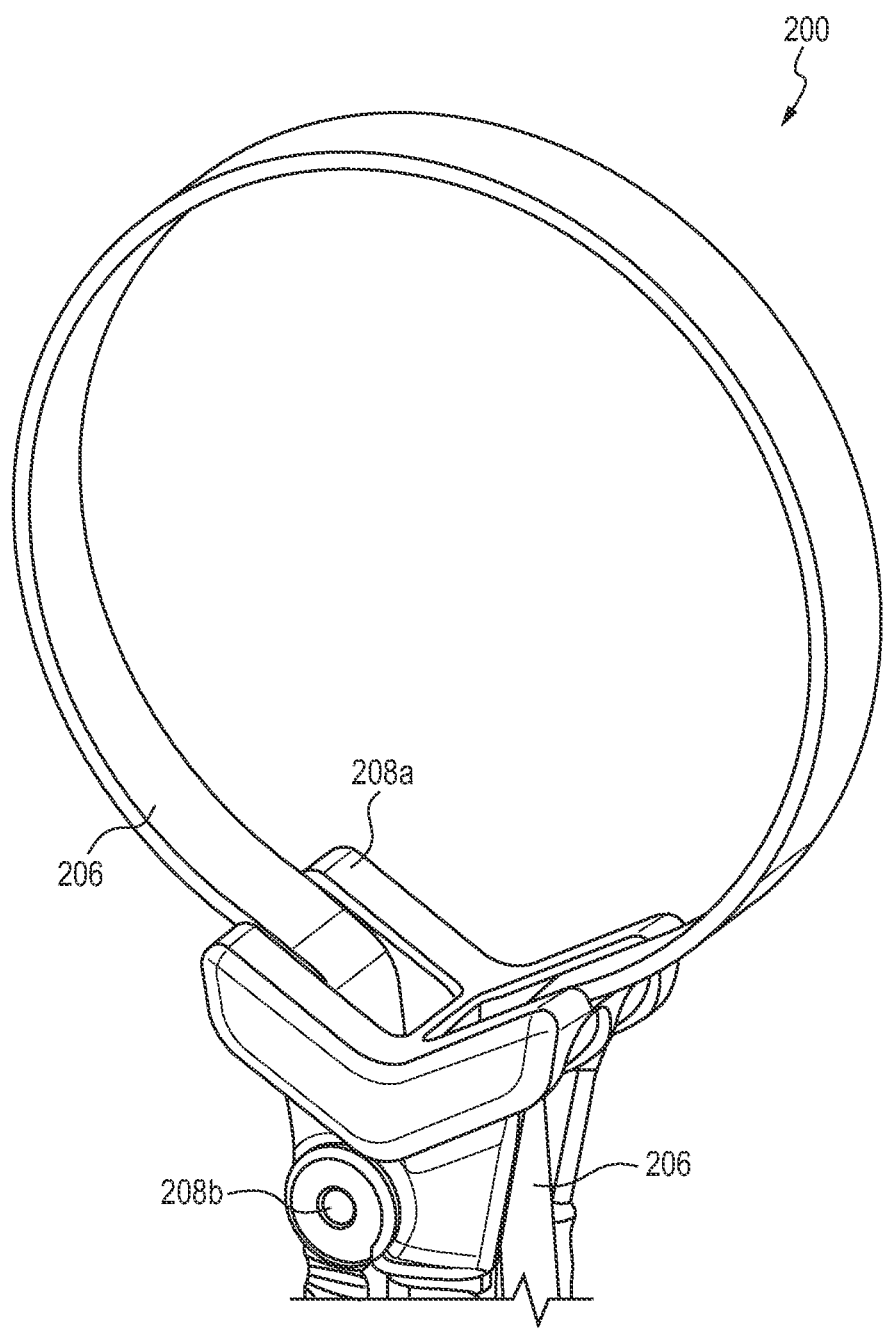
FIG. 55 schematically illustrates a perspective view of the strap of the tool extending from a V support in the tool of FIG. 42 in accordance with an embodiment of the present subject matter.

FIG. 55 illustrates the strap 206 wound in the V support 208a in accordance with an embodiment of the present subject matter.

Figure 56:
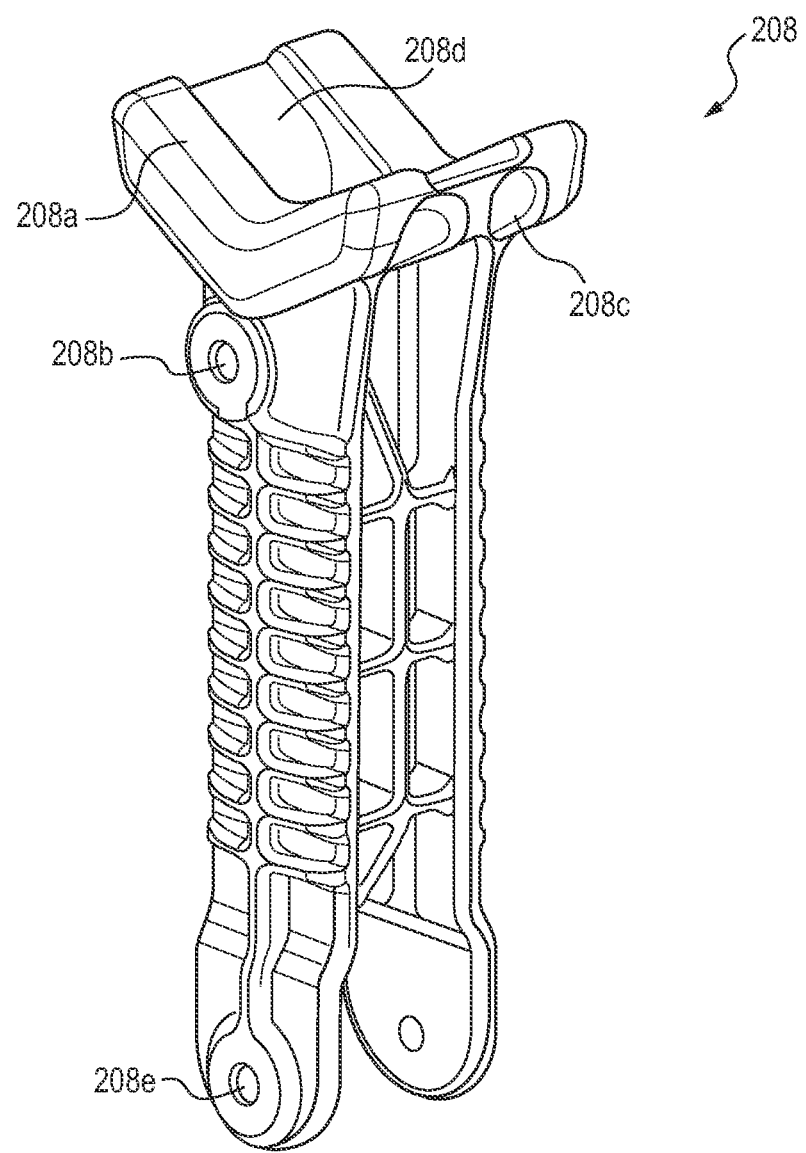
FIG. 56 schematically illustrates a perspective view of the handle of the tool of FIG. 42 in accordance with an embodiment of the present subject matter.

FIG. 56 illustrates a perspective view of the handle 208 of the tool 200 in accordance with an embodiment of the present subject matter. One end, i.e., the working end, of the handle 208 includes the V shaped support 208a while on the other end, i.e., the distal end, the handle 208 includes openings 208e for receiving the pivotable lever 202. In many embodiments, the handle 208 further includes an ergonomic surface to provide for a better grip by the user. FIG. 56 also shows the post 208b, the slot cover 208c, and the recessed groove 208d.

Figure 57:
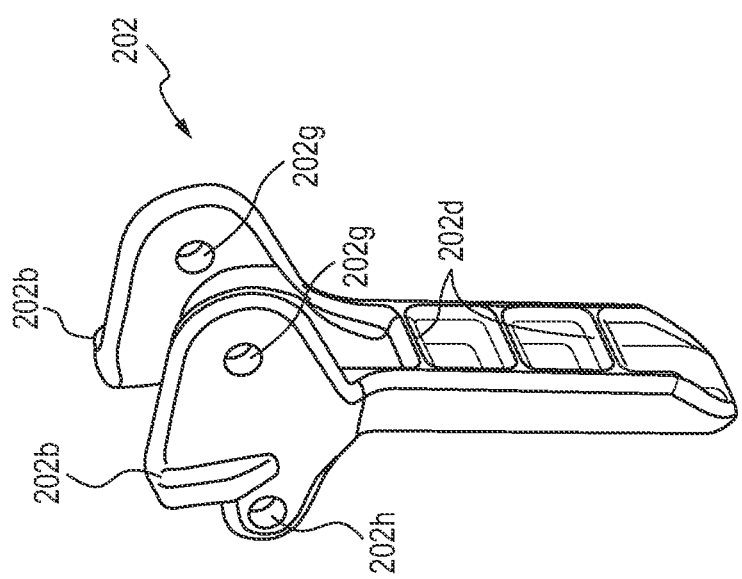
FIG. 57 schematically illustrates a perspective view of the lever of the tool of FIG. 42 having ribs for reinforcing the lever in accordance with an embodiment of the present subject matter.

FIG. 57 illustrates a perspective view of the lever 202 with a plurality of ribs 202d for reinforcing the lever 202 in accordance with an embodiment of the present subject matter. The lever 202 further includes two lever pivot holes 202g or apertures for receiving the pivot pin 202a. The lever 202 also defines a pair of holes 202h or apertures for receiving pivot pin(s) for the cam lever 204. The lever 202 pivots about the pivot pin(s) (not shown) mounted collinearly between each of the openings 208e (shown in FIG. 56) with each of the lever pivot holes 202g. The lever 202 also further includes two lever stoppers 202b on opposite sides as illustrated in the FIG. 57. The two lever stoppers 202b limit the pivoting action of the lever 202 about the two pins by contacting matching surfaces on the handle 208. This configuration is described in greater detail herein.

Figure 58:
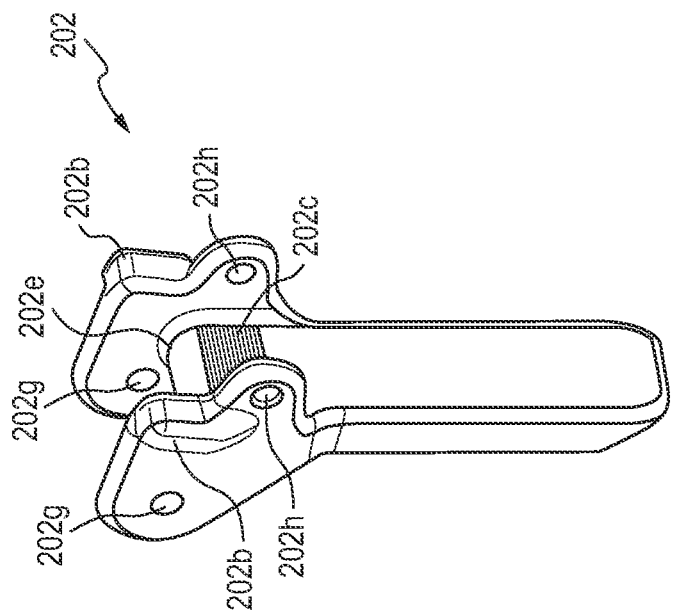
FIG. 58 schematically illustrates a perspective view of the lever of FIG. 57 with a lever locking area illustrated in the figure in accordance with an embodiment of the present subject matter.

FIG. 58 illustrates a perspective view of the lever 202 with the lever locking area 202c illustrated in the figure in accordance with an embodiment of the present subject matter. The lever 202 further includes two cam lever pivot holes 202h on opposite sides of the lever 202 which assist in pivoting the cam lever 204, on the lever 202. As previously described, the lever locking area 202c includes means to increase the coefficient of friction between the lever 202 and the strap 206. With the action of the cam lever 204 the surface of the strap 206 with its friction along with the friction of the lever locking area 202c assist in locking the strap 206 in one position. The lever 202 also further includes a cam attachment space 202e to accommodate the cam lever 204 when the cam lever 204 is positioned between the holes 202h.

Figure 59:
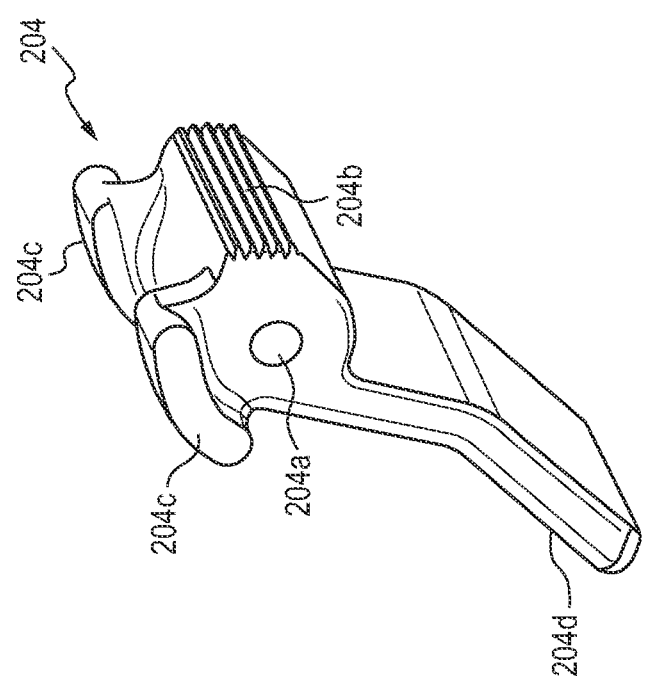
FIG. 59 schematically illustrates a perspective view of the cam lever of the tool of FIG. 42 with a cam locking area illustrated in the figure in accordance with an embodiment of the present subject matter.

FIG. 59 illustrates a perspective view of the cam lever 204 with the cam locking area 204b illustrated in the figure in accordance with an embodiment of the present subject matter. The cam lever 204 serves as a locking and unlocking member for the tool. In certain embodiments, a spring (not shown) biases the cam lever 204 towards a locked position and assists with the locking operation of the strap 206 between the cam lever 204 and the lever 202. Depressing the cam lever 204 against the biasing or spring force unlocks the strap 206 from the lever 202 and thus the tool 200. The locking and unlocking operation is carried by the pivoting movement of the cam lever 204 about a cam pivot hole 204a within the body of the cam lever 204. The cam locking area 204b includes means to increase the coefficient of friction between the cam locking area 204b and the strap 206 to lock the strap 206 in one direction. The cam lever 204 also further includes a cam stopper 204c which limits the rotation of the cam lever 204 about the cam attachment made between the cam lever 204 and the lever 202. The cam lever 204 also further includes an actuator 204d designed to facilitate ergonomic comfort when locking and unlocking the cam lever 204.

The cam stopper 204c may be in a variety of different forms. For example in many embodiments the cam stopper 204c includes at least one, and more particularly two, laterally extending members 204c which extend outward beyond the width of the cam lever actuator 204. The cam stopper(s) 204c are configured and positioned on the cam lever 204 such that upon pivotable attachment of the cam lever 204 to the lever 202, upon positioning the cam lever 204 to a fully opened or fully unlocked position relative to the lever 202, the cam stopper(s) 204c contact one or more portions of the lever 202.

Figure 60:
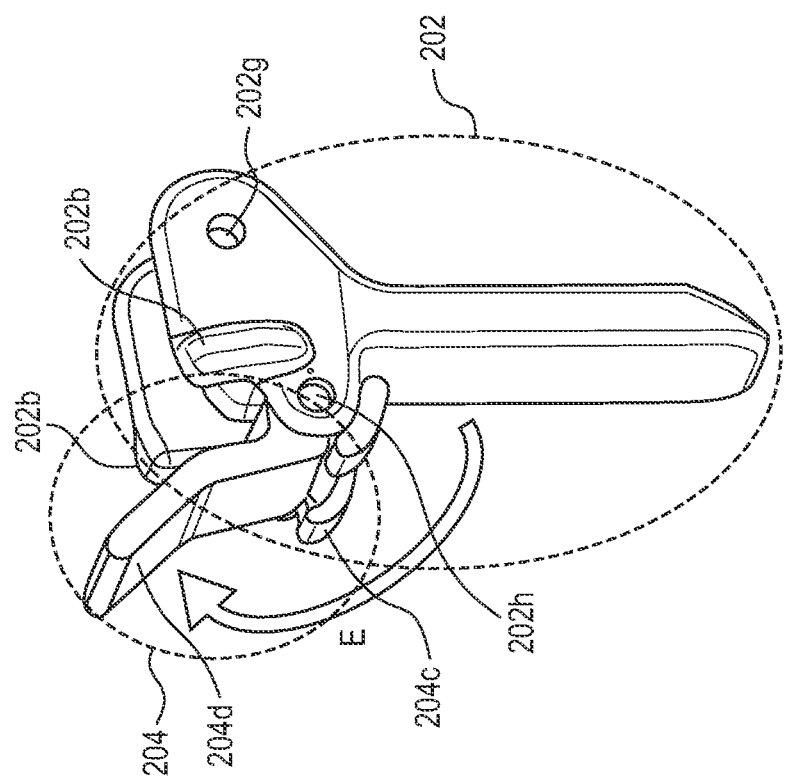
FIG. 60 schematically illustrates a perspective view of the cam lever engaged with the lever of the tool of FIG. 42 in accordance with an embodiment of the present subject matter.

FIG. 60 illustrates a perspective view of the cam lever 204 pivotably engaged with the lever 202 in accordance with an embodiment of the present subject matter. In certain versions and as previously described, the cam lever 204 is attached in a way wherein the actuator 204d needs to be depressed in the direction of arrow E to its position represented in FIG. 60 in order to unlock the strap 206. The figure also illustrates the limiting rotation of the cam lever 204 with the cam lever stopper 204c contacting the lever 202.

Figure 61:
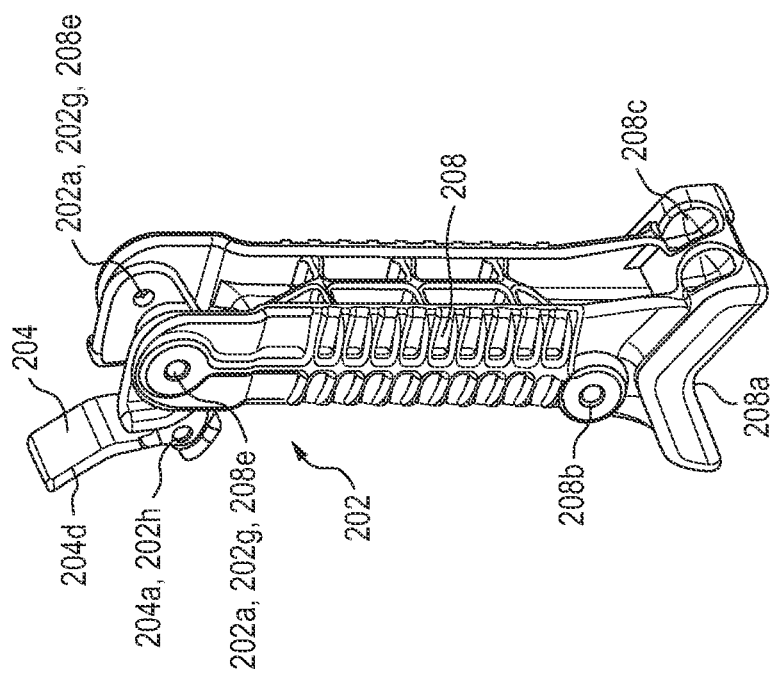
FIG. 61 schematically illustrates a perspective view of the cam lever, lever, and handle of the tool of FIG. 42 in accordance with an embodiment of the present subject matter.

FIG. 61 illustrates a perspective view of the cam lever 204 with the lever 202 and the handle 208 assembly in accordance with an embodiment of the present subject matter. FIG. 61 illustrates the cam lever actuator 204d, pivotal engagement between the cam lever 204 and the lever 202 at pivot axis 204a provided by pivot pins or other member(s) extending in apertures 202h, pivotal engagement between the lever 202 and the handle 208 at pivot axis 202a provided by pivot pins or other member(s) extending in apertures 208e. The handle 208 includes the previously noted V shaped support 208a, the post 208b, and the slot cover 208c.

Figure 62:
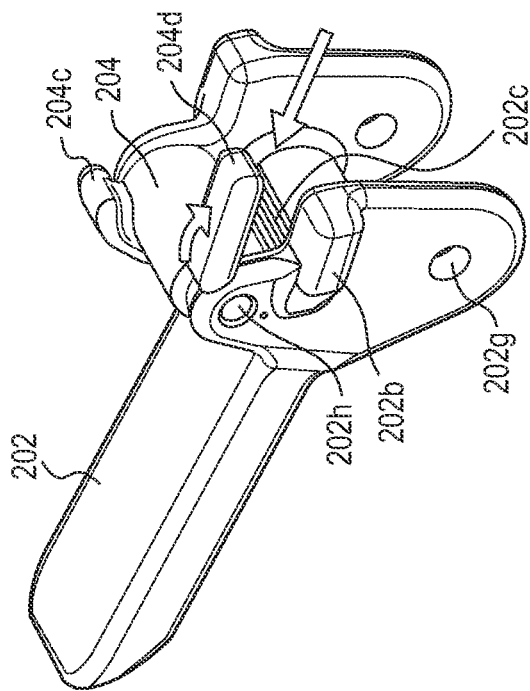
FIG. 62 schematically illustrates a perspective view of an alternate version of a biased cam lever and lever assembly in accordance with an embodiment of the present subject matter.

FIG. 62 illustrates a perspective view of another version of a cam lever 204 with lever 202 assembly in accordance with another embodiment of the present subject matter. The location for the cam lever 204 and particularly the actuator 204d, is shifted to an adjacent side. In accordance with another embodiment the orientation of the cam lever 204 is reversed. Additional aspects of the cam lever 204 and the lever 202 are as previously described herein.

Figure 63:
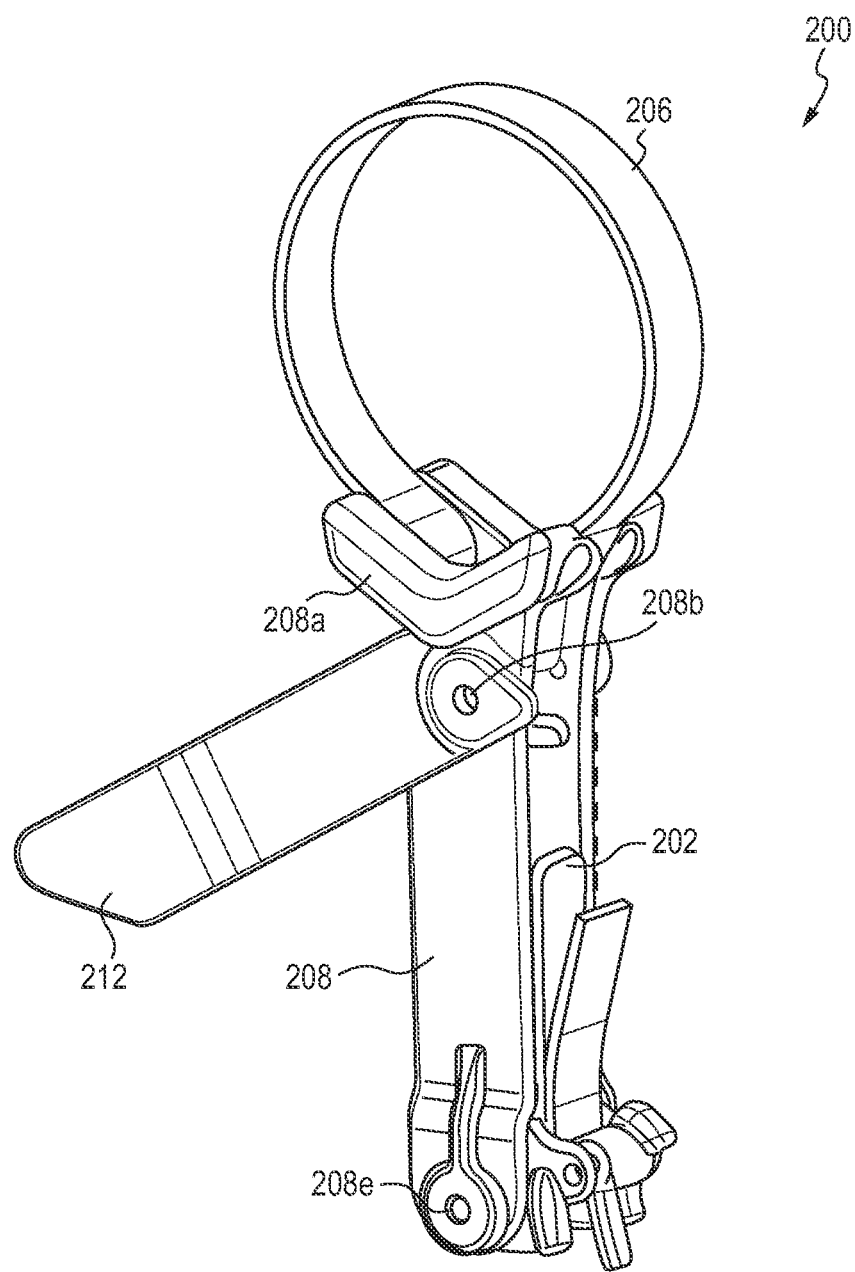
FIG. 63 schematically illustrates a perspective view of an alternate version of the tool in accordance with an embodiment of the present subject matter, wherein an arm is attached to the handle and is illustrated in an open configuration.

FIG. 63 illustrates a perspective view of the tool 200 in accordance with another embodiment of the present subject matter, wherein a positionable arm 212 is attached to the handle 208 and is illustrated in an open orientation. The arm can be attached to the handle in a variety of configurations. In many embodiments, the arm is pivotably attached to the handle at a proximal end of the arm. The tool 200 allows for the addition of different accessories and tools. The arm 212 is connected to the handle 208 of the arrangement 200 with one end pivoted about the post 208b for the strap 206.

Figure 64:
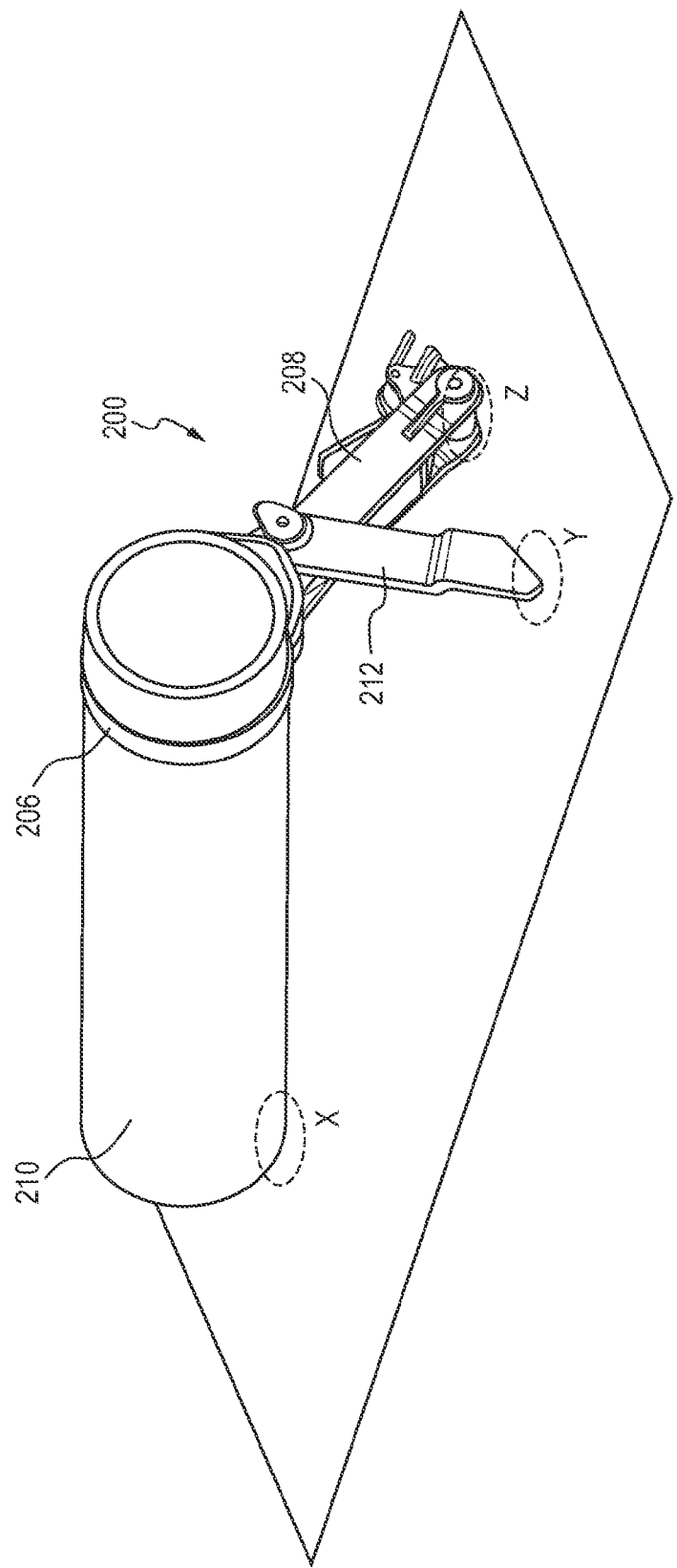
FIG. 64 schematically illustrates a perspective view of the tool of FIG. 63 engaged with a pipe in accordance with an embodiment of the present subject matter, wherein the arm is attached to the handle and is placed on a flat surface in an open configuration to support the pipe.

FIG. 64 illustrates a perspective view of the tool 200 with the strap 206 fitted around a pipe 210 in accordance with another embodiment of the present subject matter. The arm 212 is attached to the handle 208 and is placed on a flat surface in an open orientation. The configuration of the arm 212 also allows the arm to be maintained at a particular orientation with respect to the handle 208. The tool 200 with the arm 212 in an open configuration elevates the object, e.g., pipe 210, and provides a three point support (X-Y-Z). This positioning allows for further processing of the object 210 by the user.

Figure 65:
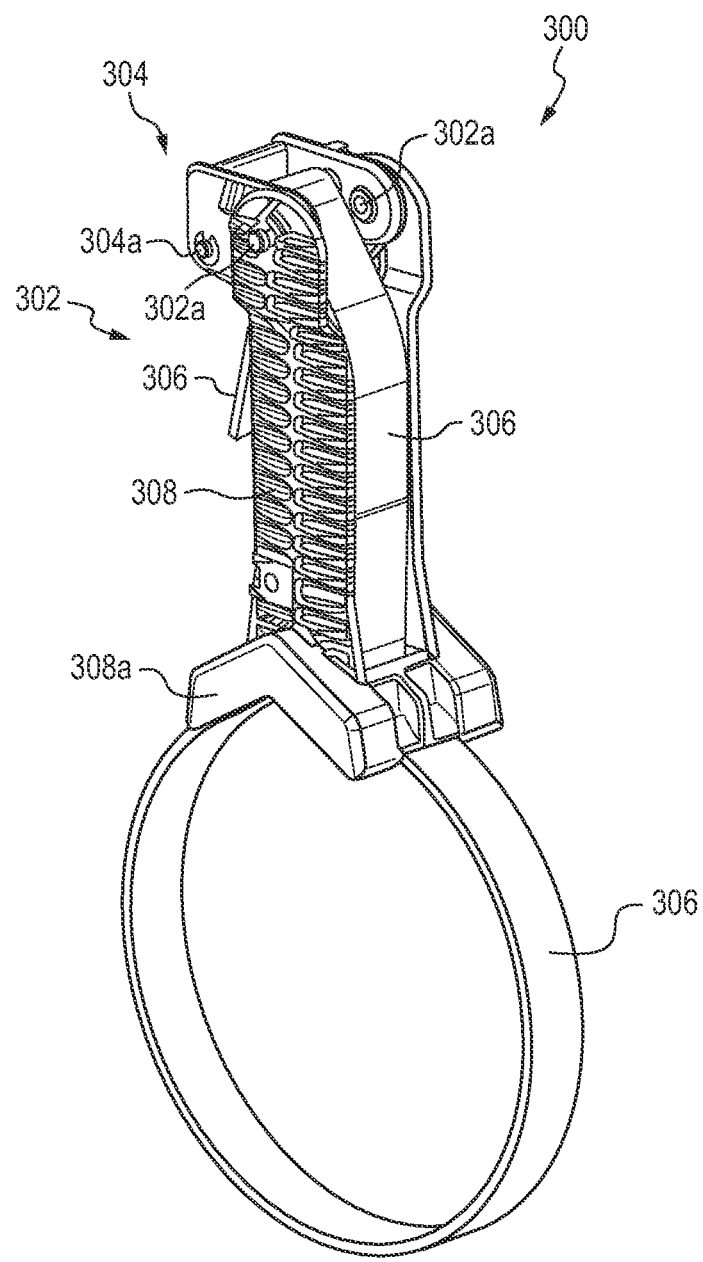
FIG. 65 schematically illustrates a perspective view of another gripping tool in accordance with an embodiment of the present subject matter.
Figure 66:
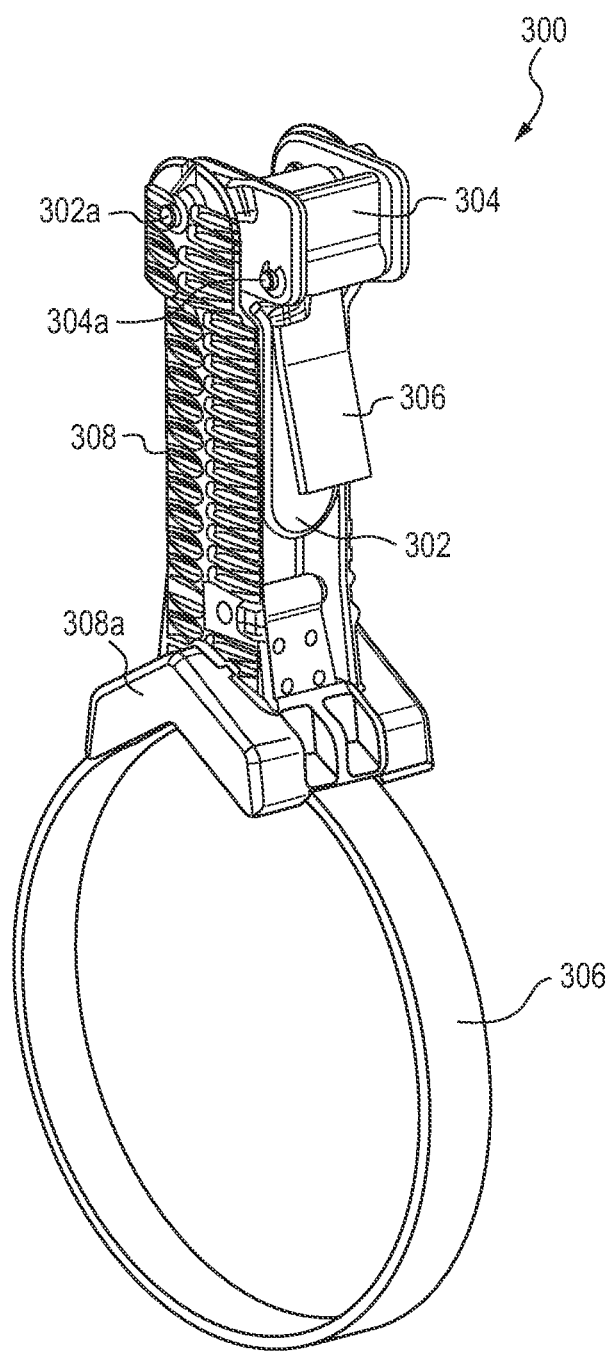
FIG. 66 schematically illustrates another perspective view of the gripping tool depicted in FIG. 65 showing an opposite side of the tool.
Figure 67:
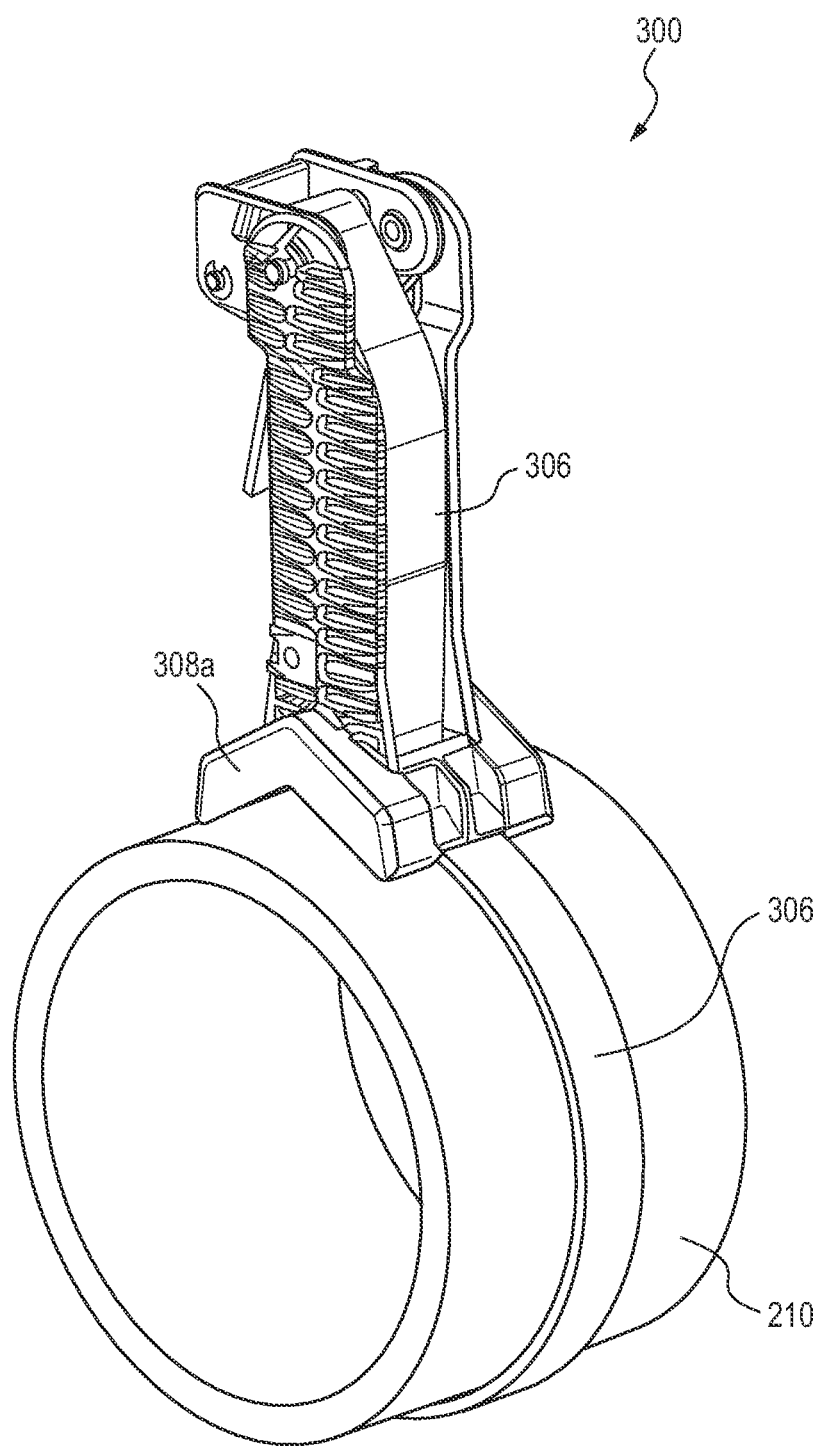
FIG. 67 schematically illustrates another perspective view of the gripping tool of FIGS. 65 and 66 showing affixment of a strap of the tool and engagement with a pipe.

FIGS. 65 and 66 illustrate a perspective view of a gripping tool 300 in accordance with another embodiment of the present subject matter. The gripping tool 300 is similar in many regards to the previously described gripping tool 200 described in association with FIGS. 42-64. The tool 300 includes a handle 308, a flexible strap 306, a lever 302 and a cam lever 304. The lever 302 is pivotably attached to the handle 308 at pin or axis 302a. The cam lever 304 is pivotably attached to the lever 302 at pin or axis 304a. The cam lever 304 is pivotable about a pivot axis defined on the lever 302 (or lever assembly) which in turn is pivotable about one end of the handle 308. The cam lever 304 includes a cam portion having teeth (not shown in FIG. 65 or 66) that engage the strap 306 and prevent the strap 306 from slipping in one direction through a region between the teeth and the handle. The cam lever 304 also includes a lever portion that a user selectively positions to release the strap 306. The opposite end of the handle 308 includes a V shaped support 308a adapted to hold or otherwise engage the surface of an object 210 to be gripped, as illustrated in FIG. 67. In many applications, the object 210 to be gripped is a hollow circular pipe. However, it is also contemplated that the object 210 can be a solid object with a regular or irregular shape.

FIG. 67 illustrates a perspective view of the tool 300 with the strap 306 wound around or otherwise extending about the object 210 which is typically a pipe in accordance with an embodiment of the present subject matter. The tool 300 allows the strap 306 to be completely disconnected from one side of a V shaped support 308a thus providing a user an option of attaching the tool 300 at any given location along the object's extended length without the need to find and insert an end of the object inside the tool 300, and specifically within a loop of the strap 306.

Figure 68:
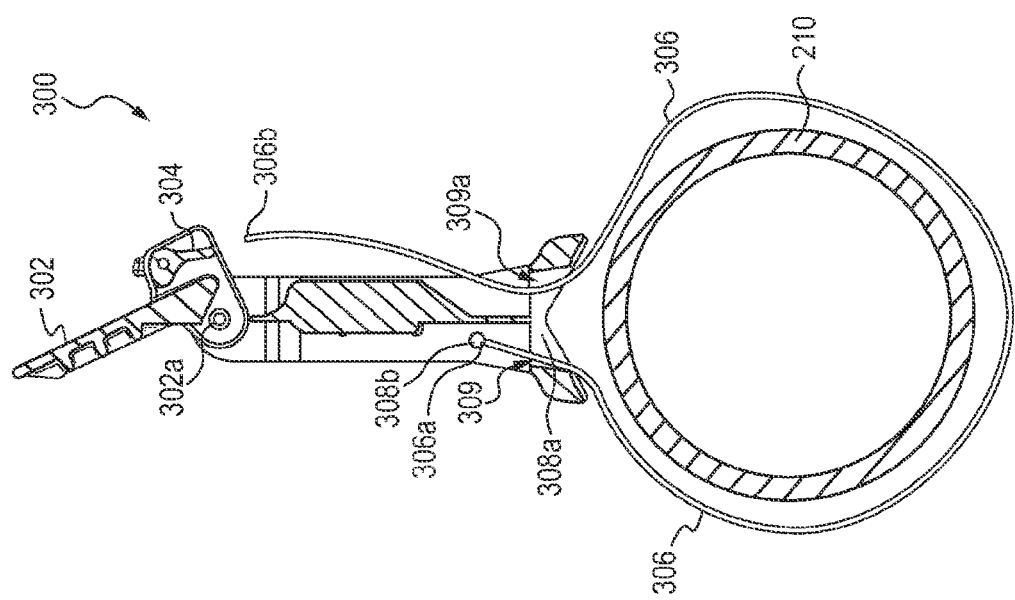
FIG. 68 schematically illustrates the tool of FIGS. 65-67, wherein the figure further illustrates an operation of encircling the pipe with the strap in accordance with an embodiment of the present subject matter.

The tool 300 and its levers 302 and 304 are similarly configured as the tool 200 and its levers 102 and 104. FIG. 68 illustrates the tool 300, wherein the figure further illustrates an operation of encircling the object 210 with the strap 306 in accordance with an embodiment of the present subject matter. The figure illustrates the strap 306 being disconnected from one end of the V shaped support 308a, wound around the object 210 and inserted into an opening located at the other end of the V shaped support 308a. Specifically, the strap 306 includes a strap end 306a attached or otherwise engaged with the handle 308 at a post 308b or other affixment member. The other end of the strap, end 306b is passed through a first access opening 309 defined in the V shaped support 308a, wound around the object 210 to be gripped, and inserted through a second access opening 309a defined in the V shaped support 308a.

Figure 69:
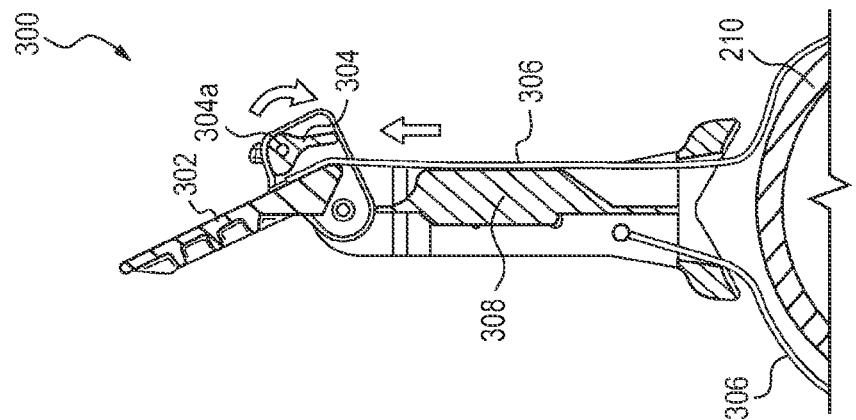
FIG. 69 schematically illustrates the tool of FIGS. 65-68, wherein the figure further illustrates another operation of passing the strap between a cam lever and a lever in accordance with an embodiment of the present subject matter.

FIG. 69 illustrates the tool 300, and further illustrates another operation of passing the strap 306 between the cam lever 304 and the handle 308, and ultimately the lever 302 in accordance with an embodiment of the present subject matter. In order to pass the strap 306 between the cam lever 304 and the lever 302, the cam lever 304 is pivoted about its pivot axis 304a to provide clearance for the strap 306 as described in greater detail herein. In many embodiments, the cam lever 304 is pressed against a springing or biasing action described in greater detail herein.

Figure 70:
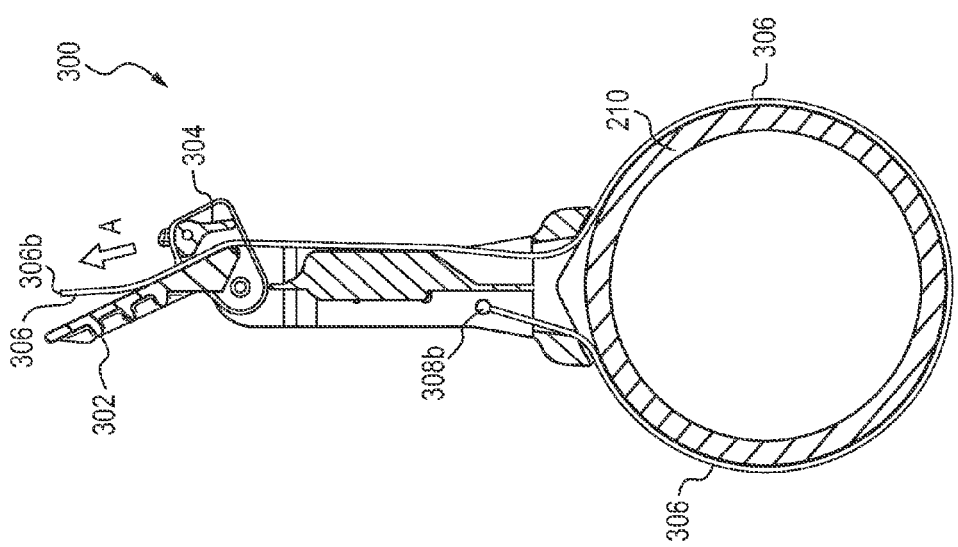
FIG. 70 schematically illustrates the tool of FIGS. 65-69, wherein the figure further illustrates another operation of pulling the strap to tighten the strap around the gripped pipe in accordance with an embodiment of the present subject matter.

FIG. 70 illustrates the tool 300, and further illustrates another operation of pulling the strap 306 to tighten it over or otherwise around the gripped object 210 in accordance with an embodiment of the present subject matter. In many embodiments, the surface of the strap 306 has a relatively high coefficient of friction in comparison to the coefficient of friction for other components of the device. This promotes gripping and assists the strap in gripping the object 210. The length of the strap 306 is sufficiently long to extend about the object 210 in addition for the strap to reach the area of locking between the cam lever 304 and the lever 302. Specifically, the strap end 306b is inserted within a region between the cam lever 304 and the lever 302 and pulled in the direction of arrow A. Typically, the strap 306 is pulled by the user until taut and until there is no slack in the strap along a length portion of the strap extending generally between the cam lever 304 and the post 308b. Once the strap 306 is in this pulled or slightly tensioned state, the cam lever 304 is positioned to engage the strap 306 and more particularly, lock the strap 306 to the assembly of the lever 302 and the cam lever 304. This configuration and locking operation is described in greater detail herein.

Figure 71:
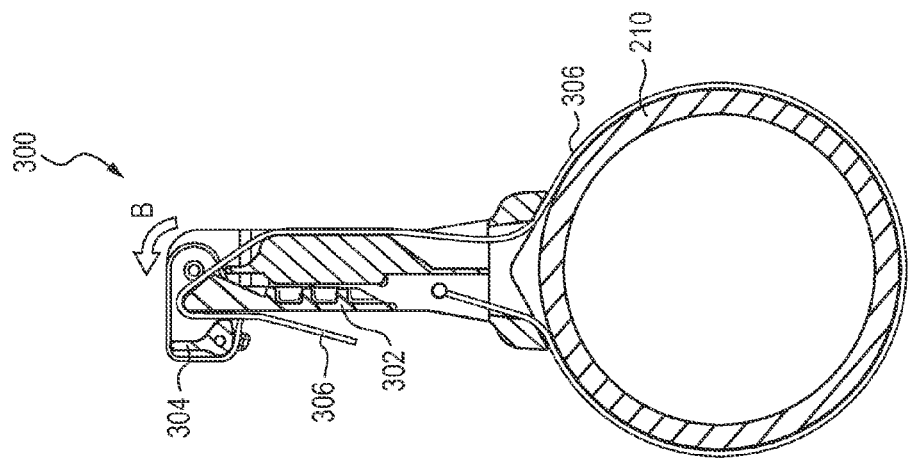
FIG. 71 schematically illustrates the tool of FIGS. 65-70, wherein the figure further illustrates another operation of positioning a lever to provide further tension and locking the strap in accordance with an embodiment of the present subject matter.

FIG. 71 illustrates the tool 300, and further illustrates another operation of rotating the lever 302 to provide further tensioning of the strap 306 in accordance with an embodiment of the present subject matter. As previously noted, once the strap 306 is inserted within the region between the cam lever 304 and the lever 302, the strap is further pulled to tighten its grip on the object 210 (as shown by arrow A in FIG. 70). The cam lever 304 is configured to engage and lock the strap 306 and prevent any movement of the strap 306. The cam lever 304 "bites into" or otherwise engages the strap 306 and prevents the strap 306 from slippage when the lever 302 is rotated as shown in FIG. 71 by arrow B to further tighten the strap 306 around the pipe 210.

Figure 72:
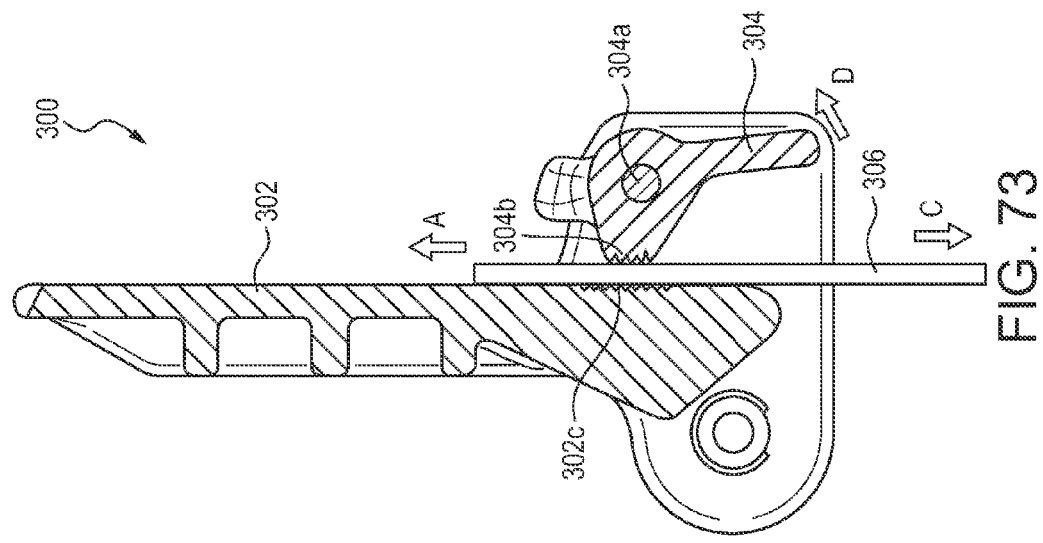
FIG. 72 schematically illustrates a cam lever and lever assembly used in the tool of FIGS. 65-67, wherein the assembly is in an unlocked configuration in accordance with an embodiment of the present subject matter.

FIG. 72 illustrates the cam lever 304 and lever 302 assembly of the tool 300, wherein the cam lever 304 is in an unlocked position relative to the strap 306 and the lever 302 in accordance with an embodiment of the present subject matter. Upon positioning the cam lever 304 to this unlocked position, the strap 306 can freely move in the directions of arrows A and C.

Figure 73:
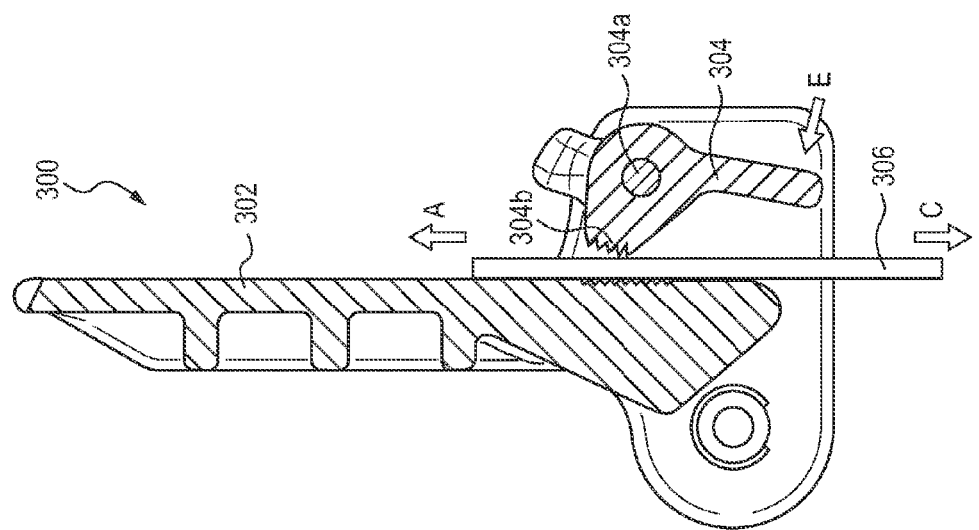
FIG. 73 schematically illustrates the cam lever and lever assembly, wherein the assembly is in a locked configuration in accordance with an embodiment of the present subject matter.

FIG. 73 further illustrates the cam lever 304 and the lever 302 and their assembly of the tool 300. The cam lever 304 is in a locked position relative to the strap 306 and the lever 302 in accordance with an embodiment of the present subject matter. Upon positioning the cam lever 304 to this locked position, the strap 306 is prevented from movement in the direction of arrow C. Thus, the cam lever 304 is positionable between locked and fully unlocked positions. Instead, if the strap 306 is pulled in the direction of arrow A with sufficient force, the strap 306 can be repositioned, i.e., further tensioned, relative to the cam lever 304. The cam lever 304 includes a strap engagement region 304b which in many embodiments may include a plurality of outwardly extending ridges or "teeth" to promote gripping of the strap 306. The present subject matter also includes providing a strap engagement region 302c along a portion of the lever 302. The strap engagement region 302c can include a plurality of outwardly extending ridges or "teeth" to promote gripping of the strap 306.

FIGS. 72 and 73 also illustrate a biasing provision used in many embodiments of the present subject matter gripping tools. Biasing provisions can be included in the assembly of the cam lever 304 and the lever 302 to bias the cam lever 304 in the direction of arrow D, about the pivot axis 304a, toward a locking position. The biasing provisions can be provided in a variety of different forms such as for example a torsion spring. The biasing provisions urge the cam lever 304 to rotate about the pivot axis 304a in the direction of arrow D, and if the strap 306 is positioned between the cam lever 304 and the lever 302 as shown in FIG. 73, the strap engagement region 304b of the cam lever 304 is urged into contact with the strap 306. FIG. 72 illustrates unlocking the cam lever 304 from engagement with the strap 306 by applying a force to the cam lever 304 in the direction of arrow E. The force is sufficient to overcome the biasing force otherwise urging the cam lever 304 in the direction of arrow D in FIG. 73.

FIGS. 72 and 73 further illustrate additional details and aspects of the locking and unlocking of the strap 306 between the cam lever 304 and the lever 302. In this embodiment, and as previously described, the cam lever 304 is biased to pivot about its pivot axis 304a in the direction of arrow D. With the cam lever 304 in the locked position as shown in FIG. 73, the strap 306 is locked and precluded from movement in the direction of arrow C. If the strap 306 is pulled in the other direction shown by arrow A, the cam lever 304 pivots in the direction of arrow E and thereby allows the strap 306 to slide past the teeth or locking region 304b of the cam lever 304 and the lever 302. When the cam lever 304 is depressed against the biasing spring or other biasing provisions, as shown by arrow E illustrated in FIG. 72, the cam lever 304 opens and allows the strap 306 to slide freely through the gap or clearance between the cam lever 304 and the lever 302. Thus, the cam lever 304 is biased toward the locked position depicted in FIG. 73.

In the locked position, illustrated in FIG. 73, the teeth or locking area 304b holds the strap 306 firmly and prevents any slippage. Because of the asymmetrical cam surface, the engagement of the locking area 304b into the strap 306 increases with an increasing pull force shown by arrow C, illustrated in FIGS. 72 and 73.

Figure 74:
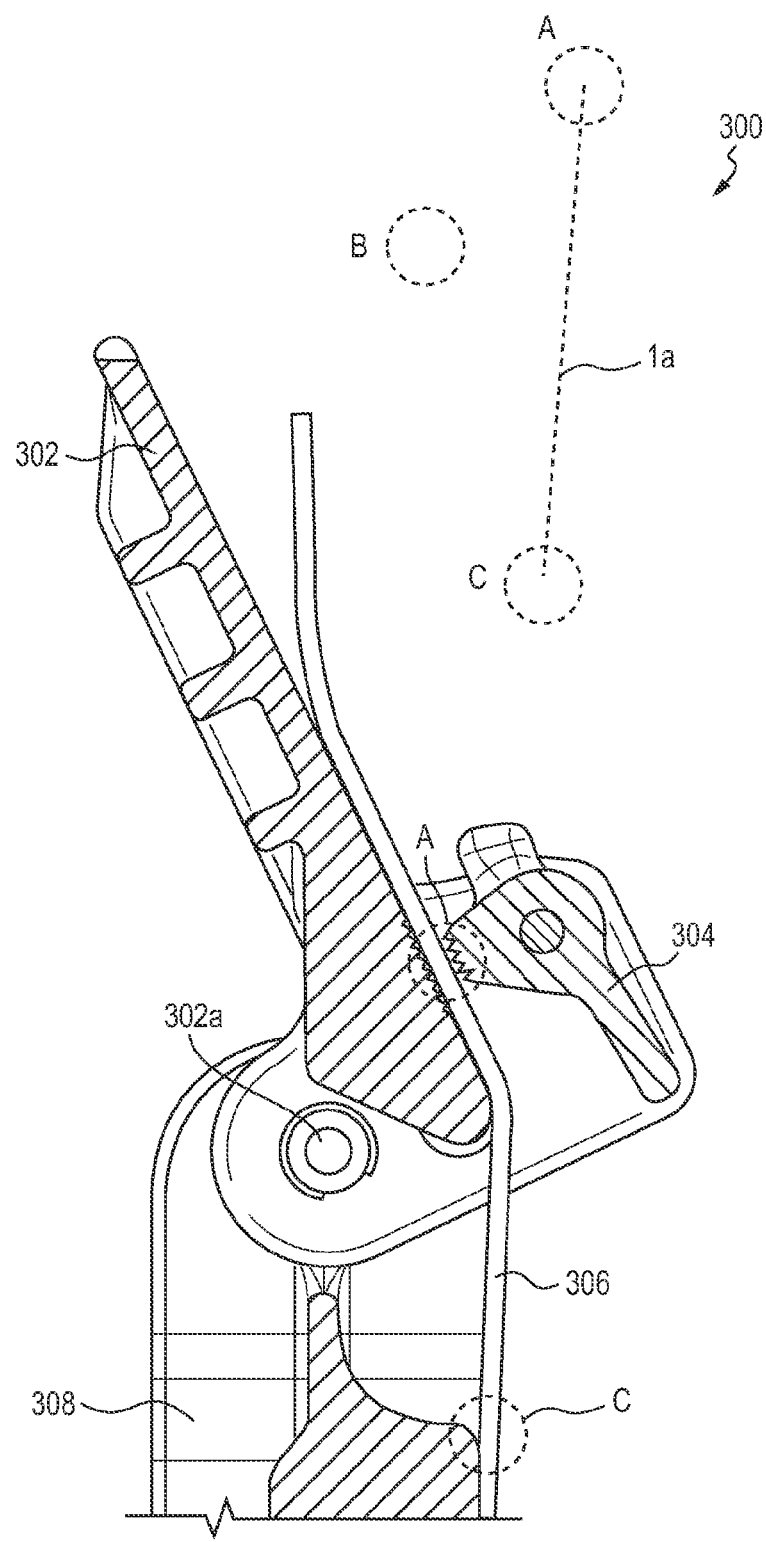
FIG. 74 schematically illustrates a geometric representation of three points of an arrangement of the tool of FIGS. 65-67, wherein the lever is in a pulled configuration with about 30° of rotation from its open position in accordance with an embodiment of the present subject matter.

FIG. 74 illustrates a geometric representation of three points on the tool 300, wherein the lever 302 is in a pulled configuration in accordance with an embodiment of the present subject matter. The term "pulled configuration" refers to the position of the lever 302 which enables the strap 306 to be pulled in the direction of arrow A shown for example in FIG. 73. "A" represents the point(s) of contact on the strap 306 held between the cam lever 304 and the lever 302, "C" represents the point(s) of contact of the strap 306 on the handle 308, and "B" represents the pivot axis about which the lever 302 is rotated, i.e., pivoted about axis 302a. Line 1a is the distance between "A" and "C" when the lever 302 is in the pulled configuration, i.e., the lever 302 is oriented at about 30° from a longitudinal axis of the handle 308.

Figure 75:
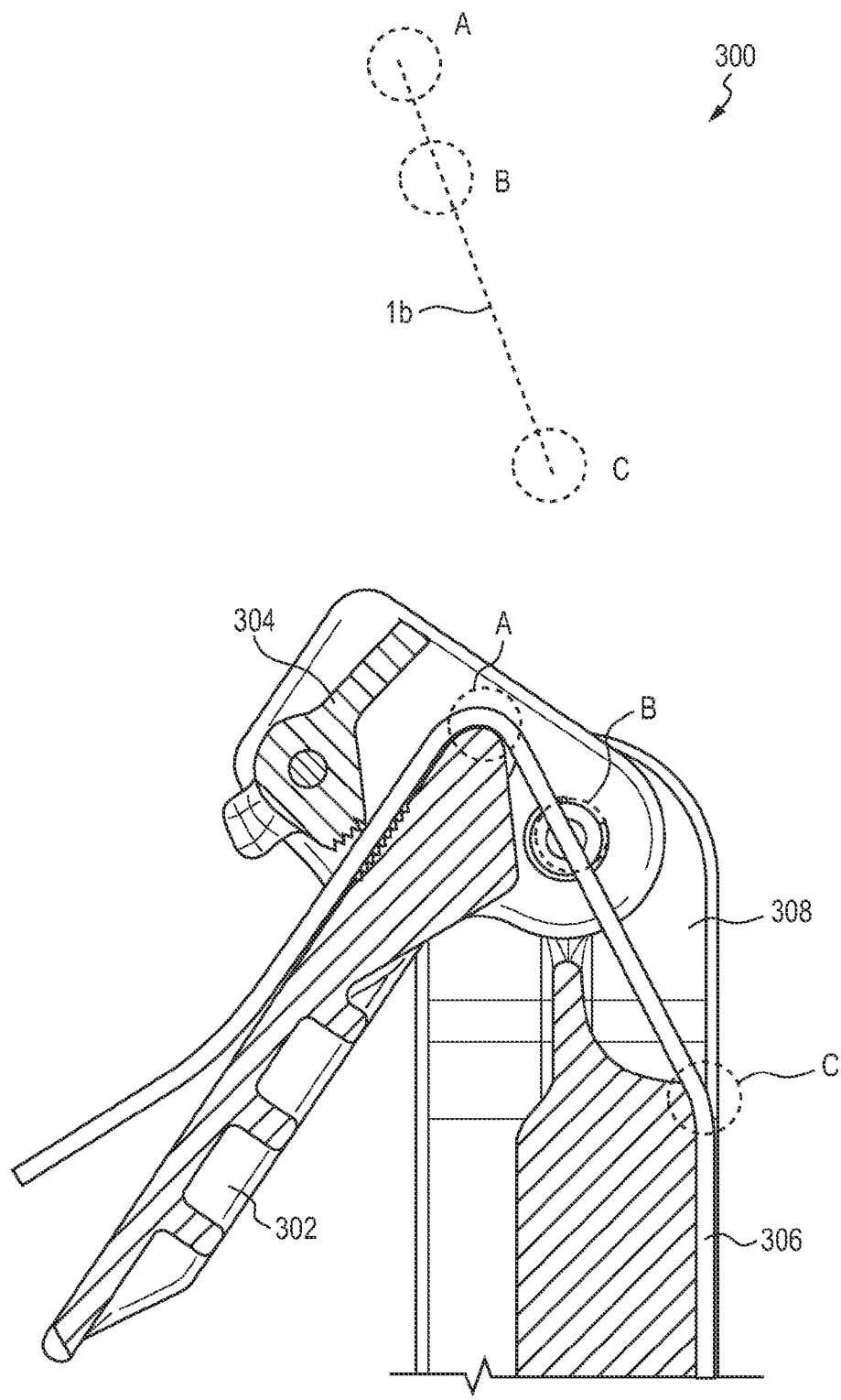
FIG. 75 schematically illustrates a geometric representation of the three points of the arrangement of FIG. 74, wherein the lever is rotated by about 120° from its open position in accordance with an embodiment of the present subject matter.

FIG. 75 illustrates a geometric representation of the three points on the tool 300, wherein the lever 302 is rotated by about 90° from its position shown in FIG. 74, in accordance with an embodiment of the present subject matter. Line 1b represents the distance between "A" and "C" when the lever 302 is rotated by about 120° from the longitudinal axis of the handle 308. In this position of the lever 302, the locations A, B, and C are generally aligned along the line 1b.

Figure 76:
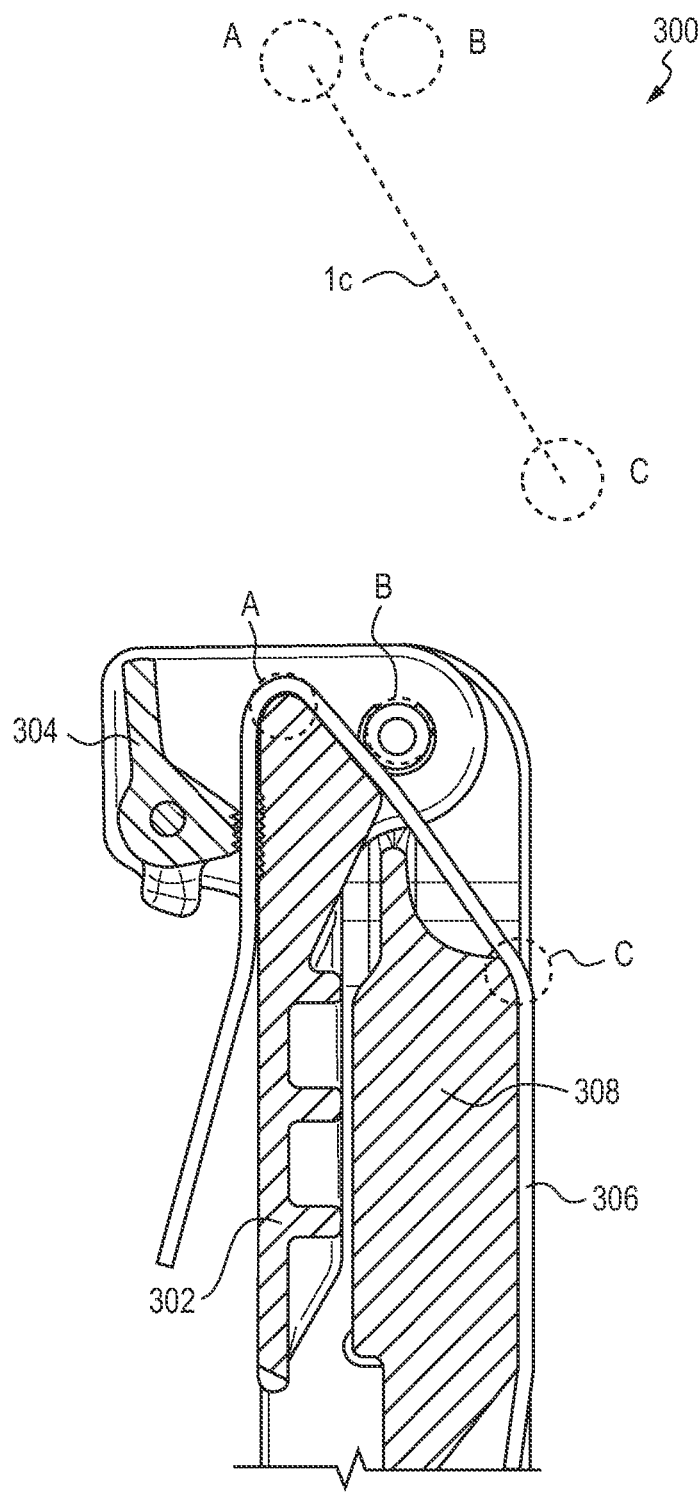
FIG. 76 schematically illustrates a geometric representation of the three points of the arrangement, wherein the lever is rotated by about 180° from its open position in accordance with an embodiment of the present subject matter.

FIG. 76 illustrates a geometric representation of the three points on the tool 300, wherein the lever 302 is rotated to a fully closed position in which the handle 302 is generally aligned along the handle 308 and/or the longitudinal axis of the handle 308. Line 1c represents the distance between "A" and "C" when the lever 302 is in this fully closed position.

Figure 77:
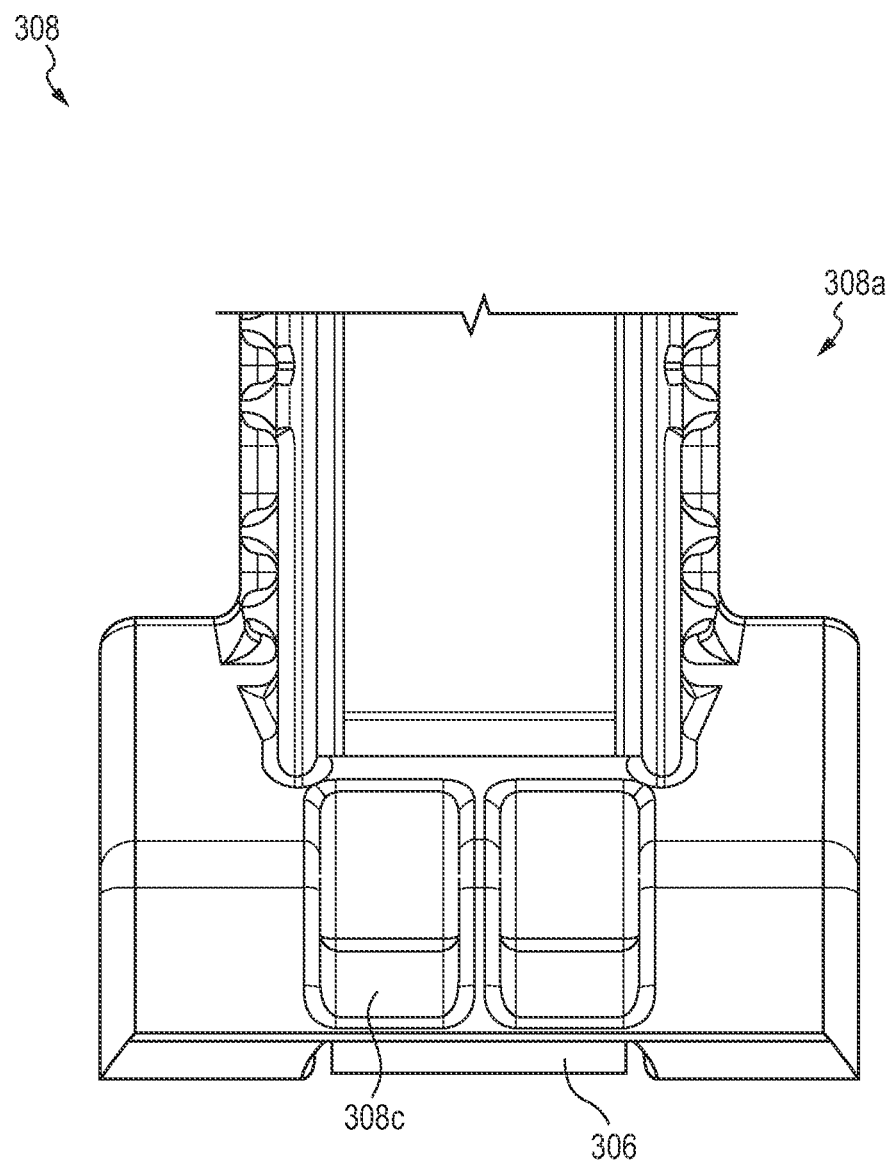
FIG. 77 schematically illustrates a detailed view of a working end of the handle used in the tool of FIGS. 65-67 in accordance with an embodiment of the present subject matter.

FIG. 77 illustrates a detailed view of a working end of the handle 308 including the V support 308a used in the tool 300 in accordance with an embodiment of the present subject matter. The V support 308a of the handle 208 further includes a slot cover 308c. The slot cover 308c is configured to absorb the force exerted by the strap 306 when tightened about the object 210 and pulled along a holding surface of the handle 308. The slot cover 308c also assists in reducing the gap between the strap 306 and the handle 308 surface thus ergonomically proving beneficial for a firmer grip of the handle 308 by the user. The width of the V support 308a is relatively large to allow sufficient surface contact between the handle 308 and the object 210 thus reducing the potential for tilting of the handle (wobbling) when a lateral force (along the main axis of the pipe) is applied to the handle 308.

Figure 78:
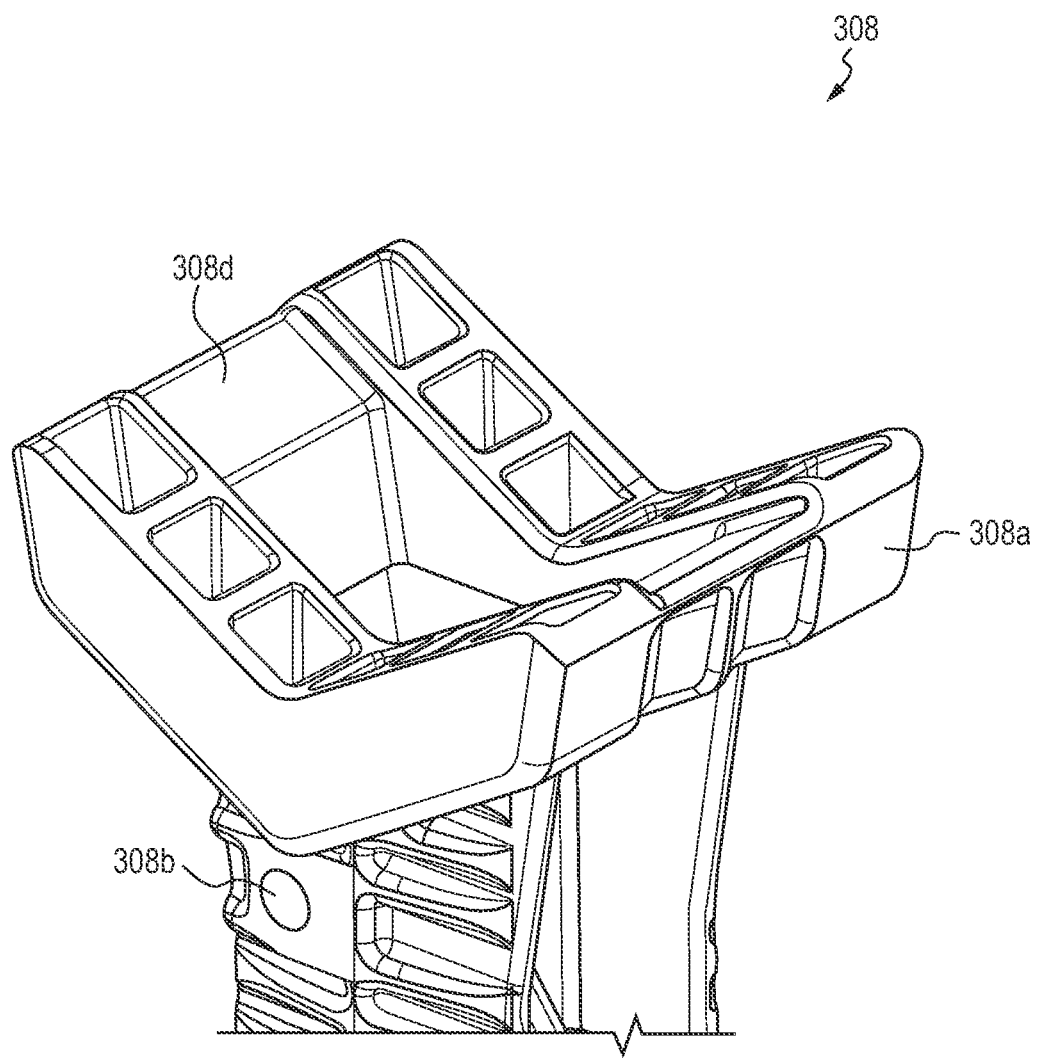
FIG. 78 schematically depicts a perspective detailed view of the working end of the handle used in the tool of FIGS. 65-67 in accordance with an embodiment of the present subject matter.

FIG. 78 illustrates a perspective view of the working end of the handle 308 used in the tool in accordance with an embodiment of the present subject matter. The V support 308a for the handle 308 further includes a recessed groove 308d to provide a guide way for the passage of the strap. The recessed groove 308d is defined along a face of the V shaped support 308a which, during use of the tool, is directed toward the object to be gripped. That face of the V shaped support is generally directed away from the handle 308. The groove 308*d* prevents movement of the strap 306 and avoids slipping. In accordance with an embodiment, the depth of the groove 308*d* is greater than the thickness of the strap 306. In accordance with another embodiment, the depth of the groove 308*d* is less the thickness of the strap 306. As previously described, the working end of the handle 308 includes a post 308*b* or connector for the strap 306 (not shown) on the body of the handle 308. This arrangement fixes the strap 306 to the handle 308 while freely allowing the other end of the strap 306 to be wound around the surface of the object 210 and reinserted via the groove 308*d* and the slot cover 308*c* of the V support 308*a*.

Figure 79:
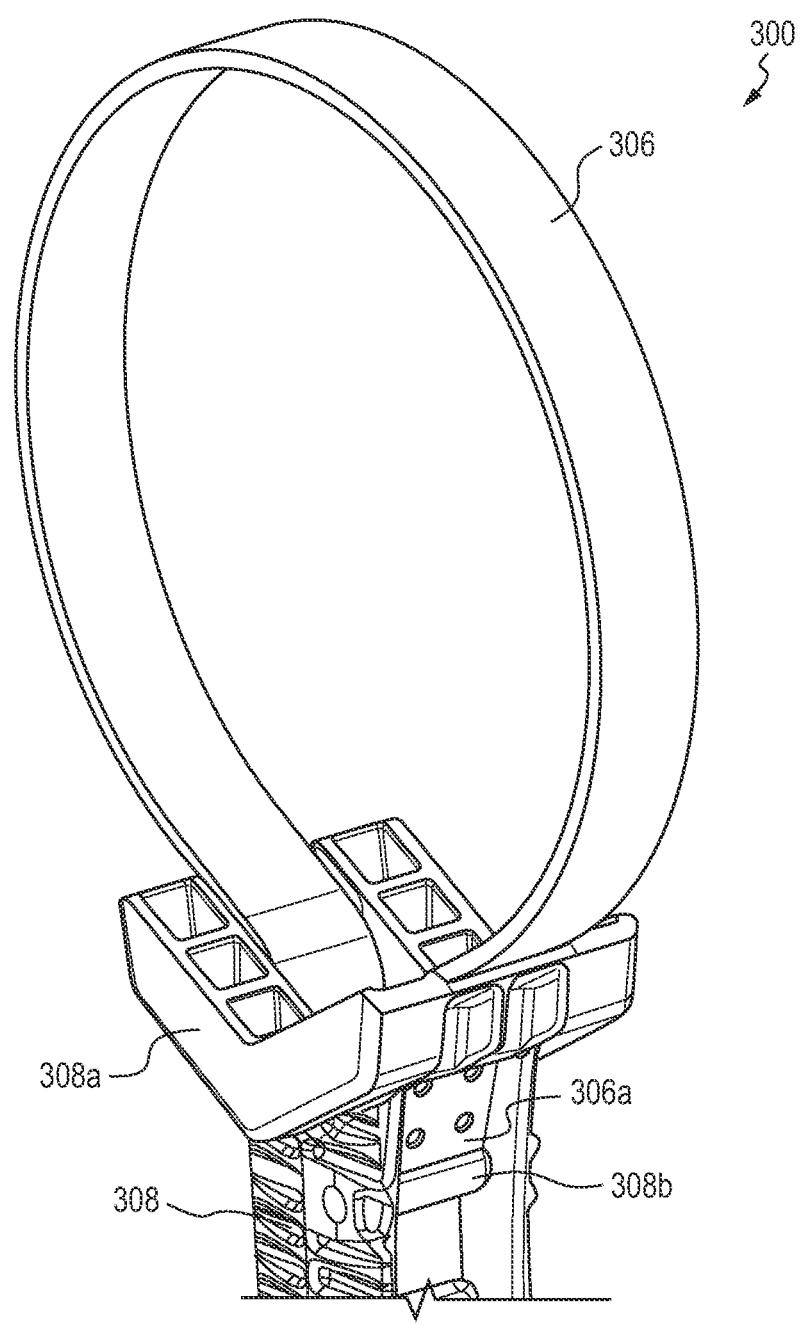
FIG. 79 schematically illustrates a perspective view of the strap of the tool extending from a V support in the tool of FIGS. 65-67 in accordance with an embodiment of the present subject matter.

FIG. 79 illustrates the strap 306 wound in the V support 308*a* in accordance with an embodiment of the present subject matter. One end 306*a* of the strap is affixed to the post 308*b*.

Figure 80:
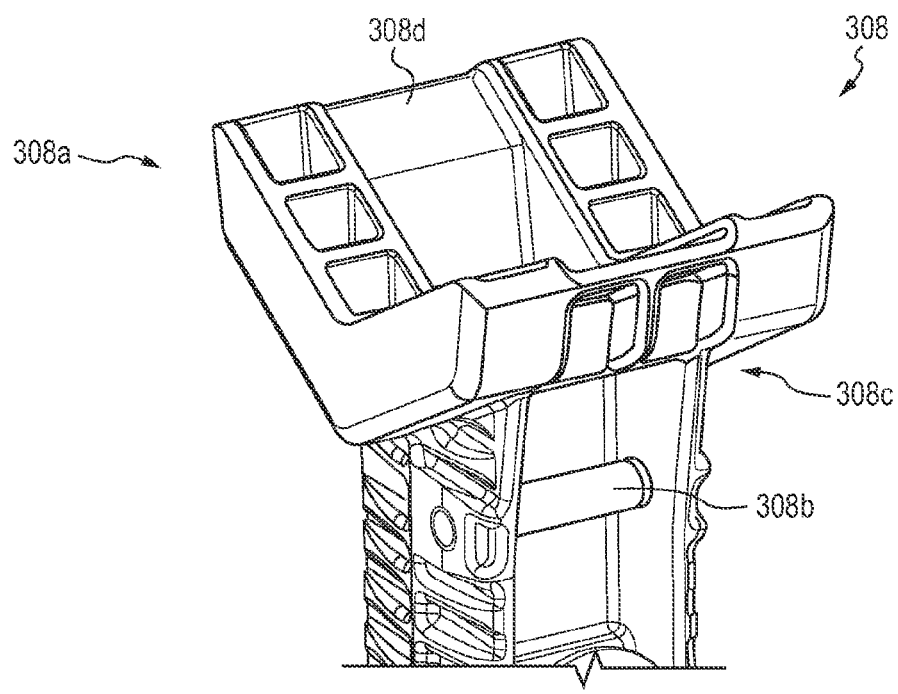
FIG. 80 schematically illustrates a perspective view of the handle of the tool of FIGS. 65-67 in accordance with an embodiment of the present subject matter.

FIG. 80 illustrates a perspective view of the handle 308 of the tool 300 in accordance with an embodiment of the present subject matter. One end, i.e., the working end, of the handle 308 includes the V shaped support 308*a* while on the other end, i.e., the distal end (not shown), the handle 308 includes openings for receiving the pivotable lever 302. In many embodiments, the handle 308 further includes an ergonomic surface to provide for a better grip by the user. FIG. 80 also shows the post 308*b*, the slot cover 308*c*, and the recessed groove 308*d*.

Figure 81:
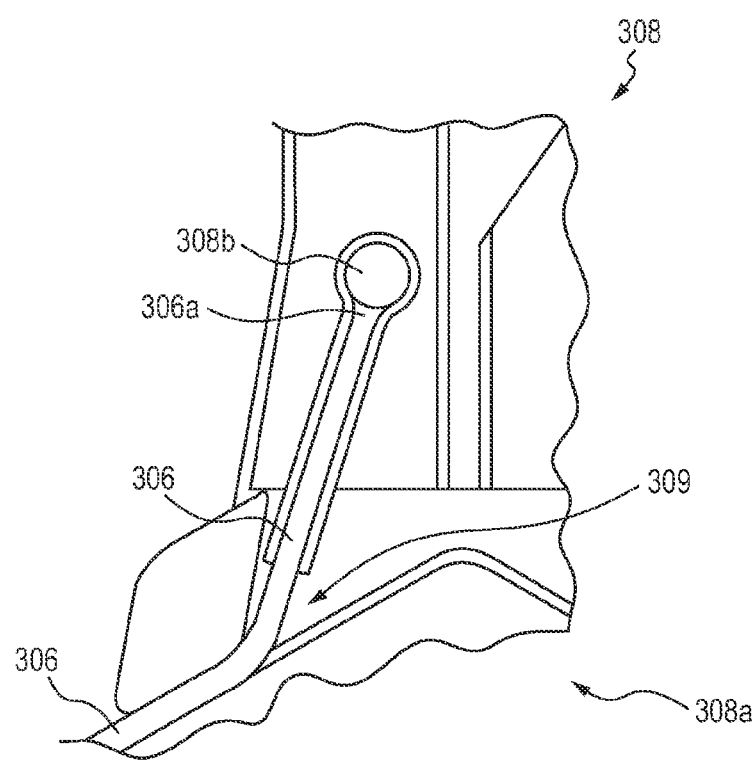
FIG. 81 is a schematic view illustrating engagement of the strap and handle of the tool of FIGS. 65-67 in accordance with an embodiment of the present subject matter.

FIG. 81 is a schematic view depicting affixment of the end 306*a* of the strap 306 with the post 308*b* of the handle 308. Passage of the strap 306 through clearance 309 provided in the V shaped support 308*a* is also shown.

Figure 82:
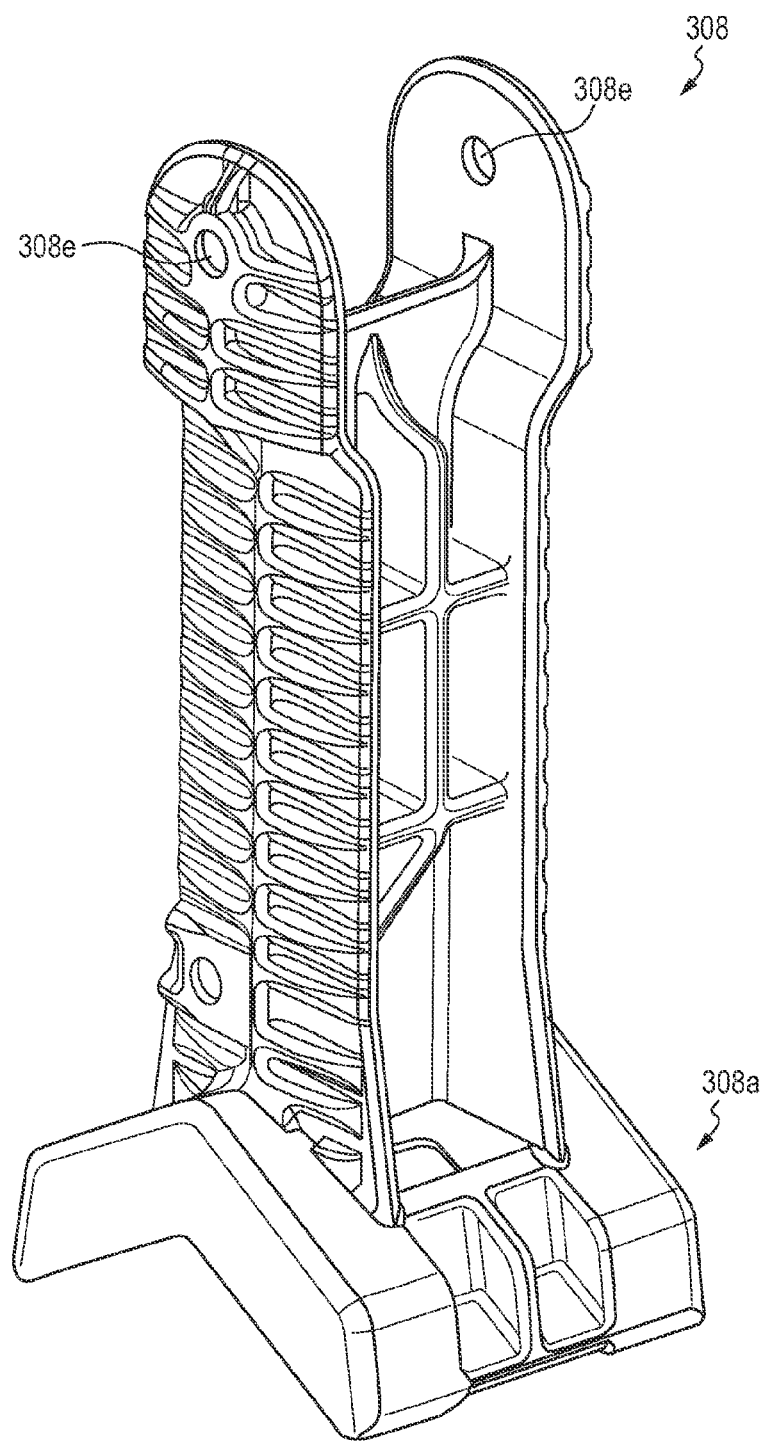
FIG. 82 is a perspective view of the handle used in the tool of FIGS. 65-67 in accordance with the present subject matter.

FIG. 82 is a perspective view of the handle 308 of the tool 300. The V shaped support 308*a* is located at the working end of the handle, while on the other end of the handle, i.e., the distal end, the handle 308 includes openings 308*e* for receiving the pivotable lever 302.

Figure 83:
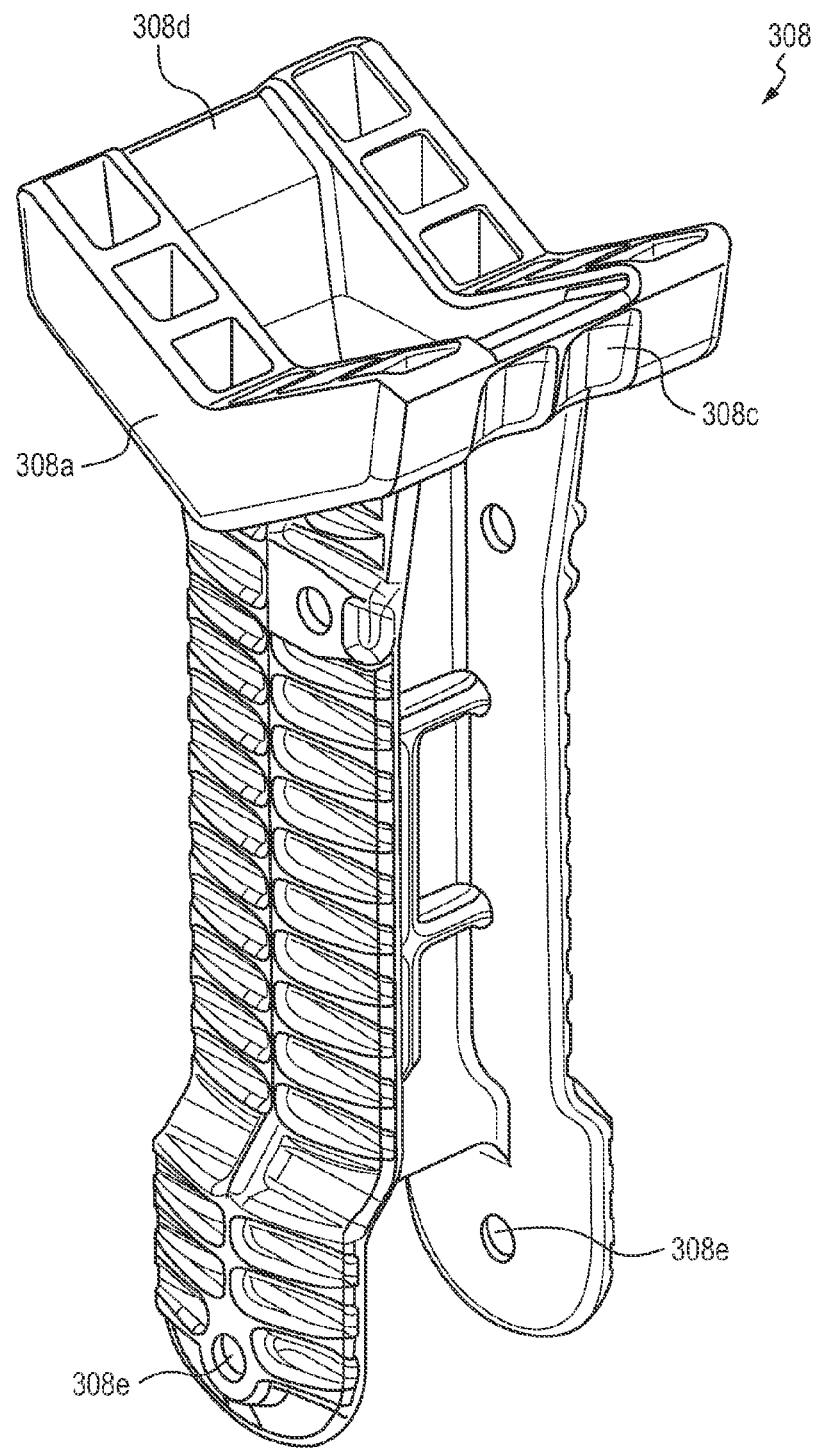
FIG. 83 is another perspective view of the handle used in the tool of FIGS. 65-67.

FIG. 83 illustrates a perspective view of the handle 308 of the tool 300 in accordance with an embodiment of the present subject matter. One end, i.e., the working end, of the handle 308 includes the V shaped support 308*a* while on the other end, i.e., the distal end, the handle 308 includes openings 308*e* for receiving the pivotable lever 302. In many embodiments, the handle 308 further includes an ergonomic surface to provide for a better grip by the user. FIG. 83 also shows the slot cover 308*c*, and the recessed groove 308*d*.

Figure 84:
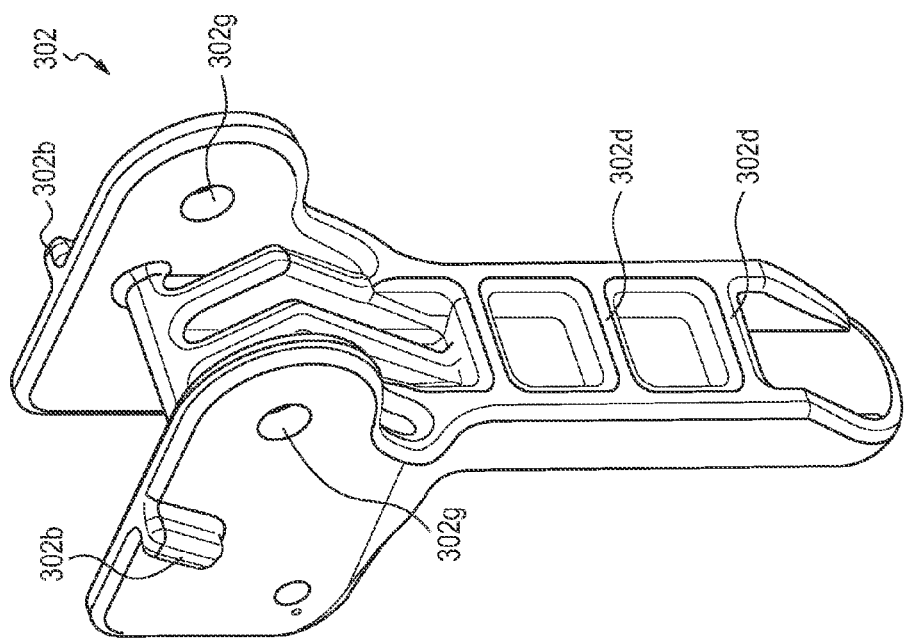
FIG. 84 is a perspective view of the lever used in the tool of FIGS. 65-67 in accordance with the present subject matter.

FIG. 84 illustrates a perspective view of the lever 302 with a plurality of ribs 302*d* for reinforcing the lever 302 in accordance with an embodiment of the present subject matter. The lever 302 further includes two lever pivot holes 302*g* or apertures for receiving the pivot pin 302*a*. The lever 302 pivots about the pivot pin(s) (not shown) mounted collinearly between each of the openings 308*e* (shown in FIG. 83) with each of the lever pivot holes 302*g*. The lever 302 also further includes two lever stoppers 302*b* on opposite sides as illustrated in the FIG. 84. The two lever stoppers 302*b* limit the pivoting action of the lever 302 about the two pins by contacting matching surfaces on the handle 308.

Figure 85:
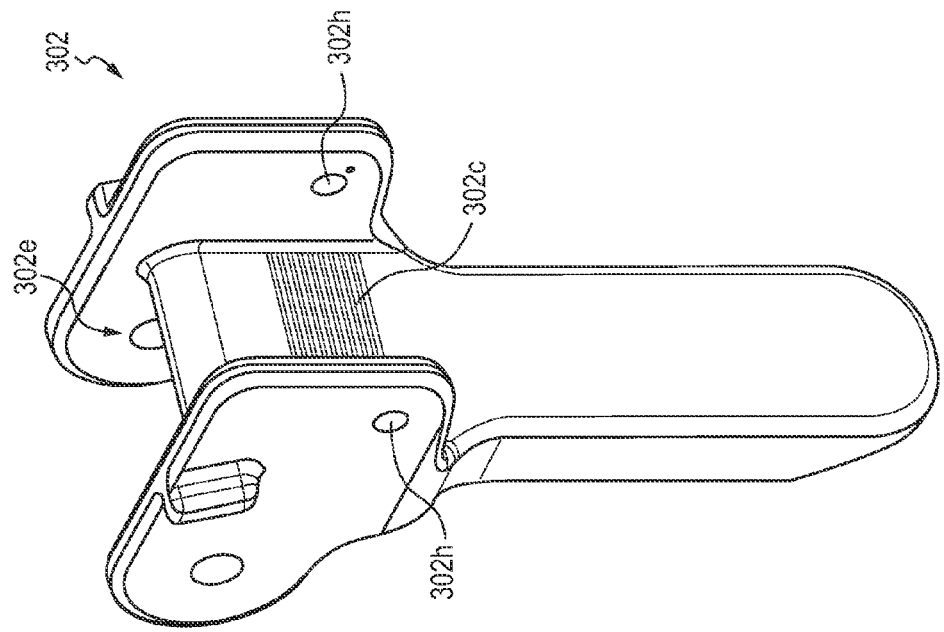
FIG. 85 is another perspective view of the lever used in the tool of FIGS. 65-67.

FIG. 85 illustrates a perspective view of the lever 302 with the lever locking area 302*c* illustrated in the figure in accordance with an embodiment of the present subject matter. The lever 302 further includes two cam lever pivot holes 302*h* on opposite sides of the lever 302 which assist in pivoting the cam lever 304 on the lever 302. As previously described, the lever locking area 302*c* includes means to increase the coefficient of friction between the lever 302 and the strap 306. With the action of the cam lever 304, the surface of the strap 306 with its friction along with the friction of the lever locking area 302*c* assist in locking the strap 306 in one position. The lever 302 also further includes a cam attachment space 302*e* to accommodate the cam lever 304.

Figure 86:
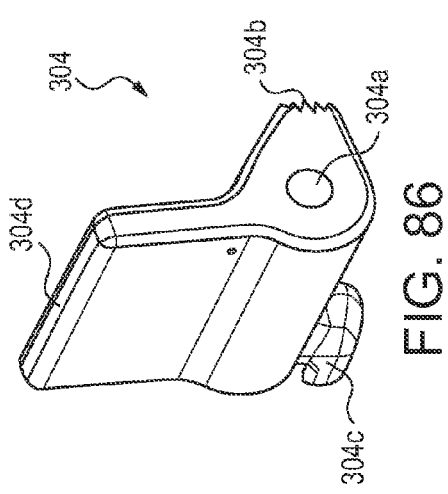
FIG. 86 is a perspective view of the cam lever used in the tool of FIGS. 65-67 in accordance with the present subject matter.
Figure 87:
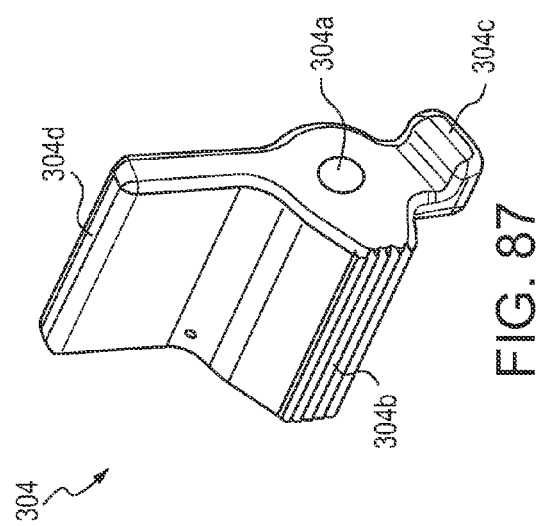
FIG. 87 is another perspective view of the cam lever used in the tool of FIGS. 65-67.

FIGS. 86 and 87 illustrate a perspective view of the cam lever 304 with the cam locking area 304*b* illustrated in the figures in accordance with an embodiment of the present subject matter. The cam lever 304 serves as a locking and unlocking member for the tool. In certain embodiments, a spring (not shown) biases the cam lever 304 towards a locked position and assists with the locking operation of the strap 306 between the cam lever 304 and the lever 302. Depressing the cam lever 304 against the biasing or spring force unlocks the strap 306 from the lever 302 and thus the tool 300. The locking and unlocking operation is carried by the pivoting movement of the cam lever 304 about a cam pivot hole 304*a* within the body of the cam lever 304. The cam locking area 304*b* includes means to increase the coefficient of friction between the cam locking area 304*b* and the strap 306 to lock the strap 306 in one direction. The cam lever 304 also further includes a cam stopper 304*c* which limits the rotation of the cam lever 304 about the cam attachment made between the cam lever 304 and the lever 302. The cam lever 304 also further includes an actuator 304*d* designed to facilitate ergonomic comfort when locking and unlocking the cam lever 304.

The cam stopper 304*c* may be in a variety of different forms. For example in many embodiments the cam stopper 304*c* is in the form of a single laterally extending member 304*c* which extends outward beyond the width of the cam lever actuator 304*d*. The cam stopper 304*c* is configured and positioned on the cam lever 304 such that upon pivotable attachment of the cam lever 304 to the lever 302, upon positioning the cam lever 304 to a fully opened or fully unlocked position relative to the lever 302, the cam stopper 304*c* contacts one or more portions of the lever 302.

Figure 88:
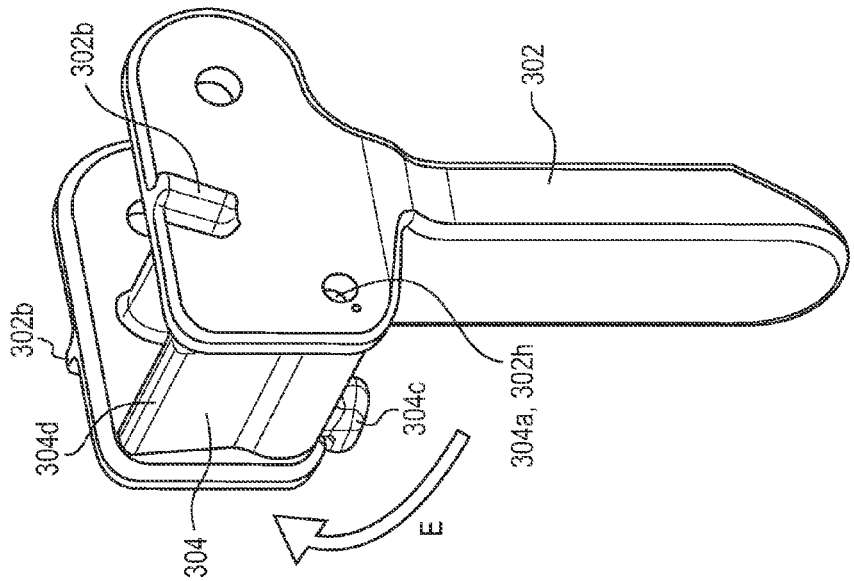
FIG. 88 is another perspective view of the cam lever engaged with the lever used in the tool of FIGS. 65-67 in accordance with the present subject matter.

FIG. 88 illustrates a perspective view of the cam lever 304 pivotably engaged with the lever 302 in accordance with an embodiment of the present subject matter. In certain versions and as previously described, the cam lever 304 is attached in a way wherein the actuator 304*d* is depressed in the direction in the direction of arrow E to its position represented in FIG. 88 in order to unlock the strap 306 (not shown in FIG. 88). The figure also illustrates the limiting rotation of the cam lever 304 with the cam lever stopper 304*c* resting against the lever 302.

Figure 89:
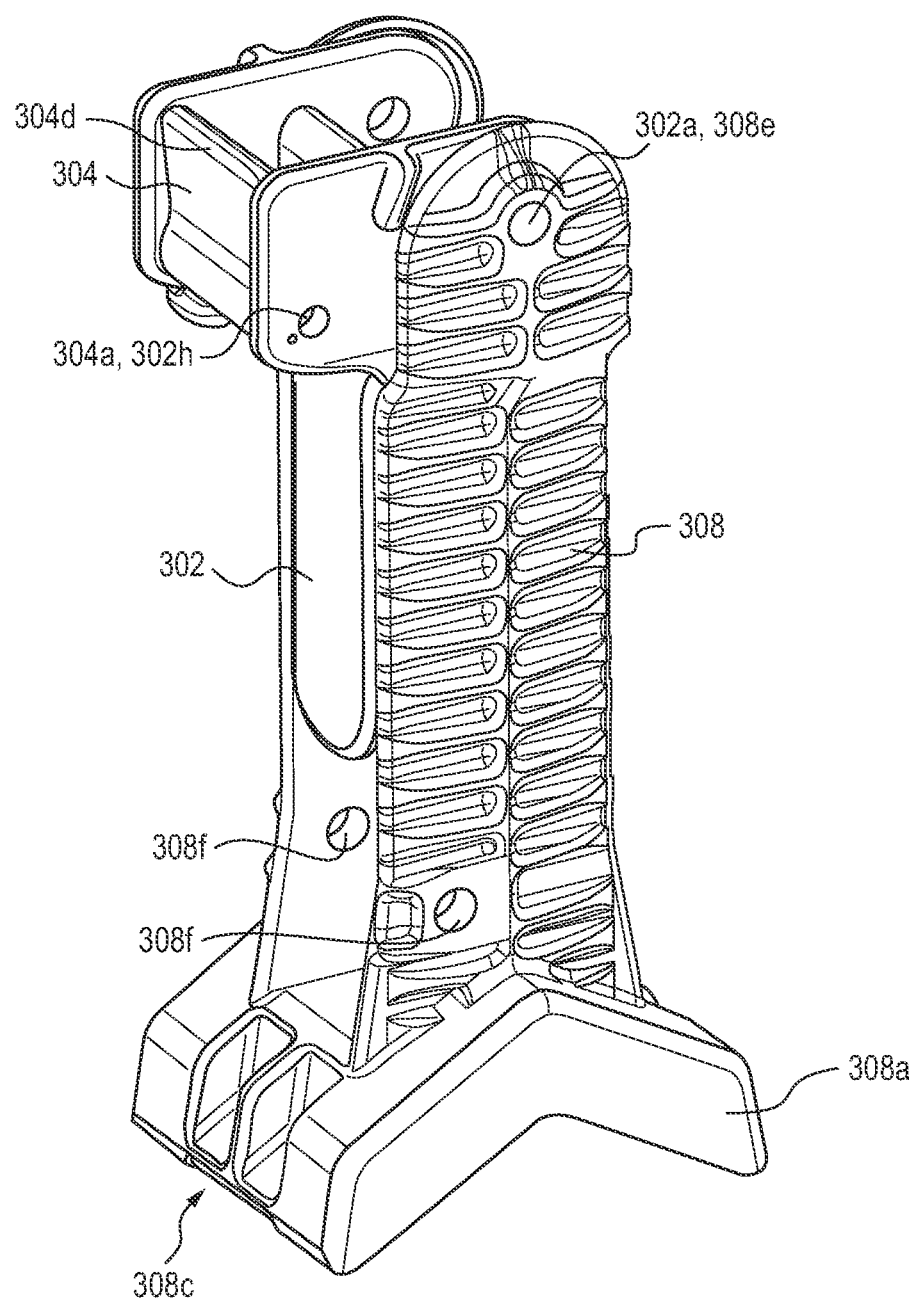
FIG. 89 is a perspective view showing the cam lever, the lever, and the handle used in the tool of FIGS. 65-67.
Figure 90:
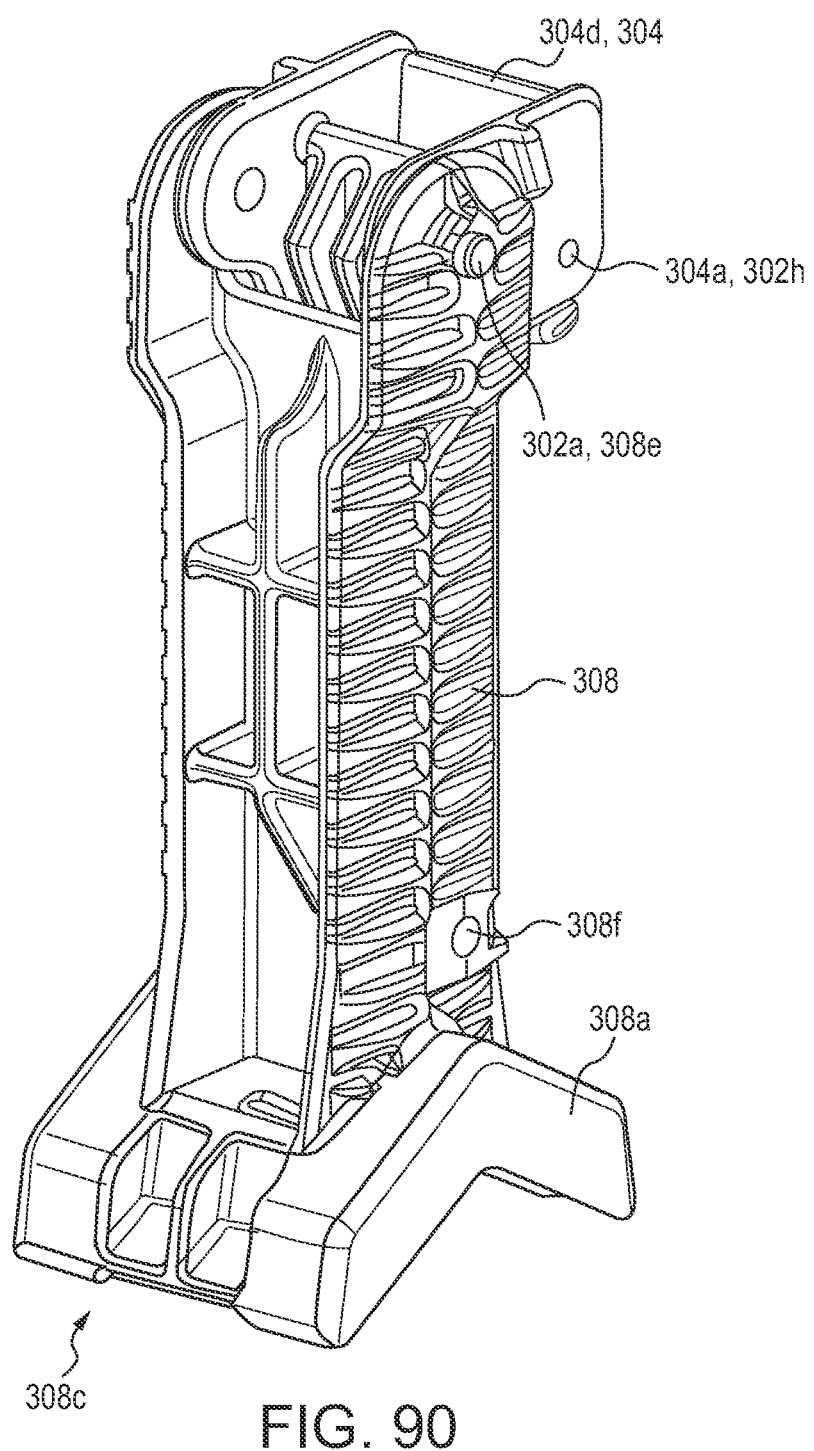
FIG. 90 is another perspective view of the assembly of the cam lever, the lever, and the handle of the tool of FIGS. 65-67.

FIGS. 89 and 90 each illustrate a perspective view of the cam lever 304 with the lever 302 and the handle 308 assembly in accordance with an embodiment of the present subject matter. FIG. 89 illustrates the cam lever actuator 304*d*, pivotal engagement between the cam lever 304 and the lever 302 at pivot axis 304*a* provided by pivot pins or other member(s) extending in apertures 302*h*, pivotal engagement between the lever 302 and the handle 308 at pivot axis 302*a* provided by pivot pins or other member(s) extending in apertures 308*e*. The handle 308 includes the previously noted V shaped support 308*a*, apertures 308*f* for receiving the post 308*b* (not shown), and the slot cover 308*c*.

Figure 91:
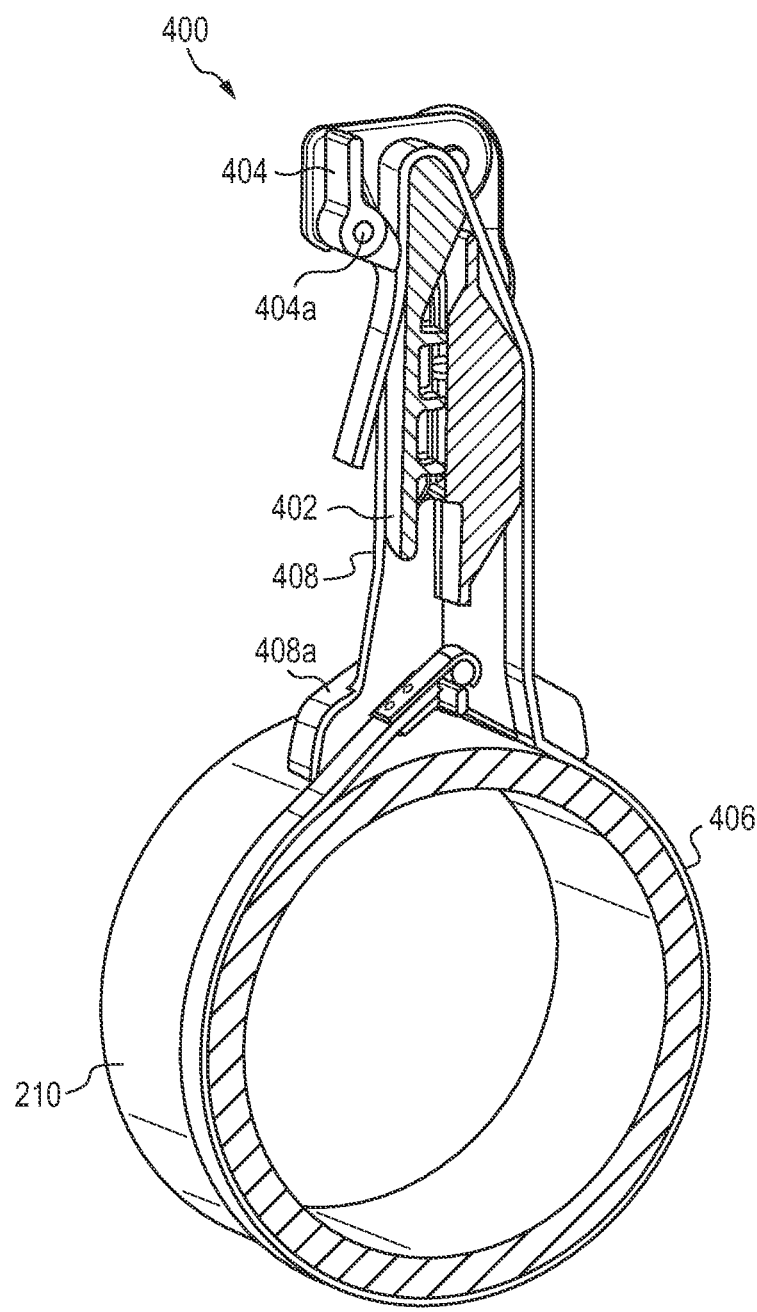
FIG. 91 is a cross sectional view of another gripping tool in accordance with an embodiment of the present subject matter.

FIG. 91 is a perspective cross sectional view of a gripping tool 400 in accordance with another embodiment of the present subject matter. The gripping tool 400 is similar in many regards to the previously described gripping tools 200 and 300 described in association with FIGS. 42-90. The tool 400 includes a handle 408, a flexible strap 406, a lever 402 and a cam lever 404. The lever 402 is pivotably attached to the handle 408. The cam lever 404 is pivotably attached to the lever 402 at pin or axis 404*a*. The cam lever 404 is pivotable about a pivot axis defined on the lever 402 (or lever assembly) which in turn is pivotable about one end of the handle 408. The cam lever 404 includes a cam portion having teeth (not shown in FIG. 91) that engage the strap 406 and prevent the strap 406 from slipping in one direction through a region between the teeth and the handle. The cam lever 404 also includes a lever portion that a user selectively positions to release the strap 406. The opposite end of the handle 408 includes a V shaped support 408a adapted to hold or otherwise engage the surface of an object 210 to be gripped, as illustrated in FIG. 91. In many applications, the object 210 to be gripped is a hollow circular pipe. However, it is also contemplated that the object 210 can be a solid object with a regular or irregular shape.

FIG. 91 also illustrates a perspective view of the tool 400 with the strap 306 wound around or otherwise extending about the object 410 which is typically a pipe in accordance with an embodiment of the present subject matter. The tool 400 allows the strap 406 to be completely disconnected from one side of the V shaped support 408a thus providing a user an option of attaching the tool 400 at any given location along the object's extended length without the need to find and insert an end of the object inside the tool 400, and specifically within a loop of the strap 406.

Figure 92:
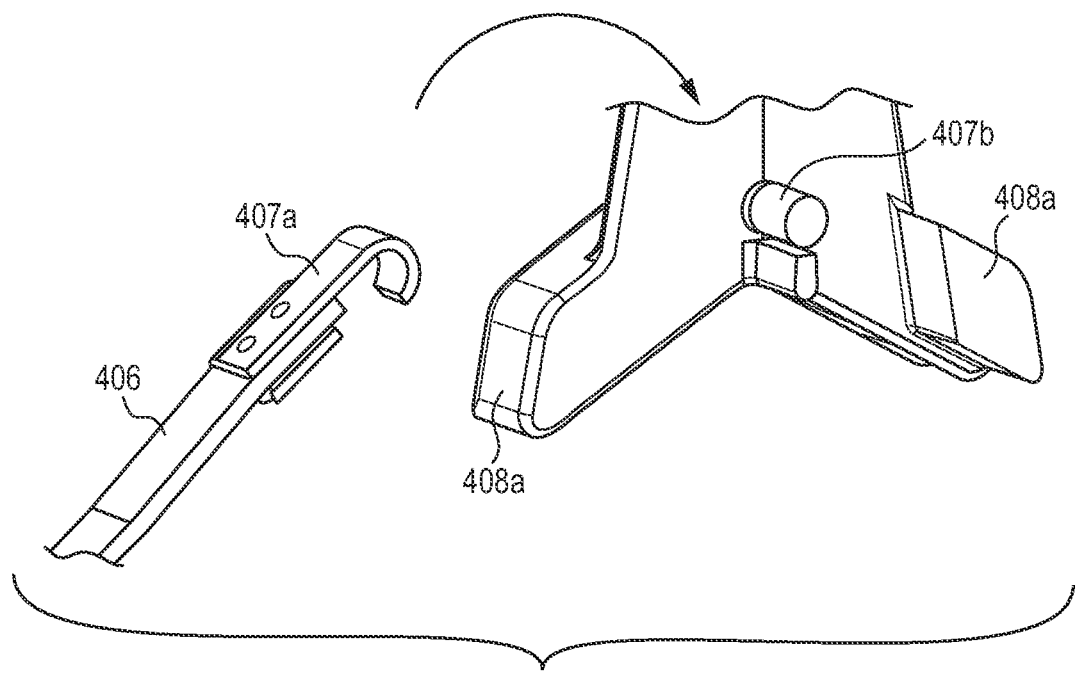
FIGS. 92 and 93 are detailed perspective views illustrating securement of an end of a strap to a base of the tool of FIG. 91.
Figure 93:
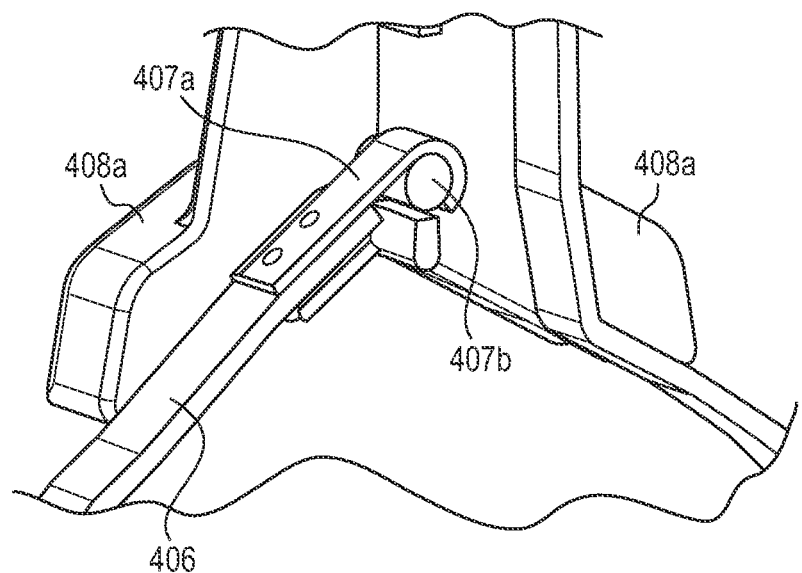

More specifically, FIGS. 92 and 93 illustrate engagement provisions between the strap 406 and the V shaped support 408a of the tool 400. In the particular embodiment illustrated, a first securing component 407a is affixed to an end of the strap 406. A second securing component 407b is affixed to, or formed with, the V shaped support 408a. In this particular example, the first securing component 407a is in the form of a hook or clasp member and the second securing component 407b is in the form of a post or pin. It will be understood that the present subject matter includes a wide array of configurations for the securing components 407a and 407b, and is not limited to the particular versions shown in the noted figures.

Figure 94:
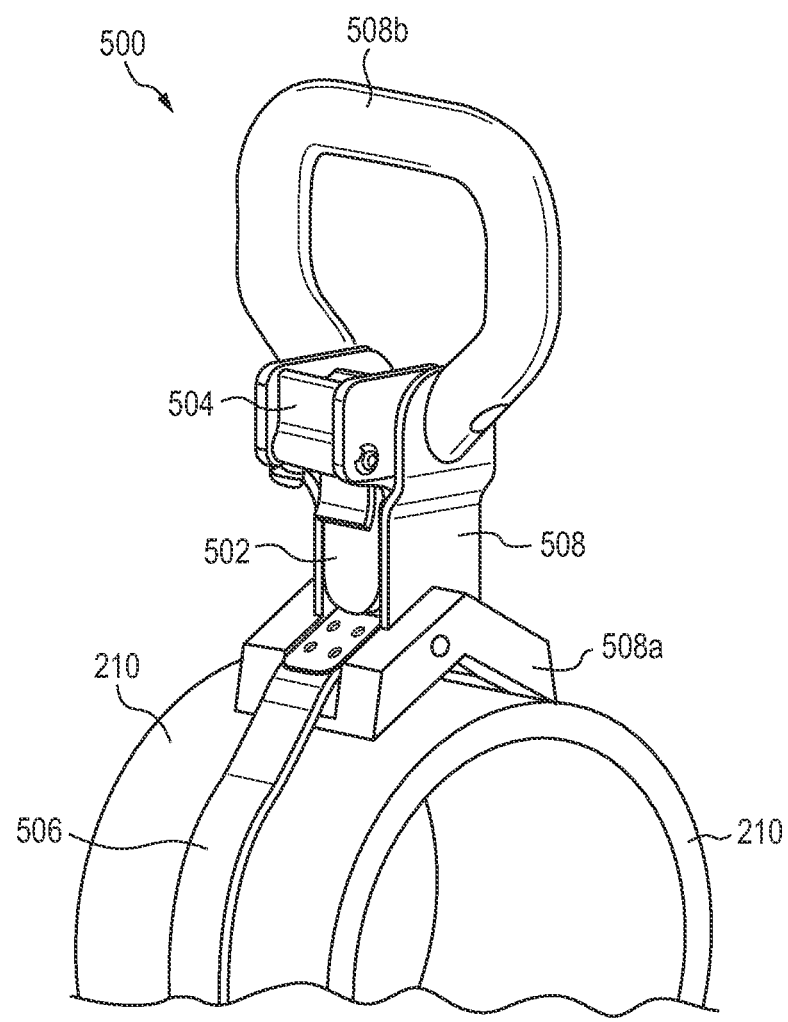
FIG. 94 is a perspective view of another gripping tool in accordance with an embodiment of the present subject matter.
Figure 95:
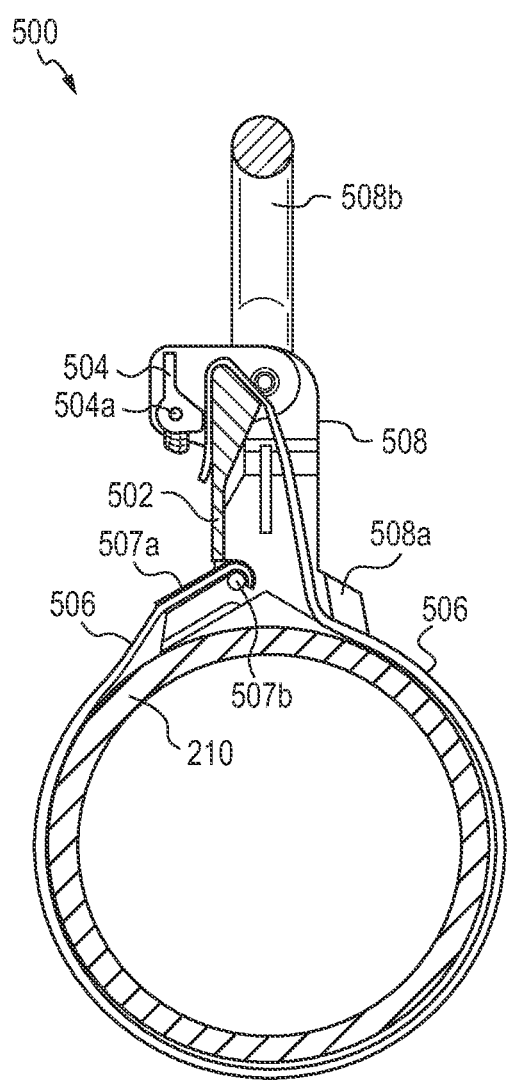
FIG. 95 is a cross sectional view of the tool of FIG. 94.
Figure 96:
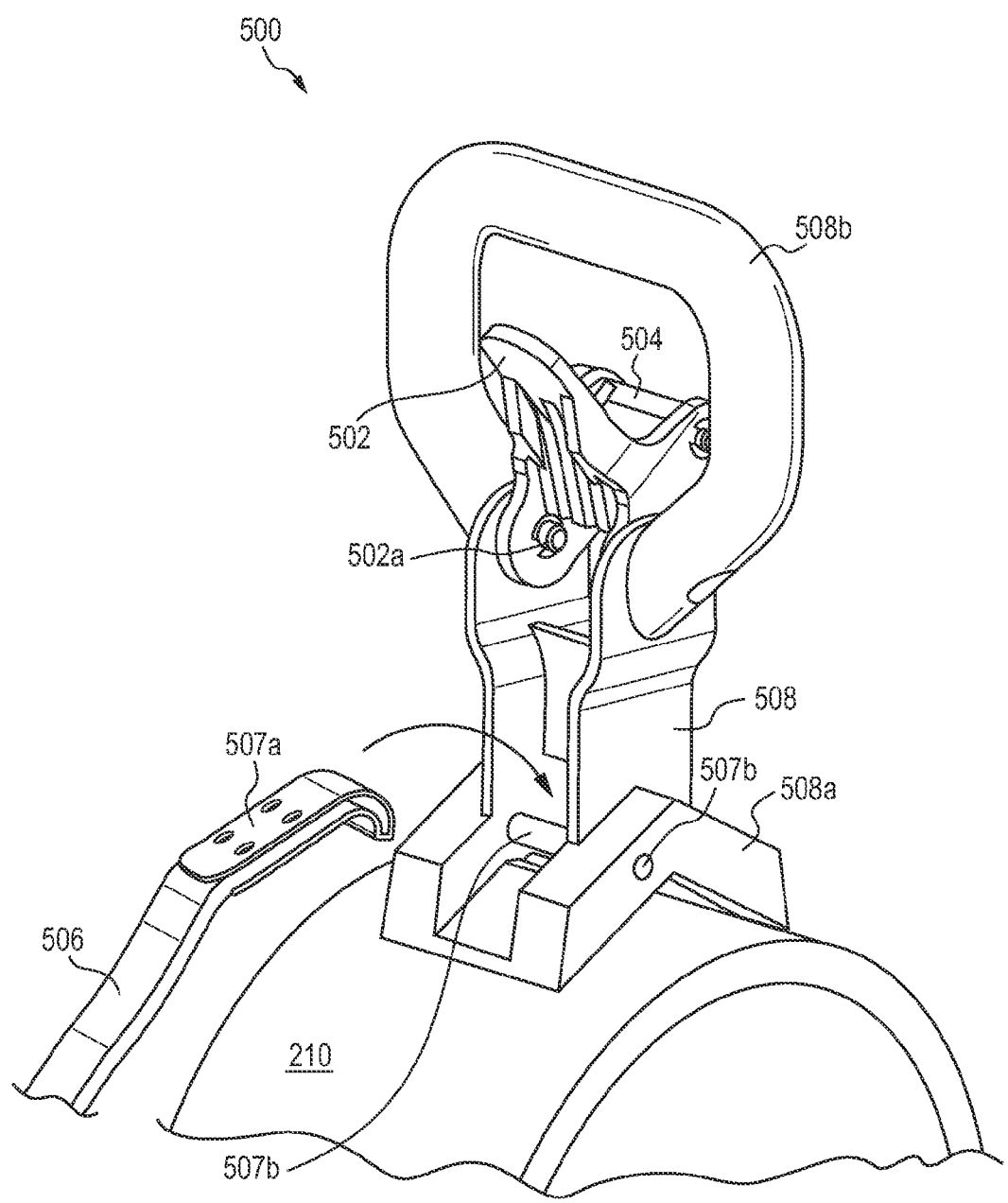
FIG. 96 is another perspective view of the tool shown in FIG. 94 illustrating securing a strap to the tool.

FIGS. 94-96 illustrate a perspective view of a gripping tool 500 in accordance with another embodiment of the present subject matter. The gripping tool 500 is similar in many regards to the previously described gripping tools 200, 300, and 400 described in association with FIGS. 42-93. The tool 500 includes a handle 508, a flexible strap 506, a lever 502, and a cam lever 504. The handle 508 includes a gripping member 508b which can be in the form of a rigid loop or handle which defines an open interior and peripheral gripping regions to enable a user to hold the tool 500 in a variety of different orientations. The gripping member 508b typically constitutes, or is formed at, the distal end of the handle 508. The lever 502 is pivotably attached to the handle 508 at pin or axis 502a. The cam lever 504 is pivotably attached to the lever 502 at pin or axis 504a. The cam lever 504 is pivotable about a pivot axis defined on the lever 502 (or lever assembly) which in turn is pivotable about one end of the handle 508. The cam lever 504 includes a cam portion optionally having teeth that engages the strap 506 and prevents the strap 506 from slipping in one direction through a region between the cam portion/teeth and the handle. The cam lever 504 also includes a lever portion that a user selectively positions to release the strap 506. The opposite end of the handle 508 includes a V shaped support 508a adapted to hold or otherwise engage the surface of an object 210 to be gripped, as illustrated in FIGS. 94-96. In many applications, the object 210 to be gripped is a hollow circular pipe. However, it is also contemplated that the object 210 can be a solid object with a regular or irregular shape.

FIGS. 94-95 also illustrate the tool 500 with the strap 506 wound around or otherwise extending about the object 210 which is typically a pipe in accordance with an embodiment of the present subject matter. The tool 500 allows the strap 506 to be completely disconnected from one side of a V shaped support 508a thus providing a user an option of attaching the tool 500 at any given location along the object's extended length without the need to find and insert an end of the object inside the tool 500, and specifically within a loop of the strap 506.

The tool 500 can also include securement provisions between the strap 506 and the V shaped support 508a. For example, as depicted in FIGS. 95 and 96, a first securing component 507a is affixed to an end of the strap 506 and a second securing component 507b is provided by the support 508a.

Figure 97:
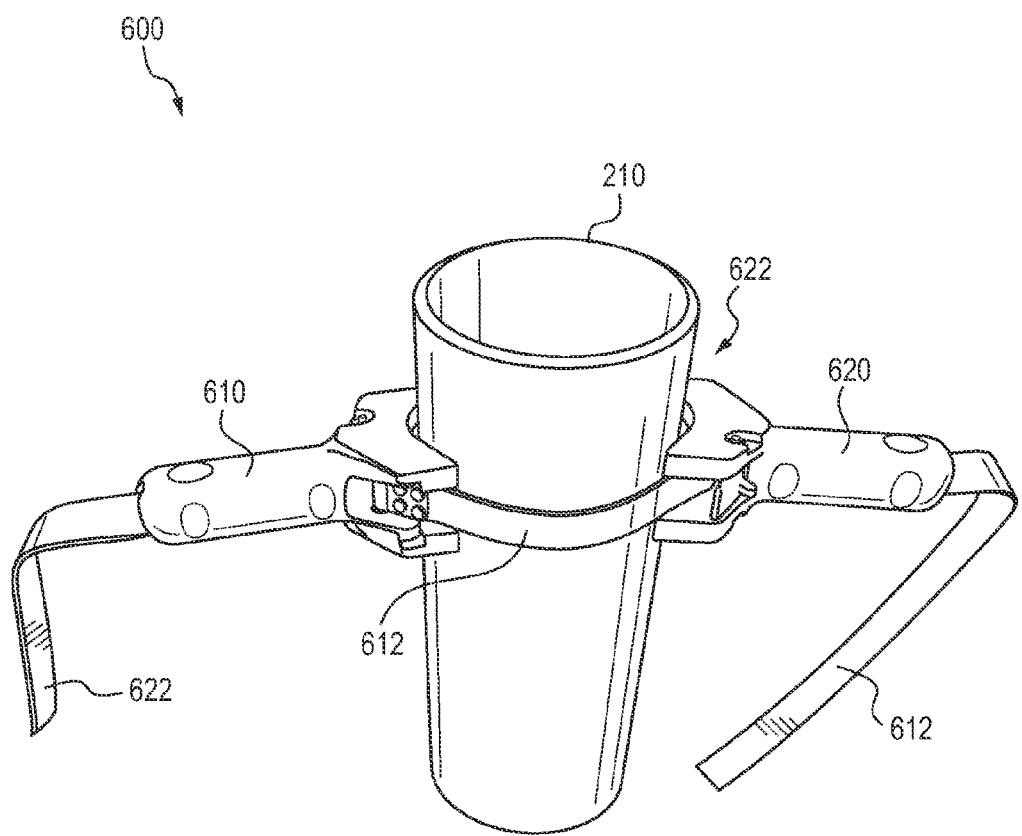
FIG. 97 illustrates a system using multiple tools together for gripping a pipe or other workpiece.

FIG. 97 illustrates a system 600 of tools 610 and 620, each of the tools 610 and 620 being similar or identical to any of the tools described herein and particularly with regard to tools 10F, 10G, 10H, 10I, and 10J for example. In this configuration, the system includes a first gripping tool 610 having a flexible strap member 612, and a second gripping tool 620 having a flexible strap member 622. The tools and straps are positioned about a pipe 210. The strap 612 of the first tool 610 is engaged between the handle portions of the second tool 620. And, the strap 622 of the second tool 620 is engaged between the handle portions of the first tool 610. It will be understood that the system can include a greater number of tools such as three, four, or more.

In all embodiments of the present subject matter, the strap can be in the form of a fastener, band, chain, belt, or other means for securing the gripping tools to an elongated object, such as a pipe. In accordance with the present subject matter, the gripping tools can include more than one strap for engaging the elongated object.

The strap is not particularly limited by the present subject matter, and can comprise any material that can suitably clamp a pipe to the gripping tool. The strap can be rigid or flexible, or have any degree of rigidity or flexibility. The strap can comprise a chain, a metal ribbon, a nylon strap, a leather or polymer belt, a composite material, or any other material or combination thereof that has adequate tensile strength to be tensioned for securing an elongated object in the pipe handle. In one embodiment, the strap comprises a nylon strap.

The various tool embodiments provide advantages including easy positioning and maneuvering of pipes during installation of pipe fittings; an improved handle orientation and configuration to apply a lateral push force (with respect to the main axis of the pipe); improved leverage to rotate the pipe to adjust orientation; easy accessibility to objects located in narrow or hard to access areas; easy portability; no damage to the object while installing the arrangement; installing objects of different sizes; and quick setup for locking and unlocking.

The technical advancements offered by the present subject matter include the realization of a grasping device which addresses problems of forcefully orienting and fixing an object; a grasping device which allows the user to exert an axial force onto the object while at the same time applying a torque to rotate the object in position; a grasping device which can be used in difficult to access areas; a grasping device which provides adequate friction and tension to securely lock the object and avoid it from slipping; a grasping device which is easy and quick acting to lock and unlock; a grasping device which has a comfortable and ergonomic handle; a grasping device which eases loading in all directions; and a grasping device which provides room to attach accessories which would help orient the object in a desired position.

The various tools and features described herein provide many advantages and benefits as compared to previous tools. For example, provision of the passages in the tool base and sizing the passages to accept the full width of the fastener enables increased contact between the fastener and a pipe. Furthermore, this feature in conjunction with a V-shaped or angled base underside promotes contact between the base and the pipe. Moreover, utilizing laterally extended contact points between the base underside and a pipe increases stability and engagement of the tool to a pipe and thereby enables the tool to be used to apply torque as well as axial force to a pipe.

The various tools described herein address one or more of the drawbacks associated with conventional devices and traditional methods of holding cylindrical objects such as pipes. Nonlimiting examples of such drawbacks include difficulty in accessing objects located in inaccessible areas, slipping/damage to objects due to lack of tension/pressure control while gripping, lack of portability of the tool(s), limitation of the tool(s) to hold objects of different sizes, longer setup time when using conventional tools and/or traditional method(s), difficulty in applying lateral push forces particularly while using pipe wrenches and potential damage to the objects, and difficulty in holding and positioning the objects. The present subject matter provides various tools which address the noted drawbacks while providing reliability during operation.

Many other benefits will no doubt become apparent from future application and development of this technology.

All patents, applications, standards, and articles noted herein are hereby incorporated by reference in their entirety.

The present subject matter includes all operable combinations of features and aspects described herein. Thus, for example if one feature is described in association with an embodiment and another feature is described in association with another embodiment, it will be understood that the present subject matter includes embodiments having a combination of these features.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

What is claimed is:

1. A tool for handling elongated objects, the tool comprising:
a base having an engaging surface for contacting an object;
a first handle portion affixed to and extending from the base;
a second handle portion releasably engageable with at least one of the base and the first handle portion, the second handle portion including a pair of projections that are fittingly engageable within a capture region defined in the base which enable the second handle portion to be pivotally positioned between an open position and a closed position upon engagement with at least one of the base and the first handle portion;
a flexible fastener having a first end engaged with the second handle portion; and
provisions for maintaining tension applied to the fastener, wherein the provisions for maintaining tension applied to the fastener include:
a cam buckle pivotally attached to the base and defining a region between the cam buckle and the base for receiving the fastener, the cam buckle biased to urge the cam buckle toward engagement with the fastener.

2. The tool of claim 1, the cam buckle including a head end, an opposite handle end, and teeth disposed on the head end.

3. The tool of claim 1, the cam buckle including at least one outwardly extending guard member.

4. The tool of claim 1 wherein the first handle portion and the second handle portion include alignment provisions such that upon positioning the second handle to the closed position, the first and second handle portions are aligned with each other.

5. The tool of claim 4 wherein the alignment provisions are located within an interior of the closed first and second handle portions.

6. The tool of claim 4 wherein the alignment provisions are located along an exterior of the closed first and second handle portions.

7. The tool of claim 1 wherein the first end of the fastener is releasably engaged with the second handle portion.

8. The tool of claim 7 wherein the first end of the fastener includes a hook or clasp member.

9. The tool of claim 1 wherein the pair of projections of the second handle portion and the capture region of the base are configured such that upon positioning the pair of projections in the capture region and displacing the second handle portion toward the first handle portion to the closed position, tension is applied to the fastener.

10. The tool of claim 1 wherein the first handle portion and the second handle portion are configured such that at closure of the second handle portion, the second end of the fastener is disposed between the first handle portion and the second handle portion.

11. The tool of claim 1 wherein at least one of the first handle portion and the second handle portion define a recessed grasping region to facilitate opening of the first and second handle portions.

12. The tool of claim 1 wherein the base defines at least one passage within which the fastener extends upon positioning the second handle portion to the closed position.

13. The tool of claim 12 wherein the passage defined in the base has a width at least as great as a width of the fastener.

14. The tool of claim 1 further comprising a toggle mechanism.

15. The tool of claim 1 wherein the second handle portion and the base are configured such that upon initially engaging the second handle portion and the base and positioning the second handle to the open position, the second handle portion is frictionally retained with the base.

16. The tool of claim 15 wherein the pair of projections of the second handle portion are disposed on a pair of resting surfaces of the capture region of the base.

17. A tool for handling elongated objects, the tool comprising:
a base having an engaging surface for contacting an object;
a first handle portion affixed to and extending from the base;

a second handle portion pivotally secured to the base by a pivot pin, the second handle portion pivotally positionable between an open position and a closed position;

a flexible fastener having a first end engageable with the second handle portion;

provisions for maintaining tension applied to the fastener;

a toggle mechanism.

18. The tool of claim 17 wherein the provisions for maintaining tension applied to the fastener include:

a cam buckle pivotally attached to the base and defining a region between the cam buckle and the base for receiving the fastener, the cam buckle biased to urge the cam buckle toward engagement with the fastener.

19. The tool of claim 18 the cam buckle including a head end, an opposite handle end, and teeth disposed on the head end.

20. The tool of claim 18, the cam buckle including at least one outwardly extending guard member.

21. The tool of claim 17 wherein the first handle portion and the second handle portion include alignment provisions such that upon positioning the second handle to the closed position, the first and second handle portions are aligned with each other.

22. The tool of claim 21 wherein the alignment provisions are located within an interior of the closed first and second handle portions.

23. The tool of claim 21 wherein the alignment provisions are located along an exterior of the closed first and second handle portions.

24. The tool of claim 17 wherein the first end of the fastener is releasably engaged with the second handle portion.

25. The tool of claim 24 wherein the first end of the fastener includes a hook or clasp member.

26. The tool of claim 17 wherein the first handle portion and the second handle portion are configured such that at closure of the second handle portion, the second end of the fastener is disposed between the first handle portion and the second handle portion.

27. The tool of claim 17 wherein at least one of the first handle portion and the second handle portion define a recessed grasping region to facilitate opening of the first and second handle portions.

28. The tool of claim 17 wherein the base defines at least one passage within which the fastener extends upon positioning the second handle portion to the closed position.

29. The tool of claim 28 wherein the passage defined in the base has a width at least as great as a width of the fastener.

* * * * *